United States Patent
Hamada et al.

(10) Patent No.: US 8,606,080 B2
(45) Date of Patent: Dec. 10, 2013

(54) REPRODUCING APPARATUS, REPRODUCING METHOD, REPRODUCING PROGRAM, AND RECORDING MEDIUM

(75) Inventors: Toshiya Hamada, Saitama (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 63 days.

(21) Appl. No.: 13/350,449

(22) Filed: Jan. 13, 2012

(65) Prior Publication Data

US 2012/0189275 A1  Jul. 26, 2012

Related U.S. Application Data

(63) Continuation of application No. 10/498,823, filed as application No. PCT/JP03/14511 on Nov. 14, 2003, now Pat. No. 8,150,237.

(30) Foreign Application Priority Data

Nov. 28, 2002  (JP) .................................. 2002-346133
Jan. 30, 2003  (JP) .................................. 2003-022551
Mar. 18, 2003  (JP) .................................. 2003-074441

(51) Int. Cl.
*H04N 9/80* (2006.01)
*H04N 5/917* (2006.01)

(52) U.S. Cl.
USPC .......... 386/248; 386/333; 386/332; 386/335; 386/355; 386/357

(58) Field of Classification Search
USPC ................. 386/248, 333, 332, 335, 355, 357
See application file for complete search history.

(56) References Cited

U.S. PATENT DOCUMENTS 6,088,507 A  7/2000  Yamauchi et al. ............. 386/201
6,166,777 A *  12/2000  Ock ................................ 348/565

(Continued)

FOREIGN PATENT DOCUMENTS

JP  8-339663 A  12/1996
JP  10-145722 A  5/1998

(Continued)

OTHER PUBLICATIONS

U.S. Appl. No. 13/350,510, filed Jan. 13, 2012, Hamada, et al.
Japanese Office Action Issued Jul. 24, 2012 in Patent Application No. 2010-278510.
Office Action issued Jun. 4, 2013 in Japanese Patent Application No. 2010-278510.

*Primary Examiner* — Helen Shibru
(74) *Attorney, Agent, or Firm* — Oblon, Spivak, McClelland, Maier & Neustadt, L.L.P.

(57) ABSTRACT

For a content-prerecorded large capacity disc-shaped recording medium, a user interface having high flexibility is accomplished. Button image data, corresponding sound data as an effect sound, and control commands for the sound data and image data are multiplexed with a stream and recorded on the disc. A scenario reproduced from the disc is stored in a buffer. The image data and sound data are stored in a buffer. Image data is read from the buffer in accordance with a scenario and expanded to a graphics plane. In addition, corresponding sound data is read from the buffer and reproduced by a sound player. When a button image is varied in accordance with a state change of the button, an effect sound is reproduced. As a result, a more effective user interface is accomplished.

37 Claims, 104 Drawing Sheets

(56) References Cited

U.S. PATENT DOCUMENTS

| | | |
|---|---|---|
| 6,310,648 B1 | 10/2001 | Miller et al. ............. 348/333.05 |
| 6,549,722 B2 | 4/2003 | Okada et al. .................. 386/245 |
| 6,806,887 B2 * | 10/2004 | Chernock et al. ............. 345/629 |
| 6,912,350 B1 * | 6/2005 | Vasquez ........................ 386/230 |
| RE39,745 E * | 7/2007 | Setogawa et al. ............. 715/810 |
| 7,481,362 B2 * | 1/2009 | Fujieda et al. ................ 235/380 |
| 2003/0152366 A1 | 8/2003 | Kanazawa et al. ............. 386/69 |
| 2005/0196143 A1 | 9/2005 | Kato et al. |

FOREIGN PATENT DOCUMENTS

| | | |
|---|---|---|
| JP | 10-308924 | 11/1998 |
| JP | 11-69284 | 3/1999 |
| JP | 11-69284 A | 3/1999 |
| JP | 2001-275089 A | 10/2001 |
| JP | 2001-326910 | 11/2001 |

* cited by examiner

Fig. 5 BACKGROUND ART

| SUB PICTURE | DATA OF ONE PICTURE REPRESENTED BY INFORMATION OF TWO BITS PRE PIXEL |
| --- | --- |
| | COLOR (A0, B0, C0, D0) |
| | DISPLAY START COORDINATES (X, Y) |
| HIGHLIGHT | COLOR IN SELECTION STATE (A1, B1, C1, D1) |
| | COLOR IN EXECUTION STATE (A2, B2, C2, D2) |
| | SETS OF COORDINATES OF REGIONS WHOSE COLORS ARE CHANGED (= NUMBER OF BUTTONS : 3) |
| | (X1, Y1, X1', Y1') |
| | (X2, Y2, X2', Y2') |
| | (X3, Y3, X3', Y3') |

Fig. 10

| SYNTAX | DATA LENGTH (BITS) | MNEMONIC |
|---|---|---|
| info.bdav{ | | |
|     type_indicator | 8*4 | bslbf |
|     version_number | 8*4 | bslbf |
|     TableOfPlayLists_start_address | 32 | unimsbf |
|     MakersPrivateData_start_address | 32 | unimsbf |
|     reserved_for_future_use | 192 | bslbf |
|     UIAppInfoBDAV() | | |
|     for(i=0;i<N1;+i++){ | | |
|         padding_word | 16 | bslbf |
|     } | | |
|     TableOfPlayLists() | | |
|     for(i=0;i<N2;+i++){ | | |
|         padding_word | 16 | bslbf |
|     } | | |
|     MakersPrivateData() | | |
|     for(i=0;i<N3;+i++){ | | |
|         padding_word | 16 | bslbf |
|     } | | |
| } | | |

Fig. 11

| SYNTAX | DATA LENGTH (BITS) | MNEMONIC |
|---|---|---|
| UIAppInfoBDAV(){ | | |
| length | 32 | unimsbf |
| reserved_for_future_use | 16 | bslbf |
| BDAV_character_set | 8 | bslbf |
| reserved_for_word_align | 6 | bslbf |
| BDAV_protect_flag | 1 | bslbf |
| resume_valid_flag | 1 | bslbf |
| PIN | 8*4 | bslbf |
| resume_PlayList_file_name | 8*10 | bslbf |
| ref_to_menu_thumbnail_index | 16 | unimsbf |
| BDAV_name_length | 8 | unimsbf |
| BDAV_name | 8*255 | bslbf |
| } | | |

Fig. 12

| SYNTAX | DATA LENGTH (BITS) | MNEMONIC |
|---|---|---|
| TableOfPlayLists(){ | | |
| length | 32 | unimsbf |
| number_of_PlayLists | 16 | unimsbf |
| for(i=0;i<number_of_PlayLists;i++){ | | |
| PlayList_file_name | 8*10 | bslbf |
| } | | |
| } | | |

*Fig. 13*

| SYNTAX | DATA LENGTH (BITS) | MNEMONIC |
|---|---|---|
| xxxxx.rpls/yyyyy.vpls{ | | |
|     type_indicator | 8*4 | bslbf |
|     version_number | 8*4 | bslbf |
|     PlayList_start_address | 32 | unimsbf |
|     PlayListMark_start_address | 32 | unimsbf |
|     MakersPrivateData_start_address | 32 | unimsbf |
|     reserved_for_future_use | 160 | bslbf |
|     UIAppInfoPlayList() | | |
|     for(i=0;i<N1;i++){ | | |
|         padding_word | 16 | bslbf |
|     } | | |
|     PlayList() | | |
|     for(i=0;i<N2;i++){ | | |
|         padding_word | 16 | bslbf |
|     } | | |
|     PlayListMark() | | |
|     for(i=0;i<N3;i++){ | | |
|         padding_word | 16 | bslbf |
|     } | | |
|     MakersPrivateData() | | |
|     for(i=0;i<N4;i++){ | | |
|         padding_word | 16 | bslbf |
|     } | | |
| } | | |

Fig. 14

| SYNTAX | DATA LENGTH (BITS) | MNEMONIC |
|---|---|---|
| UIAppInfoPlayList(){ | | |
| length | 32 | unimsbf |
| reserved_for_future_use | 16 | bslbf |
| PlayList_character_set | 8 | unimsbf |
| reserved_for_word_align | 4 | bslbf |
| playback_protect_flag | 1 | bslbf |
| write_protect_flag | 1 | bslbf |
| is_played_flag | 1 | bslbf |
| is_edited_flag | 1 | bslbf |
| time_zone | 8 | bslbf |
| reserved_for_word_align | 8 | bslbf |
| record_time_and_date | 4*14 | bslbf |
| PlayList_duration | 4*6 | bslbf |
| maker_ID | 16 | unimsbf |
| maker_model_code | 16 | unimsbf |
| channel_number | 16 | unimsbf |
| reserved_for_word_align | 8 | bslbf |
| channel_name_length | 8 | unimsbf |
| channel_name | 8*20 | bslbf |
| PlayList_name_length | 8 | unimsbf |
| PlayList_name | 8*255 | bslbf |
| PlayList_detail_length | 16 | unimsbf |
| PlayList_detail | 8*1200 | bslbf |
| } | | |

Fig. 15

| SYNTAX | DATA LENGTH (BITS) | MNEMONIC |
|---|---|---|
| PlayList(){ | | |
|   length | 32 | uimsbf |
|   reserved_for_word_align | 12 | bslbf |
|   PL_CPI_type | 4 | bslbf |
|   number_of_PlayItems | 16 | uimsbf |
|   if(<Virtual-PlayList>&&PL_CPI_type==1){ | | |
|     number_of_SubPlayItems | 16 | uimsbf |
|   }else{ | | |
|     reserved_for_word_align | 16 | bslbf |
|   } | | |
|   for(PlayItem_id=0;PlayItem_id<number_of_PlayItems;PlayItem_id++){ | | |
|     PlayItem() | | |
|   } | | |
|   if(<Virtual-PlayList>&&CPI_type==1){ | | |
|     for(i=0;i<number_of_SubPlayItems;i++){ | | |
|       SubPlayItem() | | |
|     } | | |
|   } | | |
| } | | |

Fig. 16

| SYNTAX | DATA LENGTH (BITS) | MNEMONIC |
|---|---|---|
| PlayItem(){ | | |
|   length | 16 | unimsbf |
|   Clip_Infomation_file_name | 8*5 | bslbf |
|   Clip_codec_identifier | 8*4 | bslbf |
|   reserved_for_future_use | 6 | bslbf |
|   connection_condition | 2 | bslbf |
|   if(CPI_type==1){ | | |
|     ref_to_STC_id | 8 | unimsbf |
|   }else{ | | |
|     reserved_for_word_align | 8 | bslbf |
|   } | | |
|   IN_time | 32 | unimsbf |
|   OUT_time | 32 | unimsbf |
|   if(<Vietual-PlayList>&&connection_condition==3){ | | |
|     BridgeSequenceInfo() | | |
|   } | | |
| } | | |

Fig. 18

| SYNTAX | DATA LENGTH (BITS) | MNEMONIC |
|---|---|---|
| PlayListMark(){ | | |
|   length | 32 | unimsbf |
|   number_of_PlayList_marks | 16 | unimsbf |
|   for(i=0;i<number_of_PlayList_marks;i++){ | | |
|     mark_invalid_flag | 1 | unimsbf |
|     mark_type | 7 | unimsbf |
|     mark_name_length | 8 | unimsbf |
|     maker_ID | 16 | unimsbf |
|     ref_to_PlayItem_id | 16 | unimsbf |
|     mark_time_stamp | 32 | unimsbf |
|     entry_ES_PID | 16 | unimsbf |
|     if(mark_type==0x01‖mark_type==0x02){ | | |
|       ref_to_menu_thumbnail_index | 16 | unimsbf |
|     }else{ | | |
|       ref_to_menu_thumbnail_index | 16 | unimsbf |
|     } | | |
|     duration | 32 | unimsbf |
|     makers_infomation | 32 | bslbf |
|     mark_name | 8*24 | bslbf |
|   } | | |
| } | | |

Fig. 19

| SYNTAX | DATA LENGTH (BITS) | MNEMONIC |
|---|---|---|
| zzzzz.clpi{ | | |
|     type_indicator | 8*4 | bslbf |
|     version_number | 8*4 | bslbf |
|     SequenceInfo_start_address | 32 | unimsbf |
|     ProgramInfo_start_address | 32 | unimsbf |
|     CPI_start_address | 32 | unimsbf |
|     ClipMark_start_address | 32 | unimsbf |
|     MakersPrivateData_start_address | 32 | unimsbf |
|     reserved_for_future_use | 96 | bslbf |
|     ClipInfo() | | |
|     for(i=0;<N1;i++){ | | |
|         padding_word | 16 | bslbf |
|     } | | |
|     SequenceInfo() | | |
|     for(i=0;<N2;i++){ | | |
|         padding_word | 16 | bslbf |
|     } | | |
|     ProgramInfo() | | |
|     for(i=0;<N3;i++){ | | |
|         padding_word | 16 | bslbf |
|     } | | |
|     CPI() | | |
|     for(i=0;<N4;i++){ | | |
|         padding_word | 16 | bslbf |
|     } | | |
|     ClipMark() | | |
|     for(i=0;<N5;i++){ | | |
|         padding_word | 16 | bslbf |
|     } | | |
|     MakersPrivateData() | | |
|     for(i=0;<N6;i++){ | | |
|         padding_word | 16 | bslbf |
|     } | | |
| } | | |

| ITEM | DESCRIPTION |
|---|---|
| MOVING PICTURE PLANE | 1920 X 1080 X 16 BITS, YCbCr (4 : 2 : 2) EIGHT BITS EACH |
| SUBTITLE PLANE | 1920 X 1080 X 8 BITS, 8-BIT COLOR MAP ADDRESSES (PALETTE) + ALPHA-BLENDING IN 256 LEVELS |
| GRAPHICS PLANE | 1920 X 1080 X 8 BITS, 8-BIT COLOR MAP ADDRESSES (PALETTE) + ALPHA BLENDING IN 256 LEVELS |

Fig. 23

| INPUT | INPUT ADDRESS    8 BITS |
|---|---|
| OUTPUT | OUTPUT DATA    8 BITS X 4, (R, G, B, α) OUTPUT |

Fig. 24

| COLOR INDEX VALUE | VALUES OF THREE PRIMARY COLORS | | | TRANSPARENCY |
| | R | G | B | α |
|---|---|---|---|---|
| 0x00 | 0 | 0 | 0 | 0 |
| 0x01 | 10 | 100 | 30 | 0.5 |
| ⋮ | ⋮ | ⋮ | ⋮ | ⋮ |
| ⋮ | ⋮ | ⋮ | ⋮ | ⋮ |
| 0xFF | 200 | 255 | 100 | 0.8 |

| EVENT NAME | DESCRIPTION |
| --- | --- |
| TimeFired | COUNT DOWN TIMER BECAME "0" |
| | COUNT UP TIMER BECAME PREDETERMINED VALUE |
| PlayStopped | REPRODUCTION STOPPED |
| PlayStilled | REPRODUCTION TEMPORARILY STOPPED |
| StillReleased | PAUSE STATE OF REPRODUCTION WAS RELEASED |
| PlayPaused | REPRODUCTION WAS PLACED IN PAUSE STATE BY USER |
| PauseReleased | PAUSE STATE WAS RELEASED |

Fig. 32B

| EVENT NAME | DESCRIPTION |
|---|---|
| PlayStarted | REPRODUCTION STARTED |
| PlayRepeated | BEGINNING OF REGION TO BE REPEATEDLY REPRODUCED WAS DETECTED |
| SPDisplayStatusChanged | DISPLAY/NON-DISPLAY STATE OF SP STREAM WAS CHANGED |
| SelectedAudioChanged | AUDIO STREAM REPRODUCED WAS CHANGED |
| VideoStopped | VIDEO STREAM REPRODUCED WAS CHANGED |
| ScenarioStarted | BEGINNING OF SCENARIO WAS DETECTED |
| ScenarioEnded | END OF SCENARIO WAS DETECTED |
| PlayListStarted | BEGINNING OF PLAY LIST WAS DETECTED |
| PlayListEnded | END OF PLAY LIST WAS DETECTED |
| PlayItemStarted | BEGINNING OF PLAY ITEM WAS DETECTED |
| PlayItemEnded | END OF PLAY ITEM WAS DETECTED |

Fig. 32C

| EVENT NAME | DESCRIPTION |
| --- | --- |
| MarkEncountered | MARK WAS DETECTED DURING REPRODUCTION |
| | USED WHEN GRAPHICS SCREEN IS DISPLAYED |
| | TYPE AND NUMBER ARE DESCRIBED IN COMMON PARAMETER |
| ButtonPressed | BUTTON ON SCREEN WAS PRESSED |
| | ID OF PRESSED BUTTON IS DESCRIBED IN COMMON PARAMETER |
| ValidPeriodStarted | VALID PERIOD STARTED |
| | USED TO DESIGNATE VALID PERIOD FOR WHICH LINK CAN BE SELECTED |
| ValidPeriodEnded | VALID PERIOD ENDED |
| | USED TO FORCEDLY EXECUTE LINK |
| KeyPressed | KEY OF REMOTE CONTROLLER WAS PRESSED |
| | KEY TYPE IS IDENTIFIED WITH SWITCH OF EVENT HANDLER OR THE LIKE |

Fig. 33

| Fig. 33A |
|---|
| Fig. 33B |
| Fig. 33C |
| Fig. 33D |
| Fig. 33E |
| Fig. 33F |
| Fig. 33G |
| Fig. 33H |

Fig. 33A

| METHOD | REMARKS |
|---|---|
| COMMANDS FOR DESIGNATING REPRODUCTION START POSITION | |
| LinkPlayList(playListNumber) | CAUSES REPRODUCTION OF PlayList DESIGNATED BY PlayListNumber BE STARTED |
| LinkPlayItem(playListNumber,playItemNumber) | CAUSES REPRODUCTION OF DESIGNATED PlayItem OF DESIGNATED playList TO BE STARTED. playItemNumber IS PlayItem_id STARTING FROM 0. WHEN PlayList IS REPRODUCED FROM BEGINNING, PlayItemNumber IS 0. |

Fig. 33B

| METHOD | REMARKS |
|---|---|
| COMMANDS FOR DESIGNATING REPRODUCTION START POSITION | |
| Link(position)(object) position=("prev" \| "next" \| "top" \| "Parent" \| "tail") object=(PlayList \| PlayItem \| Chapter) | CAUSES CURRENT POSITION TO BE MOVED IN SCENARIO. CAUSES CURRENT REPRODUCTION POSITION TO BE MOVED TO ADJACENT PlayList, PlayItem, OR Chapter. |
| Exit | CAUSES REPRODUCTION OF SCENARIO TO BE STOPPED. VALUE OF STANDARD REGISTER IS NOT HELD. |
| RSM | CAUSES REPRODUCTION TO BE RESUMED FROM LAST REPRODUCTION STOP POSITION. RESUME INFORMATION TO BE CALLED, IT TO BE SET TO REGISTER, AND REPRODUCTION OF SCENARIO TO BE STARTED. |

Fig. 33C

| COMMANDS FOR OBTAINING STATE OF PLAYER | |
|---|---|
| getMenuDescriptionLanguage() | CAUSES LANGUAGE OF MENU THAT IS DISPLAYED TO BE OBTAINED. |
| getScenarioNumber() | CAUSES SCENARIO NUMBER THAT IS BEING REPRODUCED TO BE OBTAINED. |
| getPlayListNumber() | CAUSES PLAY LIST NUMBER THAT IS BEING REPRODUCED TO BE OBTAINED. |
| getChapterNumber() | CAUSES CHAPTER NUMBER THAT IS BEING REPRODUCED TO BE OBTAINED. |
| getPlayerSupport() | CAUSES VERSION AND FUNCTION OF PLAYER TO BE OBTAINED. |

Fig. 33D

| COMMANDS FOR VIDEO STREAMS | |
|---|---|
| getVideoStreamAvailability() | CAUSES INFORMATION THAT DESCRIBES WHETHER OR NOT DESIGNATED VIDEO STREAM IS CONTAINED TO BE OBTAINED. |
| setVideoStreamNumber() | DESCRIBES VIDEO STREAM TO BE DECODED. |
| getVideoStreamNumber() | CAUSES VIDEO STREAM NUMBER THAT IS BEING SELECTED TO BE OBTAINED. |
| getVideoStreamAttribute() | CAUSES ATTRIBUTE OF VIDEO STREAM (ENCODING SYSTEM, RESOLUTION, ASPECT RATIO, DISPLAY MODE IN THE CASE OF ASPECT RATIO OF 4 : 3, CLOSED CAPTION) TO BE OBTAINED. |
| setAngleNumber() | DESCRIBES ANGLE NUMBER. |
| getAngleNumber() | CAUSES ANGLE NUMBER THAT IS BEING SELECTED TO BE OBTAINED. |
| getMaxVideoStreams() | CAUSES NUMBER OF VIDEO STREAMS THAT CAN BE SELECTED TO BE OBTAINED. DESCRIBES WHETHER OR NOT getVideoStreamAvailability() IS SUFFICIENT. |

Fig. 33E

| COMMANDS FOR AUDIO STREAMS | |
|---|---|
| getAudioStreamAvailability() | CAUSES INFORMATION THAT DESCRIBES WHETHER OR NOT DESIGNATED AUDIO STREAM IS CONTAINED TO BE OBTAINED. |
| getAudioStreamLanguage() | CAUSES INFORMATION ABOUT LANGUAGE OF DESIGNATED AUDIO STREAM TO BE OBTAINED. |
| getAudioStreamStatus() | DESCRIBES AUDIO STREAM TO BE REPRODUCED. |
| setAudioStreamStatus() | CAUSES AUDIO STREAM NUMBER THAT IS BEING REPRODUCED TO BE OBTAINED. |
| getAudioStreamAttribute() | CAUSES ATTRIBUTE OF AUDIO STREAM (ENCODING SYSTEM, NUMBER OF CHANNELS, Q, FS) TO BE OBTAINED. |

Fig. 33F

| COMMANDS FOR SUB PICTURE STREAMS | |
|---|---|
| getSPStreamAvailability() | CAUSES INFORMATION THAT DESCRIBES WHETHER OR NOT DESIGNATED SP STREAM IS CONTAINED TO BE OBTAINED. |
| getSPStreamLanguage() | CAUSES LANGUAGE OF DESIGNATED SP STREAM TO BE OBTAINED. |
| getSPDisplayStatus() | CAUSES DISPLAY STATE OF SP (WHETHER OR NOT SP IS DISPLAYED) TO BE OBTAINED. |
| setSPDisplayStatus() | DESCRIBES DISPLAY STATE OF SP (WHETHER OR NOT SP IS DISPLAYED). |
| getSpStreamAttribute() | CAUSES ATTRIBUTE OF SP (RESOLUTION, 4 : 3 OR WIDE) TO BE OBTAINED. |

Fig. 33G

| COMMANDS FOR REGISTER READ/WRITE | |
|---|---|
| clearReg() | CAUSES ALL REGISTERS TO BE INITIALIZED. |
| setReg() | CAUSES VALUE TO BE SET TO REGISTER. |
| getReg() | CAUSES VALUE TO BE READ FROM REGISTER. |

Fig. 33H

| COMMANDS FOR TIMERS | |
|---|---|
| sleep() | CAUSES PROCESS TO BE STOPPED FOR DESIGNATED MILLISECONDS. |
| setTimeout() | CAUSES FUNCTION AND PROCESS TO BE EXECUTED AFTER DESIGNATED MILLISECONDS HAVE ELAPSED. |
| setInterval() | CAUSES PROCESS TO BE EXECUTED AT INTERVALS OF DESIGNATED MILLISECONDS. |
| clearTimer() | CAUSES PROCESS OF TIMER THAT HAS DESIGNATED REGISTRATION TIMER ID TO BE STOPPED. |
| pauseTimer() | CAUSES TIMER THAT HAS DESIGNATED REGISTRATION TIMER ID TO BE TEMPORARILY STOPPED. |
| resumeTimer() | CAUSES TIMER THAT HAS DESIGNATED REGISTRATION TIMER ID TO BE RESUMED FROM PAUSE STATE. |
| OTHER COMMANDS | |
| playSoundEffect(sound_id) | CAUSES SELECTED EFFECT SOUND TO BE REPRODUCED. USED WITH BUTTON COMMAND |

Fig. 34A

| Fig. 34 |
|---|
| Fig. 34A |
| Fig. 34B |
| Fig. 34C |
| Fig. 34D |
| Fig. 34E |
| Fig. 34F |
| Fig. 34G |
| Fig. 34H |
| Fig. 34I |
| Fig. 34J |

| OBJECT | METHOD | REMARKS |
|---|---|---|
| bdp | | |
| COMMANDS FOR PLAYER OPERATIONS | | |
| | playScenario(scenarioNumber,[scenarioTime]) | CAUSES SCENARIO DESIGNATED BY scenarioNumber TO BE REPRODUCED. scenarioNumber IS URI FOR FILE OR LIKE THAT DESCRIBES SCENARIO STRUCTURE. scenarioTime IS OPTIONAL AND DESIGNATES ELAPSED TIME IN SCENARIO. |
| | playPlayList(playListNumber) | CAUSES PlayList DESIGNATED BY playListNumber TO BE REPRODUCED. |
| | playChapterMark(playListNumber,chapterNumber) | CAUSES PlayList DESIGNATED BY PlayListNumber FROM CHAPTER DESIGNATED BY chapterNumber TO BE REPRODUCED. |

Fig. 34B

| | |
|---|---|
| playPlayItem(playListNumber,playItemNumber) | CAUSES PlayList DESIGNATED BY PlayListNumber TO BE REPRODUCED FROM PlayItem DESIGNATED BY PlayItemNumber. playItemNumber IS PlayItem_id STARTING FROM 0. WHEN PlayList IS REPRODUCED FROM BEGINNING, playItemNumber IS 0. |
| play(position)(object)<br>position = ("prev"\|"next"\|"top"\|"goUp"\|"tail")<br>object = (PlayList\|PlayItem\|Chapter) | CAUSES CURRENT POSITION TO BE MOVED IN SCENARIO. CAUSES CURRENT REPRODUCTION POSITION TO BE MOVED TO ADJACENT PlayList, PlayItem, OR THE LIKE. |
| stop() | CAUSES REPRODUCTION OF SCENARIO TO BE STOPPED. VALUE OF STANDARD REGISTER IS NOT HELD. |
| resume() | CAUSES REPRODUCTION TO BE RESUMED FROM LAST STOP POSITION. |
| playSoundEffect() | CAUSES SELECTED EFFECT SOUND TO BE REPRODUCED. |

Fig. 34C

| COMMANDS FOR PLAYER STATES | | |
|---|---|---|
| | getMenuDescriptionLanguage() | CAUSES LANGUAGE OF MENU THAT IS DISPLAYED TO BE OBTAINED. |
| | getScenarioNumber() | CAUSES SCENARIO NUMBER THAT IS BEING REPRODUCED TO BE OBTAINED. |
| | getPlayListNumber() | CAUSES PLAY LIST NUMBER THAT IS BEING REPRODUCED TO BE OBTAINED. |
| | getChapterNumber() | CAUSES CHAPTER NUMBER THAT IS BEING REPRODUCED TO BE OBTAINED. |
| | getPlayerSupport() | CAUSES VERSION AND FUNCTION OF PLAYER TO BE OBTAINED. |

Fig. 34D

| COMMANDS FOR VIDEO STREAMS | |
|---|---|
| setVideoStreamNumber() | DESCRIBES VIDEO STREAM TO BE DECODED. |
| getVideoStreamNumber() | CAUSES VIDEO STREAM NUMBER THAT IS BEING SELECTED TO BE OBTAINED. |
| getVideoStreamStatus() | CAUSES STATE OF VIDEO STREAM TO BE OBTAINED. |
| getVideoStreamAttr() | CAUSES ATTRIBUTE OF VIDEO STREAM (ENCODING SYSTEM, RESOLUTION, ASPECT RATIO, DISPLAY MODE IN THE CASE THAT ASPECT RATIO IS 4 : 3, CLOSED CAPTION) TO BE OBTAINED. |
| setAngleNumber() | DESCRIBES ANGLE NUMBER. |
| getAngleNumber() | CAUSES ANGLE NUMBER THAT HAS BEEN SELECTED TO BE OBTAINED. |
| getMaxVideoStreams() | CAUSES MAXIMUM NUMBER OF VIDEO STREAMS TO BE OBTAINED. |

Fig. 34E

| COMMANDS FOR AUDIO STREAMS | | |
|---|---|---|
| | getAudioStreamAvailability() | CAUSES INFORMATION THAT DESCRIBES WHETHER OR NOT DESIGNATED AUDIO STREAM IS CONTAINED TO BE OBTAINED. |
| | getAudioStreamLanguage() | CAUSES INFORMATION ABOUT LANGUAGE OF DESIGNATED AUDIO STREAM TO BE OBTAINED. |
| | getAudioStreamStatus() | DESCRIBES STATE OF AUDIO STREAM (OF WHETHER OR NOT IT IS DISPLAYED). |
| | setAudioStreamStatus() | DESCRIBES STATE OF AUDIO STREAM (OF WHETHER OR NOT IT IS REPRODUCED). |
| | getAudioStreamAttribute() | CAUSES ATTRIBUTE OF AUDIO STREAM (ENCODING SYSTEM, NUMBER OF CHANNELS, Q, FS) TO BE OBTAINED. |

Fig. 34F

| COMMANDS FOR SUB PICTURE STREAMS | | |
|---|---|---|
| | getSPStreamAvailability() | CAUSES INFORMATION THAT DESCRIBES WHETHER OR NOT DESIGNATED SP STREAM IS CONTAINED TO BE OBTAINED. |
| | getSPStreamLanguage() | CAUSES LANGUAGE OF DESIGNATED SP STREAM TO BE OBTAINED. |
| | getSPDisplayStatus() | CAUSES DISPLAY STATE OF SP TO BE OBTAINED. |
| | setSPDisplayStatus() | DESCRIBES DISPLAY STATE OF SP WHETHER OR NOT DISPLAY OF SP IS TURN ON/OFF. |
| | getSpStreamAttribute() | CAUSES ATTRIBUTE OF SP (ASPECT RATIO OF 4 : 3 OR WIDE SCREEN) TO BE OBTAINED. |

Fig. 34G

| COMMANDS FOR REGISTER READ/WRITE | |
|---|---|
| clearReg() | OPERATION FOR MEMORY REGION (REGISTERS) BUILT IN PLAYER. CAUSES ALL REGISTERS TO BE INITIALIZED. |
| setReg() | CAUSES VALUE TO BE SET TO REGISTER. |
| getReg() | CAUSES VALUE TO BE READ FROM REGISTER. |

Fig. 34H

| COMMANDS FOR TIMERS | | |
|---|---|---|
| | sleep() | CAUSES PROCESS TO BE STOPPED FOR DESIGNATED MILLISECONDS. |
| | setTimeout() | CAUSES FUNCTION AND PROCESS TO BE EXECUTED AFTER DESIGNATED MILLISECONDS HAVE ELAPSED. |
| | setInterval() | CAUSES PROCESS TO BE EXECUTED AT INTERVALS OF DESIGNATED MILLISECONDS. |
| | clearTimer() | CAUSES PROCESS OF TIMER THAT HAS DESIGNATED REGISTRATION TIMER ID TO BE STOPPED. |
| | pauseTimer() | CAUSES TIMER THAT HAS DESIGNATED REGISTRATION TIMER ID TO BE TEMPORARILY STOPPED. |
| | resumeTimer() | CAUSES TIMER THAT HAS DESIGNATED REGISTRATION TIMER ID TO BE RESUMED FROM PAUSE STATE. |

Fig. 34I

| COMMAND FOR KEY INPUT | | |
|---|---|---|
| | getPressedKey() | CAUSES TYPE OF KEY THAT HAS BEEN INPUT TO BE OBTAINED. |
| COMMANDS FOR GRAPHICS | | |
| | loadGraphics(htmlfile,ID) | CAUSES FILE DESIGNATED BY htmlfile TO BE READ AND IT TO BE EXPANDED TO GRAPHICS PLANE. FILE IS NOT DISPLAYED. IMAGE IS REFERENCED WITH ID. |
| | showGraphics(ID) | CAUSES GRAPHICS IMAGE DESIGNATED BY ID TO BE DISPLAYED. GRAPHIC IMAGE SHOULD HAVE BEEN EXPANDED ON PLANE BY LoadGraphics(). |
| | hideGraphics(ID) | CAUSES GRAPHICS IMAGE DESIGNATED BY ID TO BE HIDDEN. |

*Fig. 34J*

| OTHER COMMANDS | | |
|---|---|---|
| | random(input Number num) | CAUSES RANDOM NUMBER FROM 1 TO num TO BE GENERATED. RANDOM NUMBERS ARE UNIQUELY DEFINED WITHOUT USE OF MATH OBJECT OF ECMA SCRIPT. |
| | catchEvent(eventname,eventhandler) | CAUSES FUNCTION DESIGNATED BY eventhandler TO BE EXECUTED WHEN EVENT DESIGNATED BY eventname TAKES PLACE. |

Fig. 39

| FILE NAME | DESCRIPTION |
|---|---|
| startup.js | SCRIPT FILE THAT IS INITIALLY EXECUTED WHEN DISC IS LOADED |
| scenario000.js | SCRIPT FILE THAT DESCRIBES STRUCTURAL INFORMATION OF SCENARIO LIST SCREEN (SCENARIO000) |
| 000.html | HTML FILE THAT DESCRIBES LAYOUT OF SCENARIO LIST SCREEN |
| 00000.rpls | PLAY LIST FILE REPRODUCED AS BACKGROUND WHILE SCENARIO LIST SCREEN IS BEING DISPLAYED |
| scenario001.js | SCRIPT FILE THAT DESCRIBES STRUCTURAL INFORMATION OF SCENARIO001 |
| 00001.rpls | PLAY LIST FILE THAT DESCRIBES INFORMATION OF PLAY LIST REPRODUCED IN ACCORDANCE WITH SCENARIO001 |

*Fig. 41*

```
=======================
startup.js
=======================
function makeArray(n){
        this.length=n;
        for(i=0;i<n;i++){
                this[i]=null;
        }
}
//DEFINES NUMBER OF SCENARIOS AND THEIR NAMES.
var scenario=new makeArray(2);
scenario[0]="scenario000";
scenario[1]="scenario001";

//EXECUTES FIRST SCENARIO.
bdp.playScenario("scenario000");
```

*Fig. 42*

```
==========================
scenario000.js
==========================
function UOPControl(){
var keyID=getPressedKey();
    switch(keyID){
        case menu:
            bdp.playScenario("scenario000.js");   //RETURNS TO BEGINNING.
            break;
        default;
            break;
    }
}
function playListEnded(){
    bdp.playScenario("scenario000.js");   //AFTER SCENARIO HAS BEEN REPRODUCED,
    return();                              REPEATS REPRODUCTION FROM BEGINNING.
}
function MarkEncountered(){   //MARK THAT DESCRIBES TIMING AT
                                WHICH GRAPHICS ARE READ.
    bdp.loadGraphics("000.html","id_1");
    return();
}
function ValidPeriodStarted(f){  //MARK THAT DESCRIBES TIMING AT
                                   WHICH GRAPHICS ARE DISPLAYED.
    if(f =="id_1"){
        bdp.showGraphics("id_1");
    }
    return();
}
function ValidPeriodEnded(f){   //MARK THAT DESCRIBES TIMING AT
                                  WHICH GRAPHICS ARE CLEARED.
    if(f =="id_1"){
        bdp.hideGraphics("id_1");
    }
    return();
}
bdp.catchEvent("onKeyPressed","UOPControl()");
bdp.catchEvent("onPlayListEnded","PlayListEnded()");
bdp.catchEvent("onMarkEncountered","MarkEncountered()");
bdp.catchEvent("onValidPeriodStarted","ValidPeriodStarted()");
bdp.catchEvent("onValidPeriodEnded","ValidPeriodEnded()");

bdp.playPlayList("00000.rpls");
```

*Fig. 43*

```
=========================
000.html
=========================
<html>
<head>
<style type="text/css">
<![CDATA[
img#menu {position:absolute;top:200px;left:800px;width:200px;height:50px}
img#scenario001 {position:absolute;top:700px;left:700px;width:400px;height:100px}
]]>
</style>
<script type="text/javascript">
function onMoverhandler(f){
        switch(f){
                case scenario001:
                        f.src="201.png";
                        break;
                default;
                        break;
        }
}
function onMouthandler(f){
        switch(f){
                case scenario001:
                        f.src="200.png";
                        break;
                default;
                        break;
        }
}
function onMclickhandler(f){
        switch(f){
                case scenario001:
                        f.src="202.png";
                        bdp.playScenario("scenario001.js");
                        break;
                default;
                        break;
        }
}
</script>
</head>
<body>
        <img src="100.png"  id="menu"/>
        <img src="200.png"  id="scenario001"
                onMouseover="onMoverhandler(this)"
                onMouseout="onMouthandler(this)"
                onclick="onMclickhandler(this)"/>
</body>
</html>
```

Fig. 44

```
=====================
scenario001.js
=====================
function UOPControl(){
        var keyID=getPressedKey();
        switch(keyID){
                case menu:    //MENU KEY IS PRESSED
                                    WHILE SCENARIO001 IS BEING REPRODUCED
                        bdp.playScenario("scenario000.js");
                        break;
                default;
        }           break;
}
function playListEnded(){ //SINCE SCENARIO001 HAS BEEN REPRODUCED,
                          RETURNS TO SCENARIO000 (MENU SCREEN).
        bdp.playScenario("scenario000.js");
        return;
}
bdp.catchEvent("onPlayListEnded","PlayListEnded()");
bdp.catchEvent("onKeyPressed","UOPControl()");

bdp.playPlayList("00001.rpls");
=====================
```

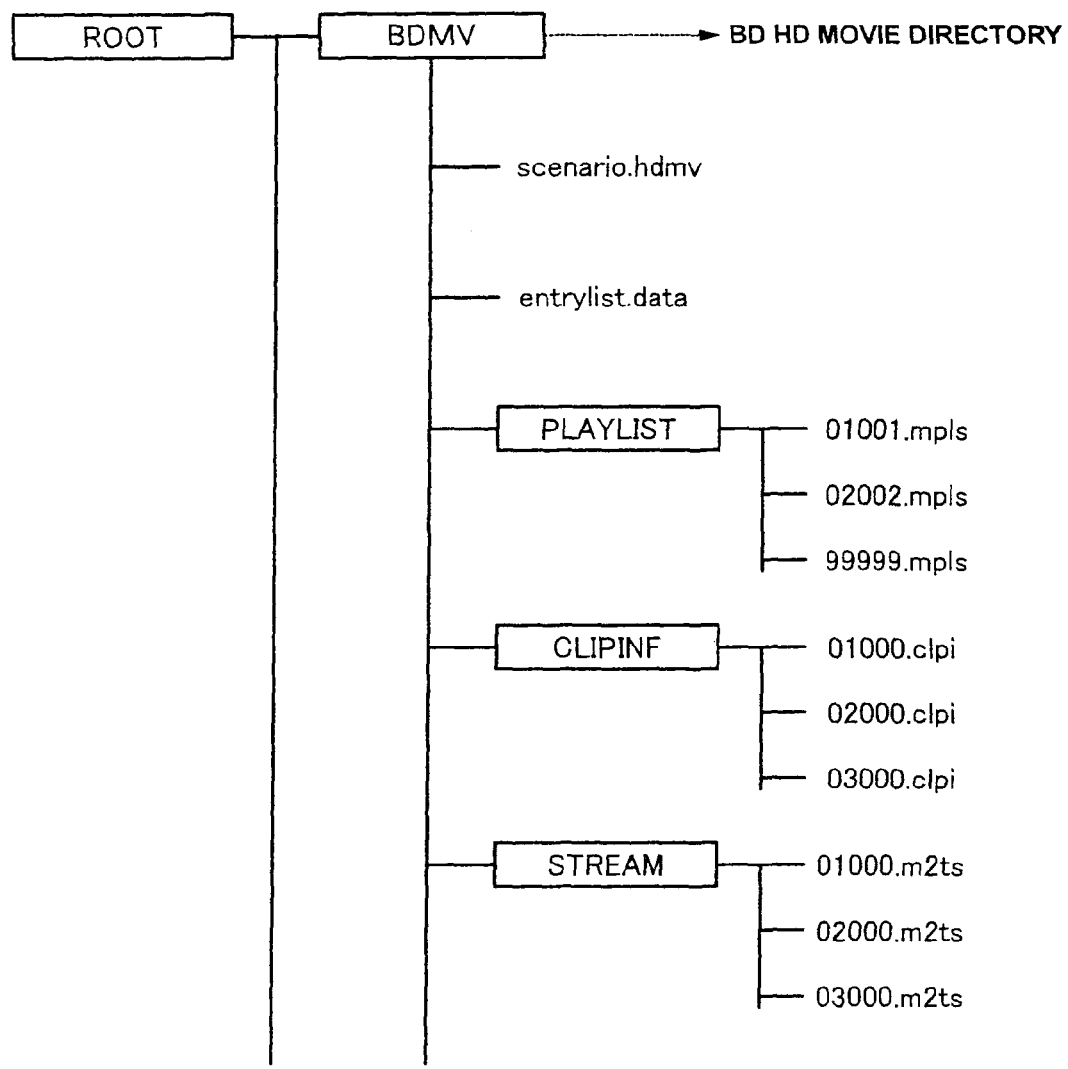

Fig. 46

| SYNTAX | DATA LENGTH (BITS) | MNEMONIC |
|---|---|---|
| scenario.hdmv{ | | |
|     type_indicator | 8*4 | bslbf |
|     version_number | 8*4 | bslbf |
|     scenario_start_address | 32 | |
|     reserved_for_future_use | 224 | bslbf |
|     Autoplay() | | |
|     for(i=0;i<N1;i++){ | | |
|         padding_word | 16 | bslbf |
|     } | | |
|     Scenario() | | |
|     for(i=0;i<N2;i++){ | | |
|         padding_word | 16 | bslbf |
|     } | | |
| } | | |

Fig. 47

| SYNTAX | DATA LENGTH (BITS) | MNEMONIC |
|---|---|---|
| Autoplay(){ | | |
|     length | 32 | uimsbf |
|     reserved | 16 | |
|     number_of_commands | 16 | |
|     for(i=0;i<number_of_commands;i++){ | | |
|         command(i) | 32 | uimsbf |
|     } | | |
| } | | |

Fig. 48

| SYNTAX | DATA LENGTH (BITS) | MNEMONIC |
|---|---|---|
| Scenario(){ | | |
|   length | 32 | |
|   flags | 32 | |
|   number_of_PlayLists | 16 | |
|   for(i=0;i<Number_of_PlayLists;i++){ | | |
|     Pre_Command_start_id | 32 | |
|     Post_Command_start_id | 32 | |
|     number_of_Pre_Commands | 32 | |
|     number_of_Post_Commands | 32 | |
|     reserved | | |
|     number_of_PlayItems | 32 | |
|     for(PlayItem_id=0;PlayItem_id<number_of_PlayItems;PlayItem_id++){ | | |
|       PI_Command_start_id | 32 | |
|       number_of_PI_Commands | 32 | |
|     } | | |
|     reserved | | |
|     // Command table for each PlayList | | |
|     number_of_PL_Commands | 16 | |
|     for(j=0;j<number_of_PL_Commands;j++){ | | |
|       PL_Command(j) | 32 | |
|     } | | |
|   } | | |
| } | | |

Fig. 49

| SYNTAX | DATA LENGTH (BITS) | MNEMONIC |
|---|---|---|
| entrylist.data{ | | |
|     type_indicator | 8*4 | bslbf |
|     version_number | 8*4 | bslbf |
|     ScenarioEntry_start_address | 32 | uimsbf |
|     reserved_for_future_use | 224 | bslbf |
|     AppInfo() | | |
|     for(i=0;i<N1;i++){ | | |
|         padding_word | 16 | bslbf |
|     } | | |
|     ScenarioEntry() | | |
|     for(i=0;i<N2;i++){ | | |
|         padding_word | 16 | bslbf |
|     } | | |
| } | | |

Fig. 50

| SYNTAX | DATA LENGTH (BITS) | MNEMONIC |
|---|---|---|
| AppInfo(){ | | |
|     length | 32 | uimsbf |
|     reserved_for_future_use | 16 | bslbf |
|     HDMV_name_character_set | 8 | bslbf |
|     reserved_for_word_align | 7 | bslbf |
|     PIN_valid_flag | 1 | bslbf |
|     PIN | 8*4 | bslbf |
| //    UOP_mask_table() // For directory | 64 | |
|     HDMV_name_length | 8 | uimsbf |
|     HDMV_name | 8*255 | bslbf |
| } | | |

Fig. 51

| SYNTAX | DATA LENGTH (BITS) | MNEMONIC |
|---|---|---|
| ScenarioEntry(){ | | |
| length | 32 | unimsbf |
| name_character_set | 8 | bslbf |
| // Entry PL for the Top Menu | | |
| Top Menu PL(){ | | |
| flags | 32 | bslbf |
| TopMenu_ref_to_PlayList_file_name | 8*10 | bslbf |
| TopMenu_ref_to_PlayItem_id | 16 | unimsbf |
| TopMenu_name_length | 8 | unimsbf |
| TopMenu_name | 8*255 | bslbf |
| } | | |
| // Title Entries | | |
| number_of_Titles | 16 | unimsbf |
| for(unit_title_number=0;title_number<Number_of_Titles;title_number++){ | | |
| flags | 32 | bslbf |
| Title_ref_to_PlayList_file_name | 8*10 | bslbf |
| Title_ref_to_PlayItem_id | 16 | unimsbf |
| Title_name_length | 8 | unimsbf |
| Title_name | 8*255 | bslbf |
| } | | |
| // Stream Setup Menu for each PL | | |
| number_of_PlayLists | 16 | unimsbf |
| for(i=0;i<Number_of_PlayLists;i++){ | | |
| SSMenu_flags | 32 | bslbf |
| SSMenu_ref_to_PlayList_file_name | 8*10 | bslbf |
| SSMenu_ref_to_PlayItem_id | 16 | unimsbf |
| } | | |
| } | | |

Fig. 52

| SYNTAX | DATA LENGTH (BITS) | MNEMONIC |
|---|---|---|
| xxxxx.mpls{ | | |
|     type_indicator | 8*4 | bslbf |
|     version_number | 8*4 | bslbf |
|     PlayList_start_address | 32 | unimsbf |
|     PlayListMark_start_address | 32 | unimsbf |
|     reserved_for_future_use | 192 | bslbf |
|     PLControlInfo() | | |
|     for(i=0;i<N1;i++){ | | |
|         padding_word | 16 | bslbf |
|     } | | |
|     PlayList() | | |
|     for(i=0;i<N2;i++){ | | |
|         padding_word | 16 | bslbf |
|     } | | |
|     PlayListMark() | | |
|     for(i=0;i<N3;i++){ | | |
|         padding_word | 16 | bslbf |
|     } | | |
| } | | |

*Fig. 53*

| SYNTAX | DATA LENGTH (BITS) | MNEMONIC |
|---|---|---|
| PLControlInfo(){ | | |
|     length | 32 | unimsbf |
|     reserved_for_future_use | 8 | bslbf |
|     PlayList_character_set | 8 | unimsbf |
|     reserved_for_future_use | 8 | |
|     PL_playback_type | 8 | |
|     if(PL_playback_type==0x2 \|\| | | |
|     PL_playback_type==0x3){ | | |
|         playback_count | 16 | |
|     }else{ | | |
|         reserved_for_word_align | 16 | |
|     } | | |
|     PL_UOP_mask_table() // For PlayList | 64 | |
|     reserved_for_word_align | 8 | |
|     PL_random_access_mode | 8 | |
|     reserved_for_word_align | 8 | bslbf |
|     PlayList_duration | 4*6 | bslbf |
|     PlayList_name_length | 8 | unimsbf |
|     PlayList_name | 8*255 | bslbf |
|     PlayList_detail_length | 16 | unimsbf |
|     PlayList_detail | 8*1200 | bslbf |
| } | | |

Fig. 54

| PL_playback_type | DESCRIPTION |
|---|---|
| 0x0 | RESERVED REGION |
| 0x1 | SEQUENTIALLY REPRODUCES PLAY ITEM (NORMAL REPRODUCTION). |
| 0x2 | RANDOMLY REPRODUCES PLAY ITEM. |
| 0x3 | SHUFFLE-REPRODUCES PLAY ITEM. |

Fig. 55

| PL_random_access_mode | DESCRIPTION |
|---|---|
| 0x0 | PERMITS JUMP-REPRODUCTION AND VARIABLE SPEED REPRODUCTION. |
| 0x1 | PROHIBITS JUMP-REPRODUCTION AND VARIABLE SPEED REPRODUCTION. |

Fig. 56

| SYNTAX | DATA LENGTH (BITS) | MNEMONIC |
|---|---|---|
| PlayList(){ | | |
|   length | 32 | uimsbf |
|   number_of_PlayItems | 16 | uimsbf |
|   number_of_SubPlayItems | 16 | uimsbf |
|   for(PlayItem_id=0;PlayItem_id<number_of_PlayItems;PlayItem_id++){ | | |
|     PlayItem() | | |
|   } | | |
|   for(SubPlayItem_id=0;SubPlayItem_id<number_of_SubPlayItems;SubPlayItem_id++){ | | |
|     SubPlayItem() | | |
|   } | | |
| } | | |

Fig. 57

| SYNTAX | DATA LENGTH (BITS) | MNEMONIC |
|---|---|---|
| PlayItem(){ | | |
|   length | 16 | uimsbf |
|   reserved_for_word_align | 8 | bslbf |
|   Clip_Information_file_name | 8*5 | bslbf |
|   Clip_codec_identifier | 8*4 | bslbf |
|   reserved_for_future_use | 7 | bslbf |
|   is_multi_angle | 1 | bslbf |
|   reserved_for_future_use | 4 | bslbf |
|   connection_condition | 4 | uimsbf |
|   ref_to_STC_id | 8 | uimsbf |
|   IN_time | 32 | uimsbf |
|   OUT_time | 32 | uimsbf |
|   PI_UOP_mask_table() | 64 | bslbf |
|   PID_filter() | | |
|   reserved_for_word_align | 8 | bslbf |
|   PI_random_access_mode | 8 | uimsbf |
|   reserved_for_word_align | 8 | bslbf |
|   still_mode | 8 | uimsbf |
|   if(still_mode==0x1){ | | |
|     still_time | 16 | uimsbf |
|   }else{ | | |
|     reserved_for_word_align | 16 | bslbf |
|   } | | |
|   // Angle | | |
|   if(is_multi_angle){ | | |
|     number_of_angles | 8 | uimsbf |
|     is_seamless_angle_change | 8 | uimsbf |
|     for(angle_id=1;angle_id<number_of_angles;angle_id++){ | | |
|       Clip_Information_file_name | 8*5 | bslbf |
|       ref_to_STC_id | 8 | uimsbf |
|       IN_time | 32 | uimsbf |
|       OUT_time | 32 | uimsbf |
|     } | | |
|   } | | |
| } | | |

Fig. 58

| PI_random_access_mode | DESCRIPTION |
|---|---|
| 0x0 | PERMITS JUMP REPRODUCTION AND VARIABLE SPEED REPRODUCTION. |
| 0x1 | PROHIBITS JUMP REPRODUCTION AND VARIABLE SPEED REPRODUCTION. |

Fig. 59

| still_mode | DESCRIPTION |
|---|---|
| 0x0 | NO STILL. |
| 0x1 | STILL FOR LIMITED TIME PERIOD. TIME PERIOD IS DESCRIBED IN STILL_TIME. |
| 0x2 | STILL FOR UNLIMITED TIME PERIOD. STILL IS CONTINUED UNTIL USER CANCELS IT. |
| 0x3-0xf | RESERVED. |

Fig. 60

| is_seamless_angle_change | DESCRIPTION |
|---|---|
| 0x0 | NONSEAMLESSLY CHANGEABLE ANGLES. |
| 0x1 | SEAMLESSLY CHANGEABLE ANGLES. |

Fig. 61

| SYNTAX | DATA LENGTH (BITS) | MNEMONIC |
|---|---|---|
| SubPlayItem(){ | | |
|     length | 16 | unimsbf |
|     Clip_Information_file_name | 8*5 | bslbf |
|     Clip_codec_identifier | 8*4 | bslbf |
|     reserved_for_future_use | 7 | bslbf |
|     is_repeat_flag | 1 | bslbf |
|     SubPlayItem_type | 8 | bslbf |
|     ref_to_STC_id | 8 | unimsbf |
|     SubPlayItem_IN_time | 32 | unimsbf |
|     SubPlayItem_OUT_time | 32 | unimsbf |
|     if(is_repeat_flag==0){ | | |
|         sync_PlayItem_id | 16 | unimsbf |
|         sync_start_PTS_of_PlayItem | 32 | unimsbf |
|     }else{ | | |
|         reserved_for_word_align | 16 | |
|         reserved_for_word_align | 32 | |
|     } | | |
| } | | |

Fig. 62

| is_repeat_flag | DESCRIPTION |
|---|---|
| 0 | PERFORMS REPRODUCTION IN SYNCHRONIZATION WITH MAIN PATH. |
| 1 | DOES NOT PERFORM REPRODUCTION IN SYNCHRONIZATION WITH MAIN PATH. REPEATS REPRODUCTION. |

Fig. 64

| SYNTAX | DATA LENGTH (BITS) | MNEMONIC |
|---|---|---|
| zzzzz.clpi { | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     reserved_for_future_use | 128 | bslbf |
|     ClipInfo() | | |
|     for(i=0;i<N1;i++){ | | |
|         padding_word | 16 | bslbf |
|     } | | |
|     SequenceInfo() | | |
|     for(i=0;i<N2;i++){ | | |
|         padding_word | 16 | bslbf |
|     } | | |
|     ProgramInfo() | | |
|     for(i=0;i<N3;i++){ | | |
|         padding_word | 16 | bslbf |
|     } | | |
|     CPI() | | |
|     for(i=0;i<N4;i++){ | | |
|         padding_word | 16 | bslbf |
|     } | | |
|     ClipMark() | | |
|     for(i=0;i<N5;i++){ | | |
|         padding_word | 16 | bslbf |
|     } | | |
| } | | |

Fig. 65

| SYNTAX | DATA LENGTH (BITS) | MNEMONIC |
|---|---|---|
| ClipInfo(){ | | |
| length | 32 | unimsbf |
| reserved | 8 | bslbf |
| application_type | 8 | unimsbf |
| Clip_stream_type | 8 | unimsbf |
| reserved | 40 | unimsbf |
| TS_recording_rate | 32 | unimsbf |
| num_of_source_packets | 32 | unimsbf |
| BD_system_use | 1024 | bslbf |
| TS_type_info_block() | | |
| } | | |

Fig. 66

| application_type | DESCRIPTION |
|---|---|
| 0 | CORRESPONDING M2TS FILE DOES NOT COMPLY WITH RULE OF HDMV TRANSPORT STREAM. |
| 1 | CORRESPONDING M2TS FILE COMPLIES WITH RULE OF HDMV TRANSPORT STREAM (NORMAL HDMV STREAM). |
| 2 | CORRESPONDING M2TS FILE COMPLIES WITH RULE OF HDMV TRANSPORT STREAM FOR STILL PICTURE THAT SYNCHRONIZES WITH AUDIO REPRODUCTION. (TIME BASE SLIDE SHOW) |
| 3 | CORRESPONDING M2TS FILE COMPLIES WITH RULE OF HDMV TRANSPORT STREAM FOR STILL PICTURE THAT IS REPRODUCED IN SYNCHRONIZATION WITH HDMV TRANSPORT STREAM. (BROWSABLE SLIDE SHOW) |

Fig. 67

| SYNTAX | DATA LENGTH (BITS) | MNEMONIC |
|---|---|---|
| SequenceInfo() { | | |
|   length | 32 | unimsbf |
|   reserved_for_word_align | 8 | bslbf |
|   num_of_ATC_sequences | 8 | unimsbf |
|   for(atc_id=0;atc_id<num_of_ATC_sequences;atc_id++) { | | |
|     SPN_ATC_start[atc_id] | 32 | unimsbf |
|     num_of_STC_sequences[atc_id] | 8 | unimsbf |
|     offset_STC_id[atc_id] | 8 | unimsbf |
|     for(stc_id=offset_STC_id[atc_id];stc_id<(num_of_STC_sequences[atc_id]+offset_STC_id[atc_id]);stc_id++) { | | |
|       PCR_PID[atc_id][stc_id] | 16 | unimsbf |
|       SPN_STC_start[atc_id][stc_id] | 32 | unimsbf |
|       presentation_start_time[atc_id][stc_id] | 32 | unimsbf |
|       presentation_end_time[atc_id][stc_id] | 32 | unimsbf |
|     } | | |
|   } | | |
| } | | |

Fig. 68

| SYNTAX | DATA LENGTH (BITS) | MNEMONIC |
|---|---|---|
| ProgramInfo(){ | | |
|   length | 32 | unimsbf |
|   reserved_for_word_align | 8 | bslbf |
|   num_of_program_sequences | 8 | unimsbf |
|   for(i=0;i<num_of_program_sequences;i++){ | | |
|     SPN_program_sequence_start [i] | 32 | unimsbf |
|     program_map_PID [i] | 16 | bslbf |
|     num_of_streams_in_ps [i] | 8 | unimsbf |
|     num_of_groups [i] | 8 | unimsbf |
|     for(stream_index=0;stream_index<num_of_streams_in_ps[i];stream_index++){ | | |
|       stream_PID [i] [stream_index] | 16 | unimsbf |
|       StreamCodingInfo(i,stream_index) | | |
|     } | | |
|   } | | |
| } | | |

Fig. 69

| SYNTAX | DATA LENGTH (BITS) | MNEMONIC |
|---|---|---|
| StreamCodingInfo(i,stream_index){ | | |
| length | 8 | bslbf |
| stream_coding_type | 8 | unimsbf |
| if(stream_coding_type==0x02){ | | |
| video_format | 4 | unimsbf |
| frame_rate | 4 | unimsbf |
| aspect_ratio | 4 | unimsbf |
| reserved_for_word_align | 2 | bslbf |
| cc_flag | 1 | unimsbf |
| reserved_for_word_align | 1 | bslbf |
| }else if(stream_coding_type==0x80//stream_coding_type==0x81//stream_coding_type==0x82){ | | |
| audio_presentation_type | 4 | unimsbf |
| sampling_frequency | 4 | unimsbf |
| language_code | 16 | bslbf |
| reserved_for_word_align | 8 | bslbf |
| }else if(stream_coding_type==0x90){ | | |
| language_code | 16 | bslbf |
| T.B.D | | |
| }else if(stream_coding_type==0xA0 ){ | | |
| language_code | 16 | bslbf |
| T.B.D | | |
| } | | |
| } | | |

Fig. 70

| SYNTAX | DATA LENGTH (BITS) | MNEMONIC |
| --- | --- | --- |
| CPI() { | | |
| length | 32 | unimsbf |
| reserved_for_word_align | 12 | bslbf |
| CPI_type | 4 | unimsbf |
| EP_map_for_BDMV() | | |
| } | | |

Fig. 71

| CPI_type | DESCRIPTION |
| --- | --- |
| 0 | RESERVED FOR FUTURE USE |
| 1 | EP_map TYPE |
| 2 | TU_map TYPE |
| 3-7 | RESERVED FOR FUTURE USE |
| 8 | EP_map TYPE FOR BDMV |
| 9-15 | RESERVED FOR FUTURE USE |

Fig. 72

| SYNTAX | DATA LENGTH (BITS) | MNEMONIC |
|---|---|---|
| EP_map_for_one_stream_PID(EP_stream_type,Nc,Nf){ | | |
|   EP_fine_table_start_address | 32 | unimsbf |
|   for(i=0;i<Nc;i++){ | | |
|     ref_to_EP_fine_id[i] | 18 | unimsbf |
|     PTS_EP_coarse[i] | 14 | unimsbf |
|     SPN_EP_coarse[i] | 32 | unimsbf |
|   } | | |
|   for(i=0;i<X;i++){ | | |
|     padding_word | 16 | bslbf |
|   } | | |
|   for(EP_fine_id=0;EP_fine_id<Nf;EP_fine_id++){ | | |
|     is_angle_change_point[EP_fine_id] | 1 | bslbf |
|     I_end_position_offset[EP_fine_id] | 3 | bslbf |
|     PTS_EP_fine[EP_fine_id] | 11 | unimsbf |
|     SPN_EP_fine[EP_fine_id] | 17 | unimsbf |
|   } | | |
| } | | |

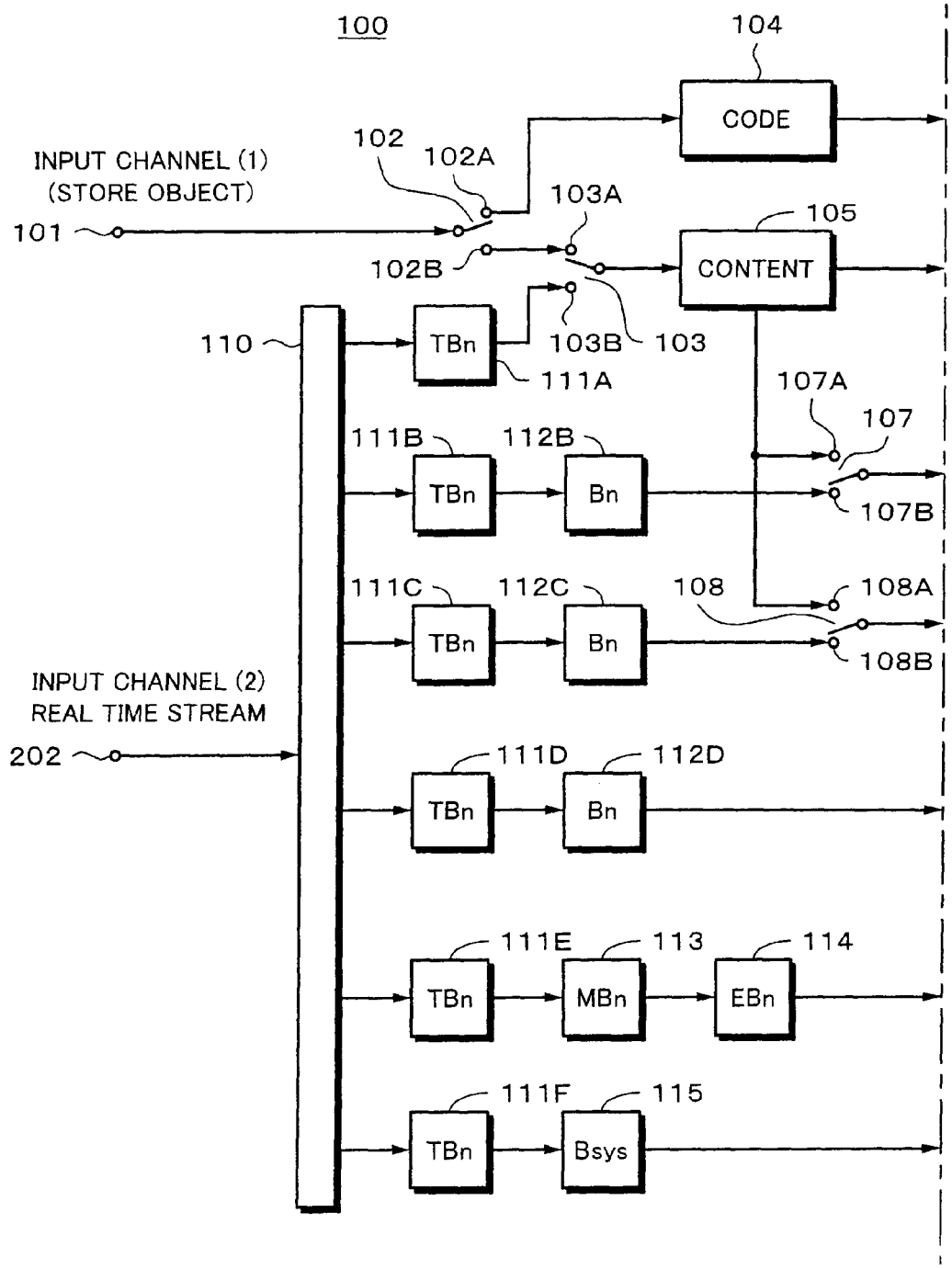

| TYPE OF OBJECT | RELATION OF PICTURE DISPLAYED ON MOVING PICTURE PLANE | DATA STRUCTURE | PLANE ON WHICH OBJECT IS DISPLAYED |
|---|---|---|---|
| SUBTITLES | SYNCHRONOUS TYPE | GRAPHICS OBJECT (GOBJ) | SUBTITLE PLANE |
| SYNCHRONOUS GRAPHICS | | | GRAPHICS PLANE |
| ASYNCHRONOUS GRAPHICS | ASYNCHRONOUS TYPE | ANY FORMAT | |

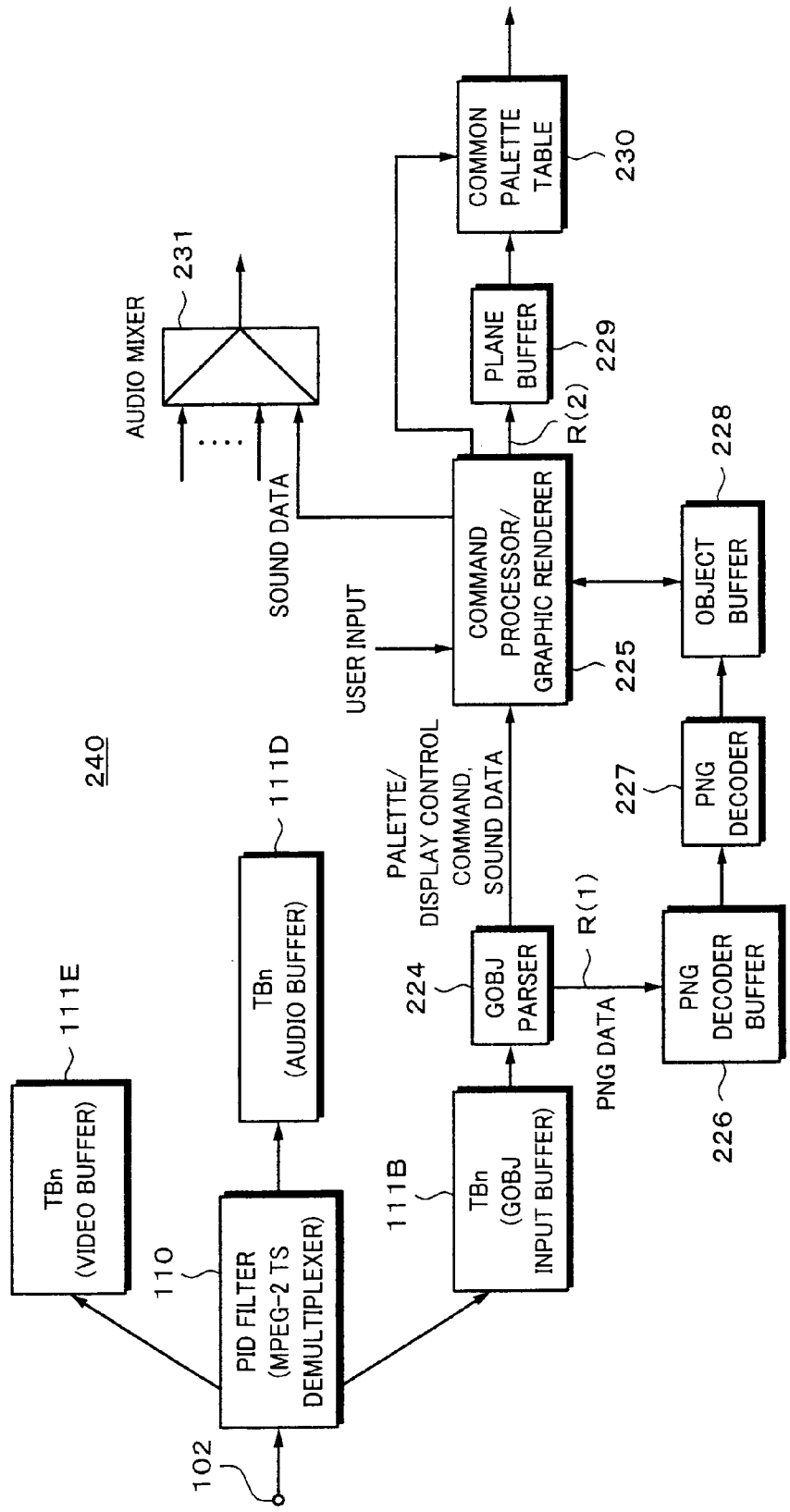

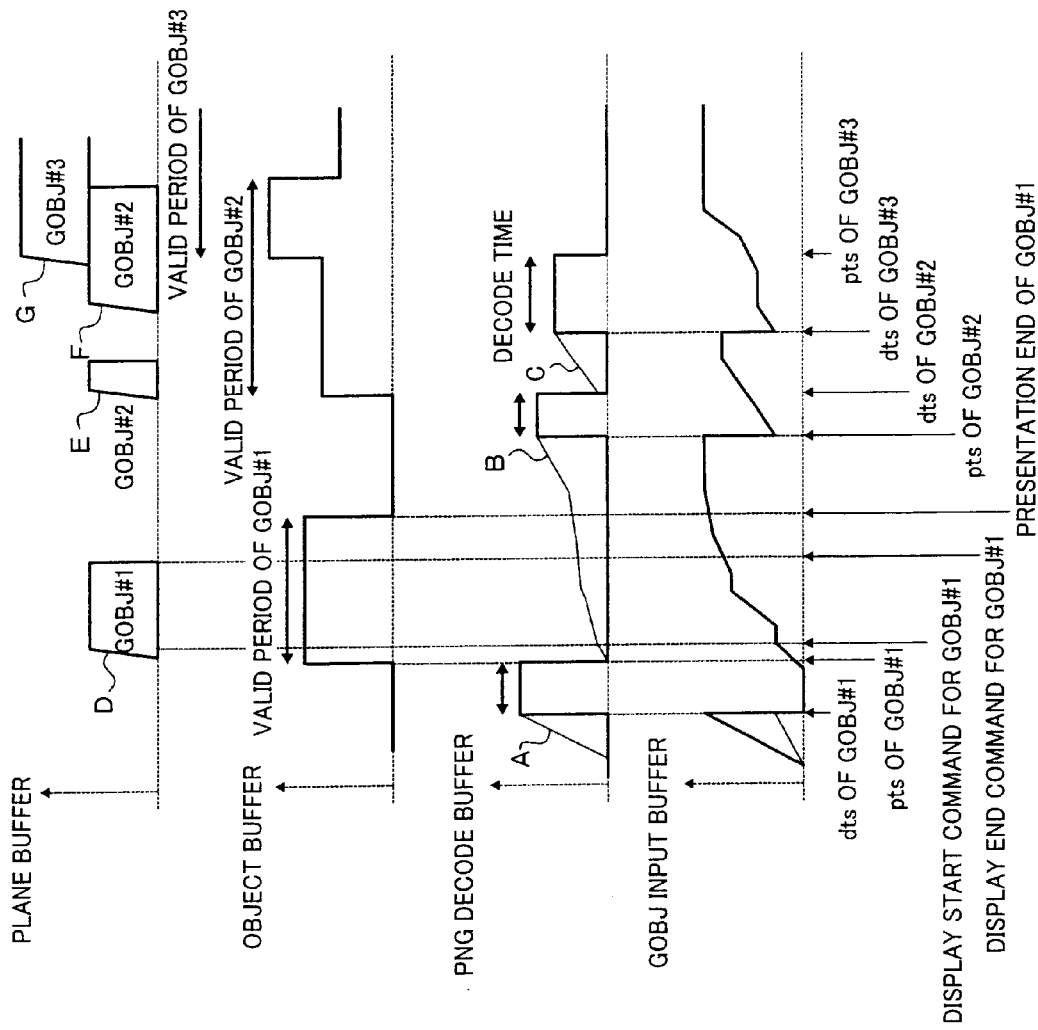

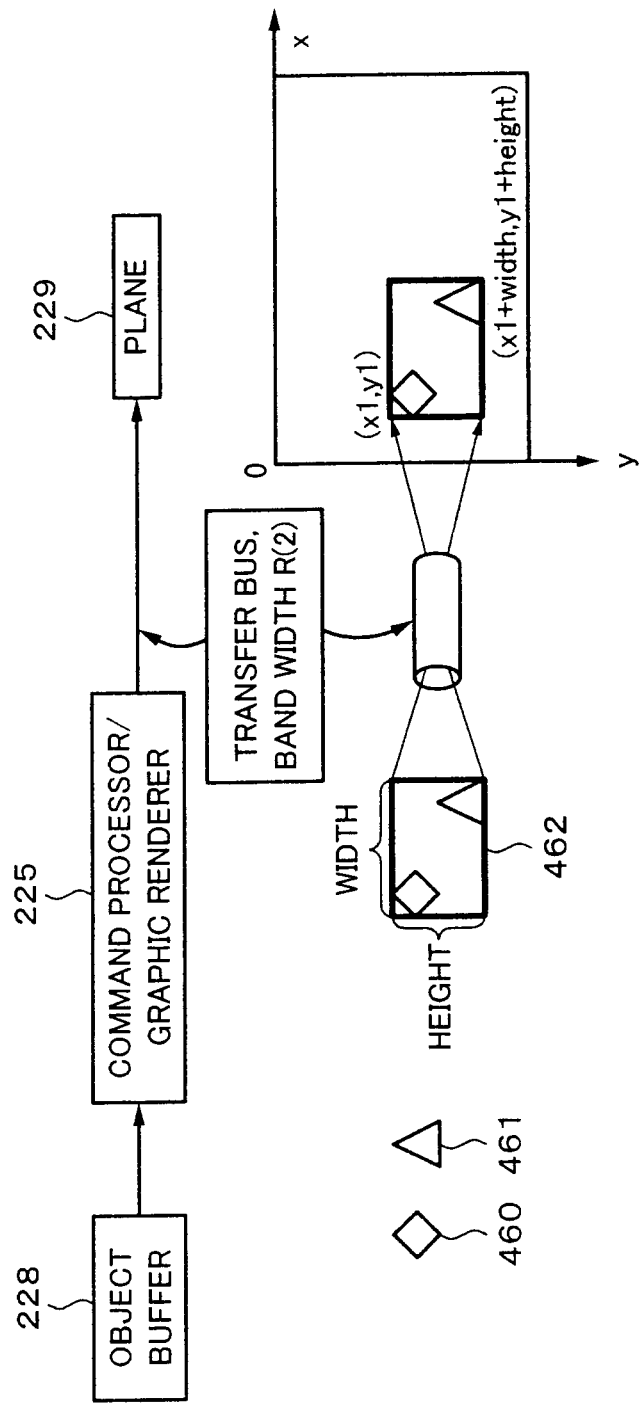

Fig. 83

| SYNTAX | DATA LENGTH (BITS) | MNEMONIC |
|---|---|---|
| GraphicsObject(){ | | |
|   GraphicsObjectHeader(){ | | |
|     length | 8 | unimsbf |
|     reserved | 7 | |
|     presentation_end_time_stamp | 33 | unimsbf |
|     number_of_PNG_images | 8 | unimsbf |
|     number_of_DispCmds | 8 | unimsbf |
|     GlobalPaletteTable() | | |
|     for(i=0;i<Number_of_PNGs;i++){ | | |
|       start_address_of_PNG_image(i) | 32 | unimsbf |
|       PNG_file_name(i) | 8*32 | bslbf |
|     } | | |
|     for(=0;i<Number_of_DispCmds;++){ | | |
|       start_address_of_PNG_Cmds(i) | 32 | unimsbf |
|     } | | |
|   } | | |
|   for(i=0;i<N1;i++){ | | |
|     padding_word | 32 | bslbf |
|   } | | |
|   GOBJCommandTable(){ | | |
|     for(i=0;i<Number_of_DispCmds;i++){ | | |
|       DispCmds(i) | | |
|     } | | |
|   } | | |
|   for(i=0;i<N2;i++){ | | |
|     padding_word | 32 | bslbf |
|   } | | |
|   PNGImageRegion (){ | | |
|     for(i=0;i<Number_of_PNGs;i++){ | | |
|       PNG_image(i) | | |
|     } | | |
|   } | | |
|   for(i=0;i<N3;i++){ | | |
|     padding_word | 32 | bslbf |
|   SoundDataRegion (){ | | |
|   } | | |
|     for(i=0;i<Number_of_sound_data;i++){ | | |
|       sound_data(i) | | |
|     } | | |
|   } | | |
| } | | |

*Fig. 84*

| SYNTAX | DATA LENGTH (BITS) | MNEMONIC |
|---|---|---|
| GlobalPaletteTable(){ | | |
|     reserved_for_future_use | 8 | bslbf |
|     number_of_palette_entries | 8 | unimsbf |
|     for(i=0;i<Number_of_palette_entries;i++){ | | |
|         palette_index_number | 8 | unimsbf |
|         red_value | 8 | unimsbf |
|         green_value | 8 | unimsbf |
|         bule_value | 8 | unimsbf |
|         alpha | 8 | unimsbf |
|     } | | |
| } | | |

Fig. 85A

| Fig. 85 |
|---|
| Fig. 85A |
| Fig. 85B |

| DISPLAY CONTROL COMMAND | DESCRIPTION |
|---|---|
| (1) execution_time(start_time) | COMMAND THAT CAUSES THE FOLLOWING COMMANDS UNTIL NEXT execution_time (start_time) TO BE EXECUTED AT TIME DESIGNATED BY start_time. START POINT OF start_time IS pts (presentation time stamp) OF GRAPHICS OBJECT. UNIT OF start_time IS SAME AS UNIT OF pts. |
| (2) fade_in(fade_in_time) | COMMAND THAT CAUSES GRAPHICS OBJECT TO BE DISPLAYED. COMMAND CAUSES VALUE OF INTRANSPARENCY OF CURRENT PALETTE TABLE TO BE GRADUALLY DECREASED AND TO BE SET TO 0 (TRANSPARENT) AFTER fade_in_time. WHEN VALUE OF fade_in_time IS 0, GRAPHICS OBJECT IS IMMEDIATELY DISPLAYED IN COLORS AND TRANSPARENCY OF PALETTE TABLE. |
| (3) fade_out(fade_out_time) | COMMAND THAT CAUSES GRAPHICS OBJECT TO BE CLEARED. COMMAND CAUSES INITIAL VALUE OF INTRANSPARENCY TO BE GRADUALLY INCREASED FROM 0 AND SET TO VALUE OF PALETTE TABLE AFTER fade_out_time. WHEN fade_out_time IS 0, GRAPHICS OBJECT IS IMMEDIATELY CLEARED. |

Fig. 85B

| DISPLAY CONTROL COMMAND | DESCRIPTION |
|---|---|
| (4) change_palette (index, newR, newG, newB, newAlpha) | COMMAND THAT CAUSES COLORS OF PALETTE NUMBER index AND INTRANSPARENCY TO BE CHANGED TO (newR, newG, newB) AND newAlpha, RESPECTIVELY. |
| (5) set_display_box(x1,y1,x2,y2) | COMMAND THAT CAUSES GRAPHICS OBJECT TO BE PLACED IN SQUARE REGION DEFINED BY (x1, y1, x2, y2) ON PLANE. |
| (6) set_clipping_box(a1,b1,a2,b2) | COMMAND THAT CAUSES SQUARE REGION DEFINED BY (a1, b1, a2, b2) OF GRAPHICS OBJECT TO BE DISPLAYED ON PLANE. |
| (7) play_sound(sound_id) | COMMAND THAT CAUSES SOUND DATA DESIGNATED BY sound_id TO BE REPRODUCED. |
| (8) set_sound(PNG_image_id,sound_id) | COMMAND THAT CAUSES SOUND DATA TO BE ASSIGNED TO PNG DATA. COMMAND CAUSES SOUND DATA DESIGNATED BY sound_id TO BE REPRODUCED WHEN PNG DATA DESIGNATED BY PNG_image_id IS DISPLAYED. PNG_image_id IS SAME AS i (LOOP COUNTER) OF PNG_image(i) OF SYNTAX. |

Fig. 86A
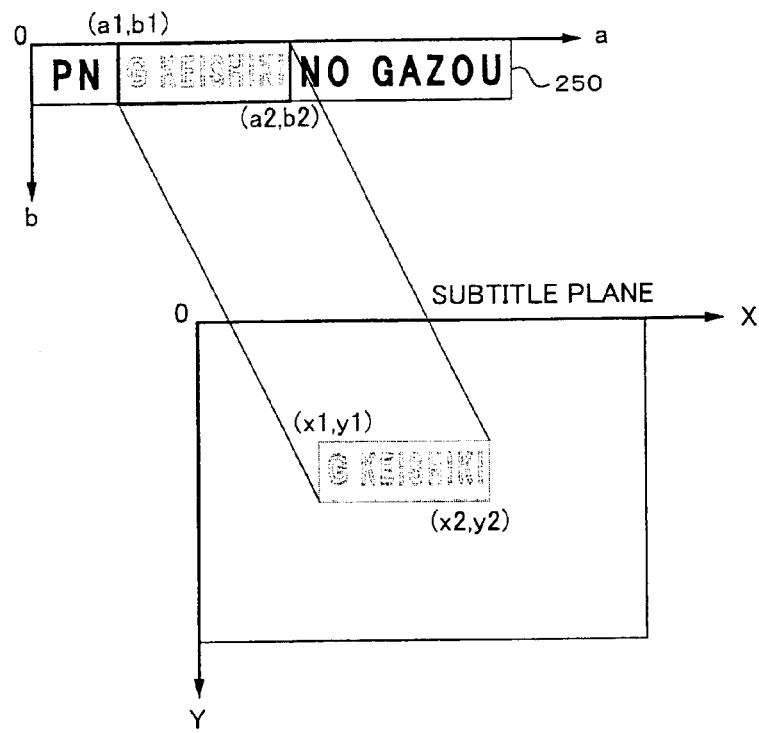
Fig. 86B
Fig. 87
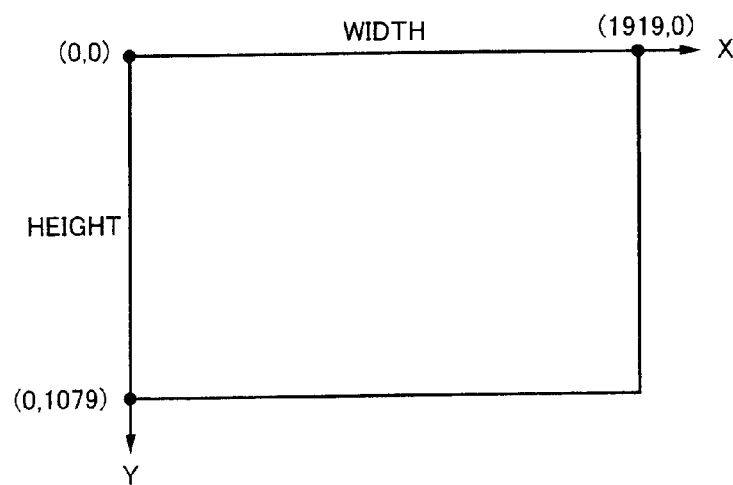

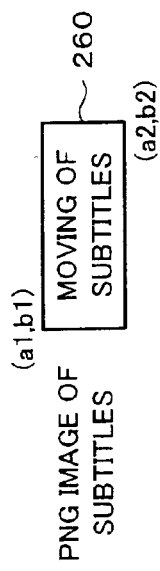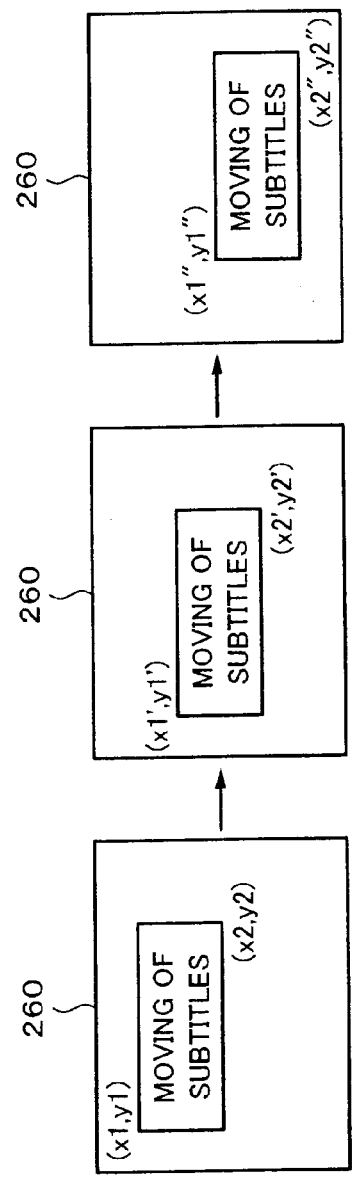
Fig. 90A
Fig. 90B

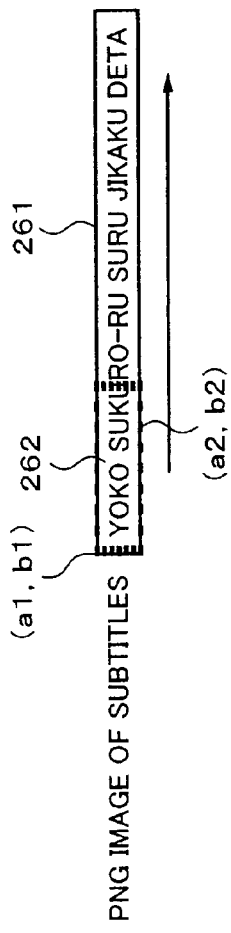
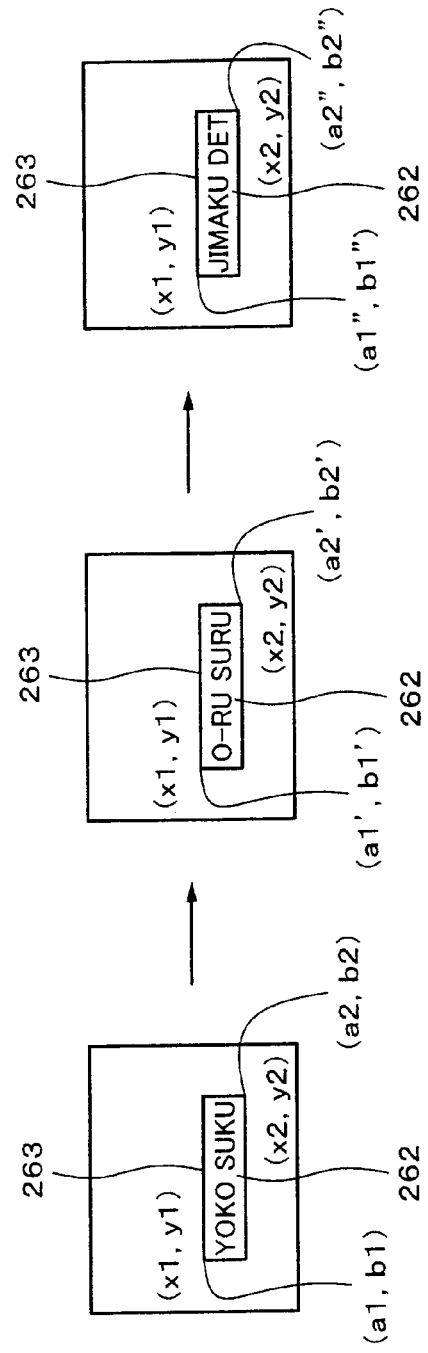
Fig. 91A
Fig. 91B

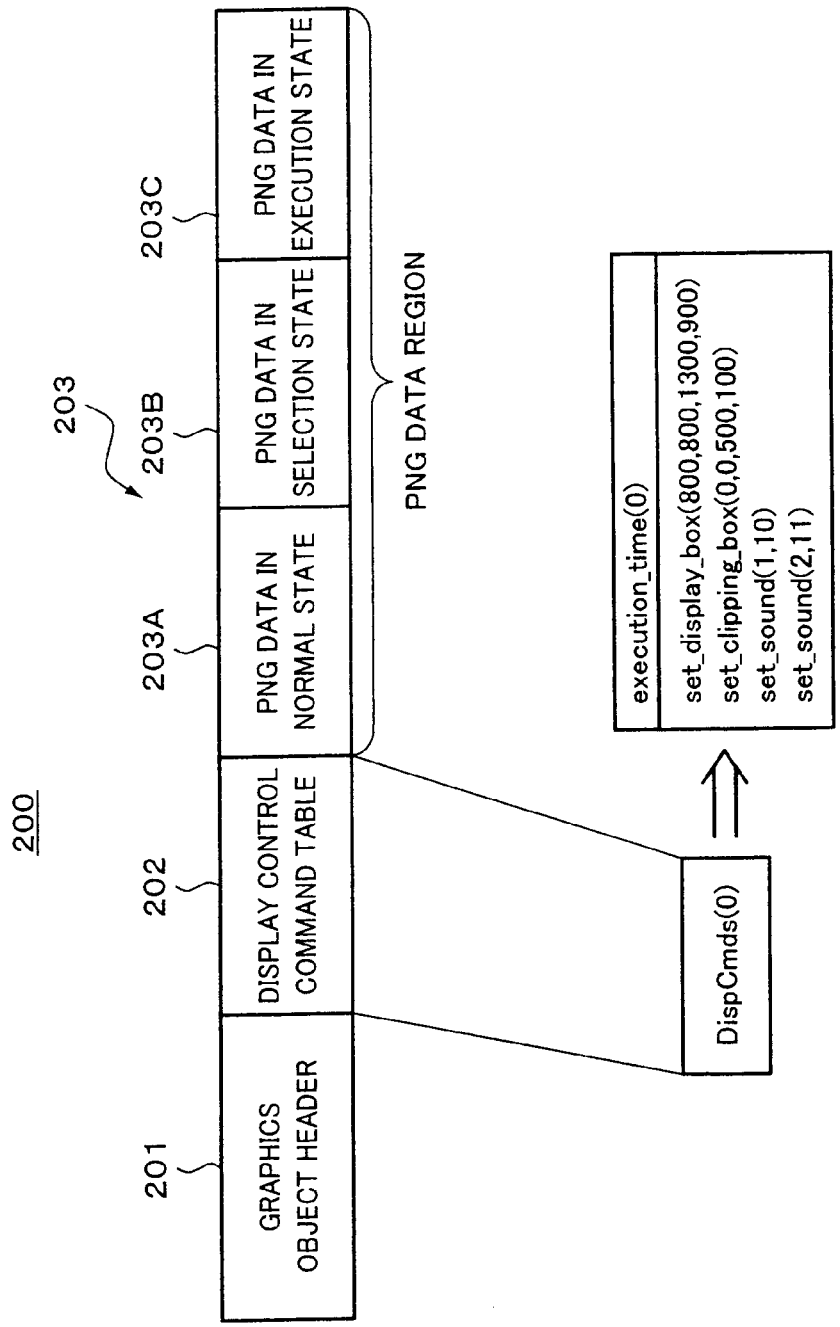

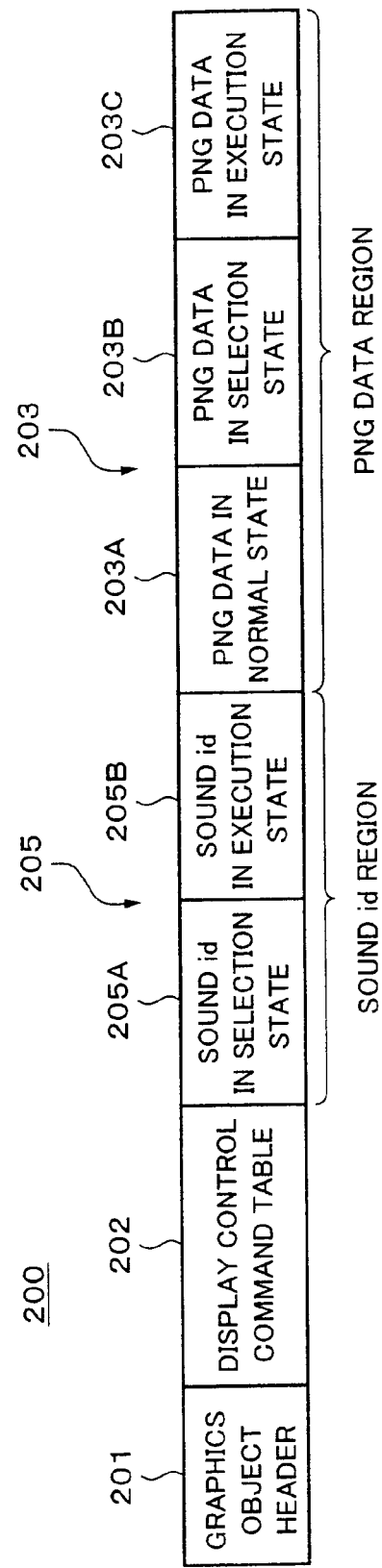

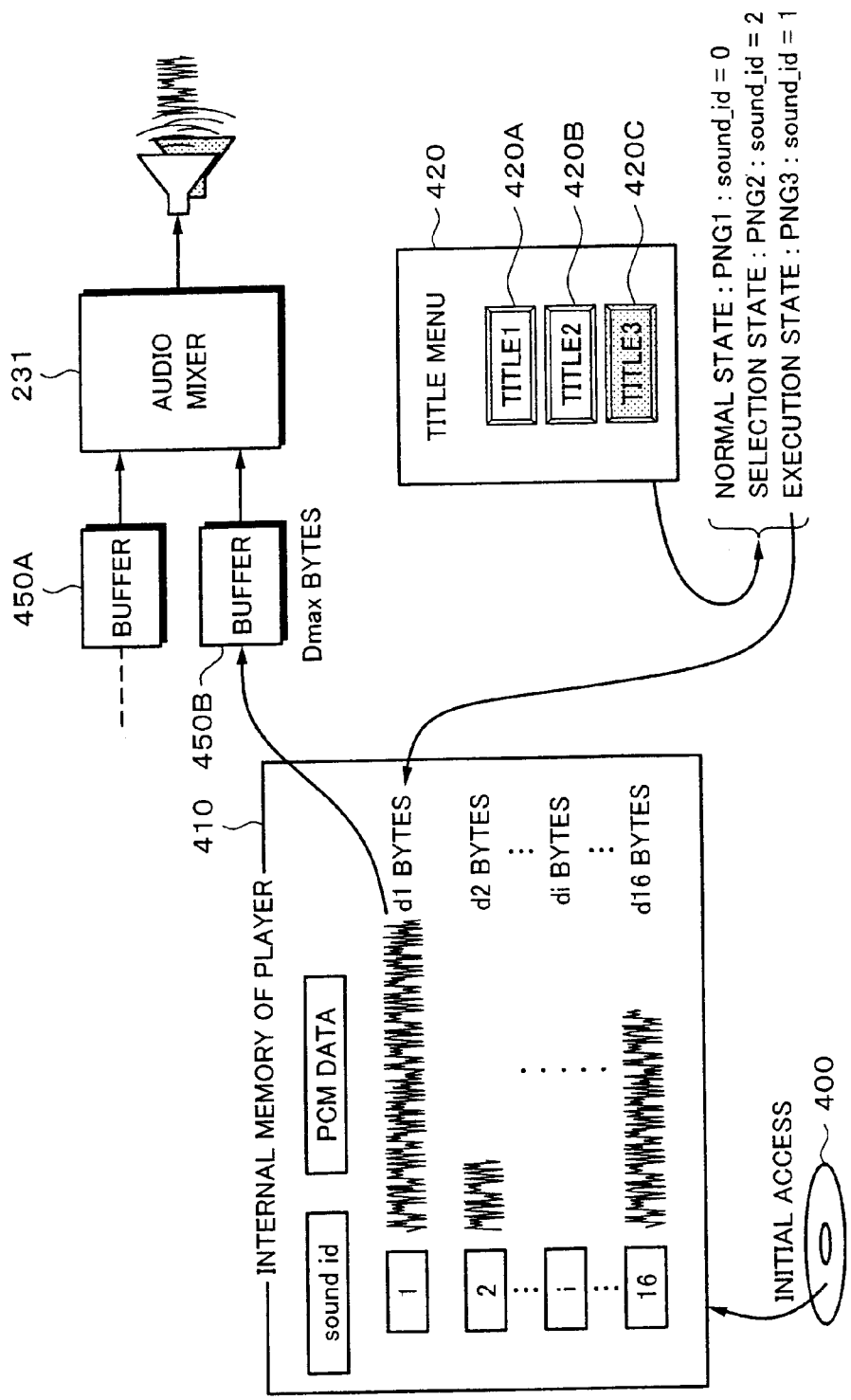

REPRODUCING APPARATUS, REPRODUCING METHOD, REPRODUCING PROGRAM, AND RECORDING MEDIUM

CROSS-REFERENCE TO RELATED APPLICATIONS

This application is a continuation application of, and claims the benefit of priority under 35 U.S.C. §120 from, U.S. application Ser. No. 10/498,823, filed Jun. 23, 2004, now U.S. Pat. No. 8,150,237 herein incorporated by reference, which is a National Stage Application of International Application No. PCT/JP03/14511, filed Nov. 14, 2003, which claims the benefit of priority under 35 U.S.C. §119 from Japanese Patent Application Nos. 2002-346133, filed Nov. 28, 2002; 2003-022551, filed Jan. 30, 2003 and 2003-074441, filed Mar. 18, 2003.

TECHNICAL FIELD

The present invention relates to a reproducing apparatus, a reproducing method, a reproducing program, and a recording medium that allow a user to interactively operate a program recorded on a large capacity recording medium such as a blu-ray disc.

BACKGROUND ART

In recent years, as a standard for a recordable disc type recording medium that is detachable from a recording and reproducing apparatus, a blu-ray disc standard has been proposed. The blu-ray disc standard prescribes a disc that has a recording medium having a diameter of 12 cm and a cover layer having a thickness of 0.1 mm. The blu-ray disc standard uses a bluish-purple laser having a wavelength of 405 nm and an objective lens having a numerical aperture of 0.85. The blu-ray disc standard accomplishes a recording capacity of 27 GB (Giga bytes) maximum. As a result, a program of a BS digital high-vision broadcast available in Japan can be recorded for two hours or longer without deterioration of picture quality.

As sources (supply sources) of AV (Audio/Video) signals recorded on the recordable optical disc, an analog signal of for example a conventional analog television broadcast and a digital signal of for example a digital television broadcast such as a BS digital broadcast will be used. The blu-ray disc standard has established a method for recording AV signals of such broadcasts.

As a derivative standard of the current blu-ray disc standard, a reproduction-only recording medium on which a movie, music, or the like is prerecorded is being developed. As a disc-shaped recording medium on which a movie or music is prerecorded, DVD (Digital Versatile Disc) has been widely used. The reproduction-only optical disc in accordance with the blu-ray disc standard is largely different from and superior to the conventional DVD in a large recording capacity and a high speed transfer speed that allow a high-vision picture to be recoded for two hours or longer in high quality.

The current blu-ray disc standard prescribes neither a method for displaying a list of video contents of a disc on a screen nor a user interface function for allowing a user to move a cursor on the list and select a video content that he or she wants to reproduce from the list. These functions are accomplished by a recording and reproducing apparatus main unit that records and reproduces video contents to and from the blu-ray disc. Thus, even if a video content is reproduced from the same recording medium, the layout of the contents list screen depends on the recording and reproducing apparatus for use, and so does the user interface. Thus, the user cannot easily use the blu-ray disc. Thus, it is necessary to allow the reproduction-only disc to display a menu screen and so forth that the disc (contents) producer has designed, not depend on the reproducing apparatus.

A multiple story function of which a selection screen is displayed while a video content is being reproduced is generally called an interactive function. To accomplish the interactive function, it is necessary for the disc producer to create a scenario that he or she has designated a reproduction order and branches of the video content, describe the scenario using a program language, a script language, or the like, and record the described scenario on a disc. The reproducing apparatus side reads and executes the scenario. As a result, the reproducing apparatus reproduces a video content and displays selection screens that allow the user to select branches of the video content that the producer has designated.

The current blu-ray disc standard (blu-ray disc rewritable format ver 1.0) prescribes neither a method for composing a menu screen and a branch selection screen that a contents producer has designated, nor a method for describing a process for a user input. Currently, it is difficult to reproduce a video content from a blu-ray disc in accordance with a scenario that the producer has designated with compatibility irrespective of manufactures and models of reproducing apparatuses.

For a reproduction-only disc, the producer side desires a multiple angle function for allowing a user to select one of angles of an object photographed by a plurality of cameras so that the user can watch the object at his or her favorite angle. Thus, it is necessary to provide such a function.

For a reproduction-only disc, a function for displaying subtitles is essential. However, the current blu-ray disc standard does not prescribe the function for describing subtitles.

The foregoing interactive function has been already accomplished in for example the DVD (Digital Versatile Disc) standard. In the DVD video, while a moving picture is being reproduced, a menu screen is called using for example a remote control commander. By selecting a button displayed on a menu screen, the user can perform a process for changing the current scene that is being reproduced. The DVD standard also prescribes a function for displaying subtitles. That function allows the user to switch Japanese subtitles to English subtitles or vice versa that have been prepared. In addition, the DVD video also has a multiple angle function.

In the case of the DVD, a menu screen is composed of a fixed sub picture. When the menu screen is called, it is displayed in such a manner that the sub picture is combined with a moving picture. Japanese Patent Laid-Open Publication No. HEI 10-308924 describes a structure for combining sub picture data with moving picture data and recording the combined data on a recordable DVD.

Next, an example of a menu screen according to the related art reference will be described in brief. Before a movie main part is reproduced from a DVD by a reproducing apparatus, a menu screen is displayed. Generally, a plurality of buttons are disposed on the menu screen. Each button is assigned a predetermined operation. When the user selects a button and causes the operation of the selected button to be executed, the operation assigned to the selected button is executed. When the user selects a button "movie main part" and causes the operation of the selected button to be executed, the operation assigned to the button is executed. As a result, the movie main part is reproduced from the DVD.

The user operates keys (direction keys) assigned to up, down, left, and right directions with the remote control commander (hereinafter referred to as remote controller) so as to select one button displayed on the menu screen. Thereafter, with an OK key, the user causes the operation assigned to the selected button to be executed. Each button has three states that are a normal state (non-selection state), a selection state, and an execution state. To allow the user to easily distinguish them, they have different images and colors. Generally, there is only one button that is placed in the selection state or the execution state.

In the DVD video, each button is displayed with two types of data called sub picture and highlight. FIG. 1 shows an example of a DVD menu screen 300 according to a related art reference. The menu screen 300 is referred to as "title menu". The menu screen 300 has three buttons 301A, 301B, and 301C that represent "move main part play", "bonus picture", and "sound setting", respectively. In the example shown in FIG. 1, the color of an outer frame of the "movie main part play" button 301A has been changed from the original color. That describes that the "movie main part play" button 301A has been placed in the selection state.

In such a state, when the user operates the direction keys on the remote controller, for example as shown in FIG. 2A, FIG. 2B, and FIG. 2C, he or she can causes another button to be placed in the selection state. Like the case shown in FIG. 1, the color of the outer frame of the button that has been selected is different from the colors of the outer frames of the other buttons that have not been selected (non-selected buttons). In the state shown in FIG. 1, when the user operates an OK button disposed on the remote controller, as shown in FIG. 3, the color of the "movie main part play" button 301A is changed to a color that represents the execution state. Thereafter, the menu screen 300 is cleared and the movie main part is reproduced. The foregoing is a basic operation of buttons of the DVD video.

The menu screen 300 as shown in FIG. 1 is composed of three types of data that are a background picture 310, a sub picture 311, and a highlight 312. The background picture 310 is a still picture, a moving picture of a content main part prerecorded on the DVD, or the like.

As shown in FIG. 5, the sub picture 311 has one bit map picture, four color information (A0, B0, C0, and D0), and coordinates (X, Y). The bit map picture is represented with information of two bits per pixel. The coordinates (X, Y) represent the display start position of the sub picture 311. Each of the color information A0, B0, C0, and D0 is one-color information data composed of one set of R (Red), G (Green), and B (Blue) data. Each of colors R, G, and B has information of eight bits. The bit map picture has information of two bits per pixel. With two bits, one is selected from the foregoing four-color information (A0, B0, C0, D0) for each pixel. Color information also has transparency data. The sub picture 311 may have a region in which the background picture 310 is transparent. The display position of the upper left corner of the sub picture 311 is represented with coordinates (X, Y) relative to the background picture 310.

The sub picture 311 may have information that represents a display start time and a display end time and commands that cause visual effects such as fade-in and fade-out to be applied to the sub picture 311.

In the DVD video, a plurality of bit map pictures cannot be displayed at the same time. Thus, the menu screen 300 on which the plurality of buttons as shown in FIG. 1 are placed is displayed with one large bit map picture that has three button images as shown in FIG. 4B. In the bit map picture of the sub picture 311 shown in FIG. 4B, when a region outside the buttons 301A, 301B, and 301C is designated as a transparent region and the sub picture 311 is combined with the background picture 310, the background picture 310 becomes transparent outside the display regions of the buttons 301A, 301B, and 301C.

The highlight 312 is information used to change four colors used for the sub picture 311 to other four colors. As shown in FIG. 5, as color information, the highlight 312 has color information (A1, B1, C1, D1) of a selection state and color information (A2, B2, C2, D2) of an execution state. These color information is four-color information represented with RGB of eight bits each like the foregoing sub picture 311.

The highlight 312 has a set of coordinates of regions in which colors are changed. The range of which colors are changed is not limited to all the sub picture 311, but a part of the sub picture 311 as a square region. The number of square regions in the sub picture 311 of which colors are changed by the highlight 312 corresponds to the number of buttons that the user can select. The display position of each square region is represented by coordinates (X, Y) of the positions of the upper left corner and the lower left corner thereof. For example, the position of the highlight 312A corresponding to the button 301A is represented by coordinates (X1, Y1) and (X1', Y1'). That applies to the highlights 312B and 312C corresponding to the buttons 301B and 301C, respectively.

For example, in the highlight 312A, color information (A0, B0, C0, D0) of a region represented by coordinates (X1, Y1) and (X1', Y1') of the background picture 310 is changed to color information (A1, B1, C1, D1) designated as a color of a selection state. At that point, the color information A0 of the background picture 310 is changed to color information A1 of the highlight 312A. Likewise, the color information B0 of the background picture 310 is changed to the color information B1. The color information C0 is changed to the color information C1. The color information D0 is changed to the color information D1.

Next, an example of a color change of the highlight 312 will be described corresponding to a change of a state of the button 301A on the menu screen 300 described with reference to FIG. 1, FIG. 2A, FIG. 2B, FIG. 2C, and FIG. 3. It is assumed that when the button 301A is in the non-selection state, the frame, front surface, and characters of the button 301A are displayed with the color information B0, the color information C0, and the color information D0, respectively. When the button 301A is placed in the selection state, the frame color B0 of the button 301A is changed to the color information B1 corresponding to the selection state of the highlight 312A. At that point, the front surface color C0 and the character color D0 are not changed. Thereafter, when the button 301A is placed in the execution state, the front surface color C0 of the button 301A, which is the color of the selection state, is changed to the color information C1. At that point, the frame color B1 and the character color D0, which are the colors of the selection state, are not changed.

When a picture of the DVD video is normally reproduced, a picture corresponding to the background picture 310 is displayed. When a movie that has subtitles is reproduced, the background picture 310 of which the movie main part is reproduced and the sub picture 311 of which the subtitles are displayed are combined and displayed.

However, the sub picture 311, the highlight 312 that represents the selection state, and the highlight 312 that represents the execution state can use only up to four colors each. Thus, as a problem of the related art, a sub picture having many colors cannot be displayed.

Since the highlight 312 only changes the color of the sub picture 311, characters of a button cannot be changed in the selection state and the execution state. In addition, an effect of which the shape of a button is changed cannot be accomplished. Thus, the related art cannot accomplish an enriched user interface.

Since subtitles and buttons are displayed using the same mechanism using the sub picture 311, the subtitles and the buttons cannot be independently controlled and displayed. In addition, a combining process for setting and combining transparencies of the subtitles and buttons and displaying the combined picture cannot be performed.

When the menu screen is called, moving picture data reproduced in the background thereof is stopped. Thus, even if such an interactive function were accomplished, the flexibility of the user interface that accomplishes the function would be low.

Since a mechanism for generating an effect sound in synchronization with subtitles displayed and changed has not been prescribed in the standard, an effect sound cannot be generated in synchronization with subtitles as a problem of the related art.

Since the standard does not prescribe a mechanism for generating effect sounds for buttons such as an effect sound that is generated when the user places a button in the selection state and a click sound that is generated when the user operates an OK key in the selection state of a button. Thus, it is difficult to accomplish an enriched user interface as a problem of the related art.

When a user interface having high flexibility is accomplished, it is largely affected by the drawing speed and update speed of buttons and the responsiveness to an input of the user. Thus, a graphic decoder model that estimates them is required.

In the foregoing, the effect sound is not sound data that is reproduced in synchronization with a moving picture or a still picture displayed on the moving picture plane (for example, sound that is recoded as a pair of a movie picture), but audio data reproduced in synchronization with a display control of subtitles and buttons.

DISCLOSURE OF THE INVENTION

An object of the present invention is to provide a reproducing apparatus, a reproducing method, a reproducing program, and a recording medium that allow a user interface with high flexibility for a large capacity reproduction-only optical disc to be accomplished.

Another object of the present invention is to provide a reproducing apparatus, a reproducing method, a reproducing program, and a recording medium that allow an enriched user interface for a large capacity reproduction-only optical disc to be accomplished.

To solve the foregoing problem, a first aspect of the present invention is a reproducing apparatus for reproducing contents data, comprising: inputting means for inputting a non-real time stream and a real time stream, the non-real time stream containing at least a program code and image data composing an operation screen that prompts a user to perform an operation, the real time stream containing at least moving picture data and subtitle data; code storing means for storing the program code that is input by the inputting means; image data storing means for storing the image data that is input by the inputting means; first combining means for combining decoded moving picture data of which the moving picture data that is input by the inputting means is decoded and decoded subtitle data of which the subtitle data that is input by the inputting means is decoded; and second combining means for combining the decoded image data stored in the image data storing means and the combined data of the moving picture and the subtitle data combined by the first combining means in accordance with the program code stored in the code storing means.

A second aspect of the present invention is a reproducing method for reproducing contents data, comprising the steps of: inputting a non-real time stream and a real time stream, the non-real time stream containing at least a program code and image data composing an operation screen that prompts a user to perform an operation, the real time stream containing at least moving picture data and subtitle data; storing the program code that is input at the inputting step to code storing means; storing the image data that is input at the inputting step to image data storing means; combining decoded moving picture data of which the moving picture data that is input at the inputting step is decoded and decoded subtitle data of which the subtitle data that is input at the inputting step is decoded; and combining the decoded image data stored in the image data storing means and the combined data of the moving picture and the subtitle data combined at the first combining step in accordance with the program code stored in the code storing means.

A third aspect of the present invention is a reproducing program for causing a computer device to execute a reproducing method for reproducing contents data, the reproducing method comprising the steps of: inputting a non-real time stream and a real time stream, the non-real time stream containing at least a program code and image data composing an operation screen that prompts a user to perform an operation, the real time stream containing at least moving picture data and subtitle data; storing the program code that is input at the inputting step to code storing means; storing the image data that is input at the inputting step to image data storing means; combining decoded moving picture data of which the moving picture data that is input at the inputting step is decoded and decoded subtitle data of which the subtitle data that is input at the inputting step is decoded; and combining the decoded image data stored in the image data storing means and the combined data of the moving picture and the subtitle data combined at the first combining step in accordance with the program code stored in the code storing means.

A fourth aspect of the present invention is a recording medium on which a reproducing program for causing a computer device to execute a reproducing method for reproducing contents data has been recorded, the reproducing method comprising the steps of: inputting a non-real time stream and a real time stream, the non-real time stream containing at least a program code and image data composing an operation screen that prompts a user to perform an operation, the real time stream containing at least moving picture data and subtitle data; storing the program code that is input at the inputting step to code storing means; storing the image data that is input at the inputting step to image data storing means; combining decoded moving picture data of which the moving picture data that is input at the inputting step is decoded and decoded subtitle data of which the subtitle data that is input at the inputting step is decoded; and combining the decoded image data stored in the image data storing means and the combined data of the moving picture and the subtitle data combined at the first combining step in accordance with the program code stored in the code storing means.

A fifth aspect of the present invention is a disc shaped recording medium on which contents data has been recorded, wherein a non-real time stream and a real time stream are recorded on the recording medium, the non-real time stream containing at least a program code and image data composing an operation screen that prompts a user to perform an operation, the real time stream containing at least moving picture data and subtitle data, and wherein decoded image data of which the image data that has been reproduced and stored in image data storing means is decoded and combined data of which moving picture data that has been reproduced and decoded and subtitle data that has been reproduced and decoded are combined are combined in accordance with the program code.

As described above, according to the first, second, third, and fourth aspects of the present invention, a non-real time stream and a real time stream are input. The non-real time stream contains at least a program code and image data that composes an operation screen that prompts a user to perform an operation. The real time stream contains at least moving picture data and subtitle data. The program code and the image data that are input are stored in code storing means and image data storing means. Decoded moving picture data of which the moving picture data that is input is decoded and decoded subtitle data of which the subtitle data that is input is decoded are combined as combined data of the moving picture data and the subtitle data. The decoded image data stored in the image data storing means and the combined data of the moving picture data and the subtitle data are combined in accordance with the program code stored in the code storing means. Thus, when moving picture data is reproduced, an operation screen using the same image data can be easily displayed at different timings.

According to the fifth aspect of the present invention, a non-real time stream and a real time stream are recorded on a recording medium. The non-real time stream contains at least a program code and image data that composes an operation screen that prompts a user to perform an operation. The real time stream contains at least moving picture data and subtitle data. Decoded image data of which the image data that has been reproduced and stored in image data storing means is decoded and combined data of which moving picture data that has been reproduced and decoded and subtitle data that has been reproduced and decoded are combined are combined in accordance with the program code. Thus, when moving picture data is reproduced, an operation screen using the same image data can be easily displayed at different timings.

BRIEF DESCRIPTION OF DRAWINGS

FIG. 5 is a schematic diagram showing an example of a data structure of a sub picture according to the related art reference;

FIG. 10 is a schematic diagram showing a syntax that describes an example of a structure of a file "info.bdav";

FIG. 11 is a schematic diagram showing a syntax that describes an example of a structure of a block UIAppInfoB-DAV( );

FIG. 12 shows a syntax that describes an example of a structure of a block "TableofPlayLists( )";

FIG. 13 is a schematic diagram showing a syntax that describes an example of a structure of files "xxxxx.rpls" and "yyyyy.vpls";

FIG. 14 is a schematic diagram showing a syntax that describes an example of a structure of a block UIAppInfoPlayList( );

FIG. 15 is a schematic diagram showing a syntax that describes an example of a structure of a block PlayList( );

FIG. 16 is a schematic diagram showing a syntax that describes an example of a structure of a block PlayItem( );

FIG. 18 is a schematic diagram showing a syntax that describes an example of a structure of a block PlayListMark( );

FIG. 19 is a schematic diagram showing a syntax that describes an example of a structure of a file "zzzzz.clpi";

FIG. 23 is a schematic diagram showing an example of input and output data of a palette;

FIG. 24 is a schematic diagram showing an example of a palette table held in a palette;

FIG. 32A, FIG. 32B, and FIG. 32C are schematic diagrams showing examples of events that are uniquely defined by the BD virtual player;

FIG. 33A, FIG. 33B, FIG. 33C, FIG. 33D, FIG. 33E, FIG. 33F, FIG. 33G, and FIG. 33h are schematic diagrams showing examples of commands defined for the BD virtual player according to an embodiment of the present invention;

FIG. 34A, FIG. 34B, FIG. 34C, FIG. 34D, FIG. 34E, FIG. 34F, FIG. 34G, FIG. 34H, FIG. 34I, and FIG. 34J are schematic diagrams showing examples of commands defined for the BD virtual player according to an embodiment of the present invention;

FIG. 39 is a schematic diagram showing a list of files necessary for structuring a scenario;

FIG. 41 is a schematic diagram showing a more practical example of a description of a script file;

FIG. 42 is a schematic diagram showing a more practical example of a description of a script file;

FIG. 43 is a schematic diagram showing a more practical example of a description of an HTML file;

FIG. 44 is a schematic diagram showing a more practical example of a description of a script file;

FIG. 45 is a schematic diagram describing a management structure of files recorded on a recording medium;

FIG. 46 is a schematic diagram showing a syntax that describes an example of a structure of a scenario file (scenario.hdmv) that describes a scenario;

FIG. 47 is a schematic diagram showing a syntax that describes an example of a structure of a block Autoplay( );

FIG. 48 is a schematic diagram showing a syntax that describes an example of a structure of a block Scenario( );

FIG. 49 is a schematic diagram showing a syntax that describes an example of a structure of a block entrylist.data;

FIG. 50 is a schematic diagram showing a syntax that describes an example of a structure of a block AppInfo( );

FIG. 51 is a schematic diagram showing a syntax that describes an example of a structure of a block ScenarioEntry( );

FIG. 52 is a schematic diagram showing a syntax that describes an example of a structure of a file xxxxx.mpls;

FIG. 53 is a schematic diagram showing a syntax that describes an example of a structure of a block PLCpntrolInfo( );

FIG. 54 is a schematic diagram showing values of a field PL_Playback_type and their meanings;

FIG. 55 is a schematic diagram showing values of a field PL_random_access_mode and their meanings;

FIG. 56 is a schematic diagram showing a syntax that describes an example of a structure of a block PlayList( );

FIG. 57 is a schematic diagram showing a syntax that describes an example of a structure of a block PlayItem( );

FIG. 58 is a schematic diagram showing values of a field PI_random_access_mode and their meanings;

FIG. 59 is a schematic diagram showing values of a field still_mode and their meanings;

FIG. 60 is a schematic diagram showing values of a field is_seamless_angle_change and their meanings;

FIG. 61 is a schematic diagram showing a syntax that describes an example of a structure of a block SubPlayItem( );

FIG. 62 is a schematic diagram showing values of a field is_repeat_flag and their meanings;

FIG. 64 is a schematic diagram showing a syntax that describes an example of a structure of a file zzzzz.clpi;

FIG. 65 is a schematic diagram showing a syntax that describes an example of a structure of a block ClipInfo( );

FIG. 66 is a schematic diagram showing values of a field application_type and their meanings;

FIG. 67 is a schematic diagram showing a syntax that describes an example of a structure of a block SequenceInfo( );

FIG. 68 is a schematic diagram showing a syntax that describes an example of a structure of a block ProgramInfo( );

FIG. 69 is a schematic diagram showing a syntax that describes an example of a structure of a block StreamCodingInfo( );

FIG. 70 is a schematic diagram showing a syntax that describes an example of a structure of a block CPI( );

FIG. 71 is a schematic diagram showing values of a field CPI_type and their meanings;

FIG. 72 is a schematic diagram showing a syntax that describes an example of a structure of a block EP_map_for_one_stream_PID( );

FIG. 73A, FIG. 73B, and FIG. 73C are functional block diagrams showing an example of a structure of a player decoder;

FIG. 78 is a functional block diagram showing an example of a structure of a graphics object decoder model that decodes a graphics object;

FIG. 79A, FIG. 79B, FIG. 79C, and FIG. 79D are schematic diagrams showing an example of stored data amounts that are changed in a graphics object input buffer, a PNG decoder, an object buffer, and a plane buffer;

FIG. 80 is a schematic diagram describing a data transfer speed for a plane;

FIG. 83 is a schematic diagram showing a syntax that describes an example of a structure of a graphics object;

FIG. 84 is a schematic diagram showing a syntax that describes an example of a structure of a block GlobalPaletteTable( );

FIG. 85A and FIG. 85B are schematic diagrams showing an example of a list of display control commands of a command group DispCmds(i);

FIG. 86A and FIG. 86B are schematic diagrams describing a command set_display_box(x1, y1, x2, x2) and a command set_clipping_box(a1, b1, a2, b2);

FIG. 87 is a schematic diagram describing a definition of coordinate axes;

FIG. 90A and FIG. 90B are schematic diagrams showing an example of which a PNG image as subtitles is moved on a plane;

FIG. 91A and FIG. 91B are schematic diagrams showing an example of which subtitles that are displayed are scrolled;

FIG. 93 is a schematic diagram showing an example of a data structure of a graphics object of which sound data is assigned to a button image;

FIG. 95 is a schematic diagram showing an example of a method of which sound data is placed in a graphics object; and FIG. 96 is a schematic diagram more practically describing a reproduction of sound data in the case that sound data is not placed in a graphics object.

BEST MODES FOR CARRYING OUT THE INVENTION

Next, an embodiment of the present invention will be described. According to an embodiment of the present invention, based on the blu-ray disc standard (blu-ray disc rewritable format ver 1.0), which is a standard for recording and reproducing data, functions necessary for a reproduction-only disc such as an interactive function and a multiple angle function are accomplished.

The present specification has the following structure.
1. Outline of BD-RE format
2. Outline of BD-ROM format
   2-1. About planes
   2-2. Menu screen
   2-3. About scenarios
   2-4. Categories of scenarios
   2-5. About virtual player model
   2-6. About commands
   2-7. About execution of commands
   2-8. About syntaxes
   2-9. Decoder model
   2-10. About buttons
   2-11. About transfer speed of graphics
   2-12. About graphics objects
   2-13. About effect sound
   2-14. Others
1. Outline of BD-RE Format First of all, for easy understanding of the present invention, a management structure as prescribed in "Blu-ray Disc Rewritable Format Ver 1.0 part 3 Audio Visual Specification) for contents namely AV (Audio/Video) data prerecorded on a blu-ray disc will be described. In the following description, the management structure is referred to as BDAV format.

A bit stream that has been encoded in accordance with an encoding system such as MPEG (Moving Pictures Experts Group) video or MPEG audio and multiplexed in accordance with MPEG-2 system is referred to as clip AV stream (or simply AV stream). The clip AV stream is recorded as a file on a disc by a file system defined in "Blu-ray Disc Rewritable Format Ver 1.0 part 2" for a blu-ray disc. This file is referred to as clip AV stream file (or simply AV stream).

A clip AV stream file is a management unit on the file system. Thus, it cannot be said that a clip AV stream file is a management unit that the user can easily understand. From a view point of user's convenience, it is necessary to record information necessary for combining a video content that has been divided into a plurality of clip AV stream files and reproducing the combined video content, information necessary for reproducing only a part of a clip AV stream file, information necessary for smoothly performing a special reproduction and a search reproduction, and so forth as a database. "Blu-ray Disc Rewritable Format Ver. 1.0 part 3" as a standard for a blu-ray disc prescribes such a database.

Figure 1:
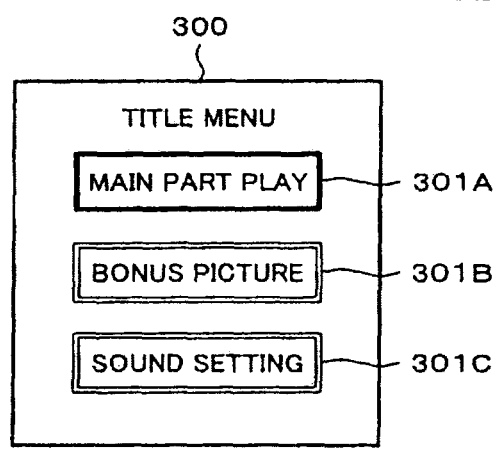
FIG. 1 is a schematic diagram showing an example of a DVD menu screen according to a related art reference.
Figure 2A:
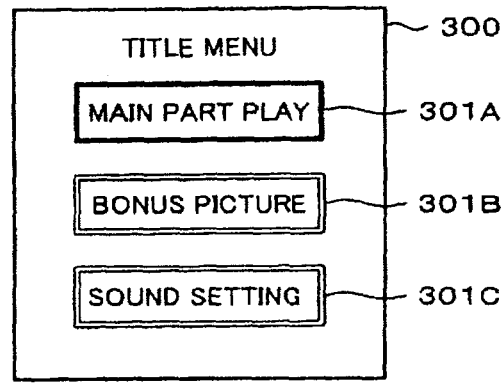
FIG. 2A, FIG. 2B, and FIG. 2C are schematic diagrams showing a state of which buttons whose selection states are changed by an operation of a remote controller.
Figure 2B:
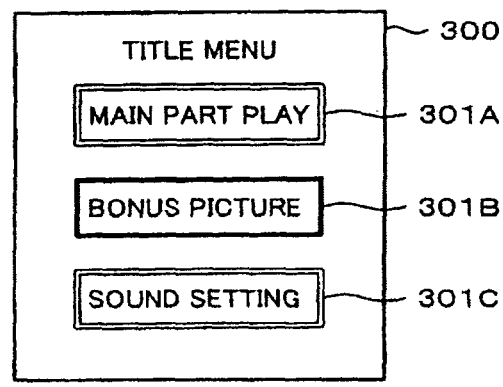
Figure 2C:
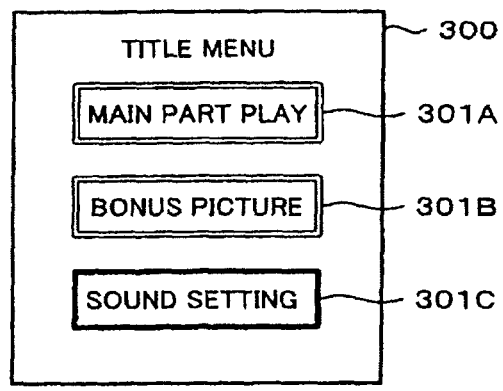
Figure 3:
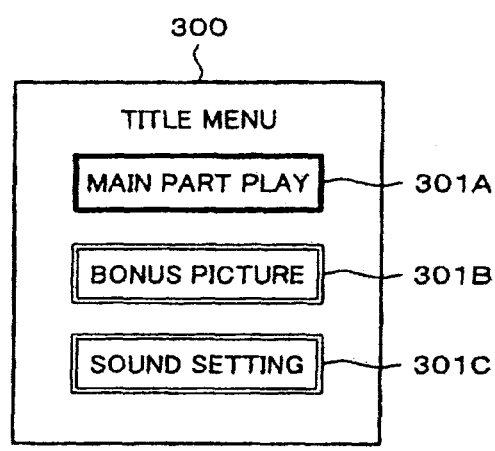
FIG. 3 is a schematic diagram showing a state of which a color of a button is changed to a color that represents an execution state by an operation of an OK button.
Figure 4A:
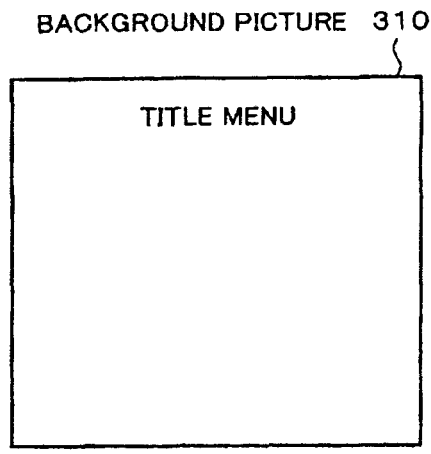
FIG. 4A, FIG. 4B, and FIG. 4C are schematic diagrams showing an example of a structure of a menu screen according to the related art reference.
Figure 4B:
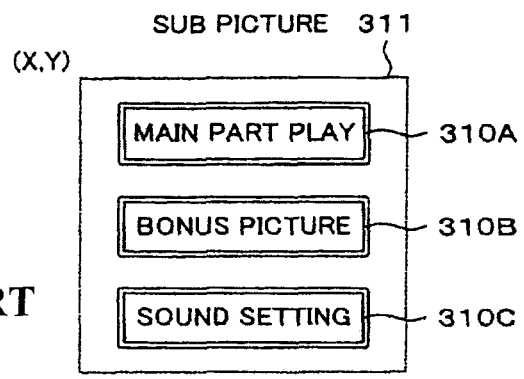
Figure 4C:
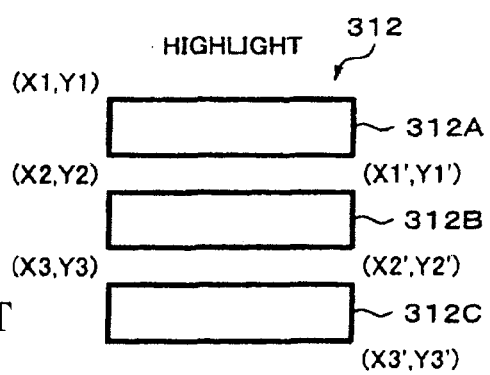
Figure 6:
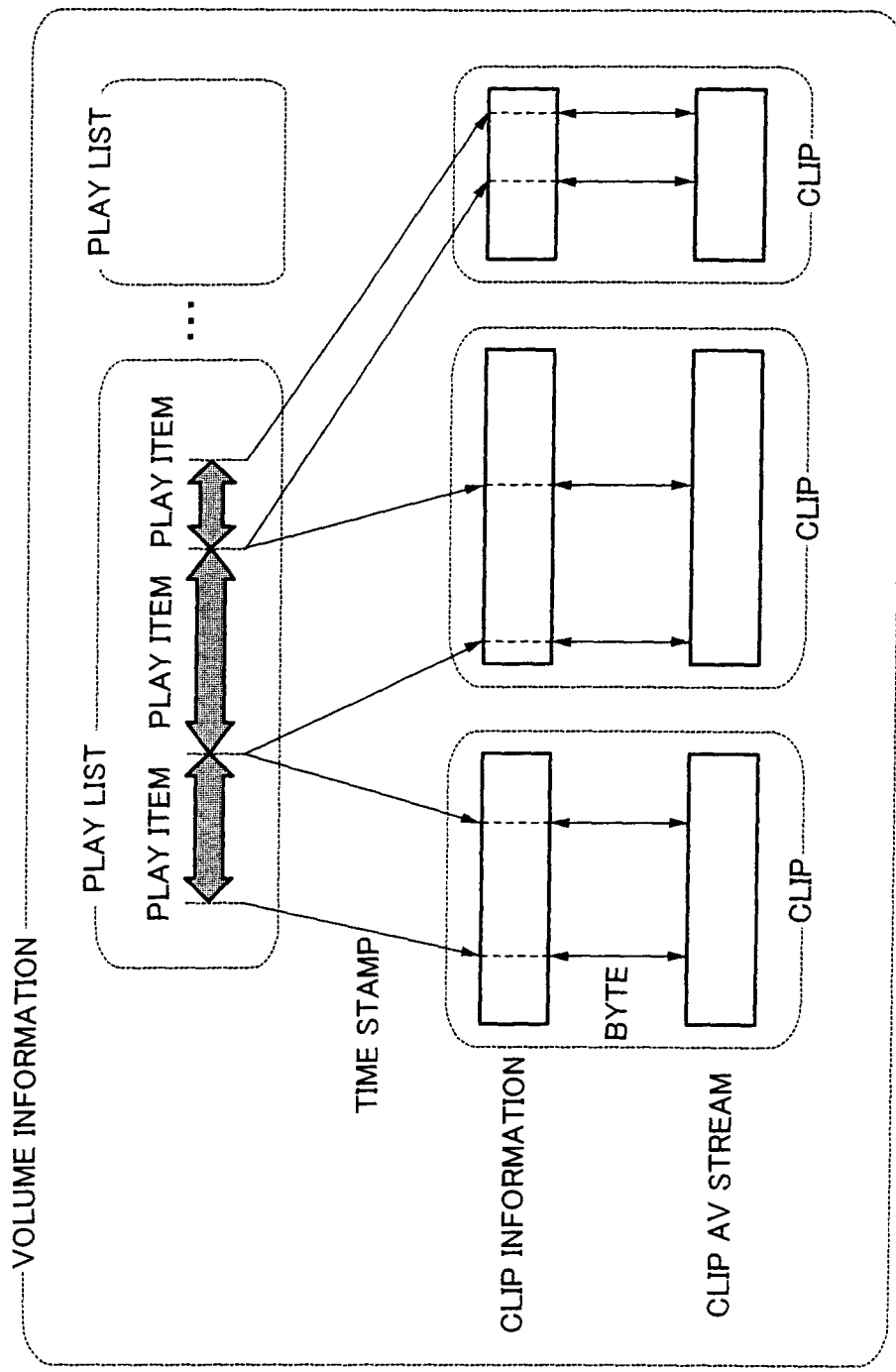
FIG. 6 is a schematic diagram showing a mechanism for designating a reproduction order of an AV stream file.

FIG. 6 schematically shows a mechanism for designating a part of all an AV stream file, arranging only desired portions thereof, and reproducing the arranged portions. In FIG. 6, a play list (PlayList) causes a part or all an AV stream file to be designated and only desired portions thereof to be reproduced. When the user reproduces a content, he or she select it in the unit of a play list. A play list is one video/audio unit in which the user implicitly expects that a content will be successively reproduced.

The simplest structure of a play list is composed of one AV stream file after recording of a content is started until the recording is stopped. Unless the AV stream file is edited, it becomes one play list A play list is composed of information that represents an AV stream file to be reproduced and sets of reproduction start points and reproduction stop points that designate reproduction start positions and reproduction stop positions of the AV stream file. A pair of information of a reproduction start point and information of a reproduction stop point is referred to as play item (PlayItem). A play list is composed of a set of play items. When a play item is reproduced, a part of the AV stream file referred from the play item is reproduced.

As described above, a clip AV stream is a bit stream of which video data and audio data have been multiplexed in the format of an MPEG2 TS (Transport Stream). Information about the clip AV stream is recorded as clip information to a file.

A set of a clip AV stream file and a clip information file that has corresponding clip information is treated as one object and referred to as clip. A clip is one object that is composed of a clip AV stream and clip information.

A file is generally treated as a sequence of bytes. A content of a clip AV stream file is expanded on the time base. An entry point in a clip is regularly designated on the time base. When a time stamp of an access point to a predetermined clip is given, a clip information file can be used to find information of an address from which data is read in a clip AV stream file.

All play lists and clips recorded on one disc are managed with volume information.

Figure 7:
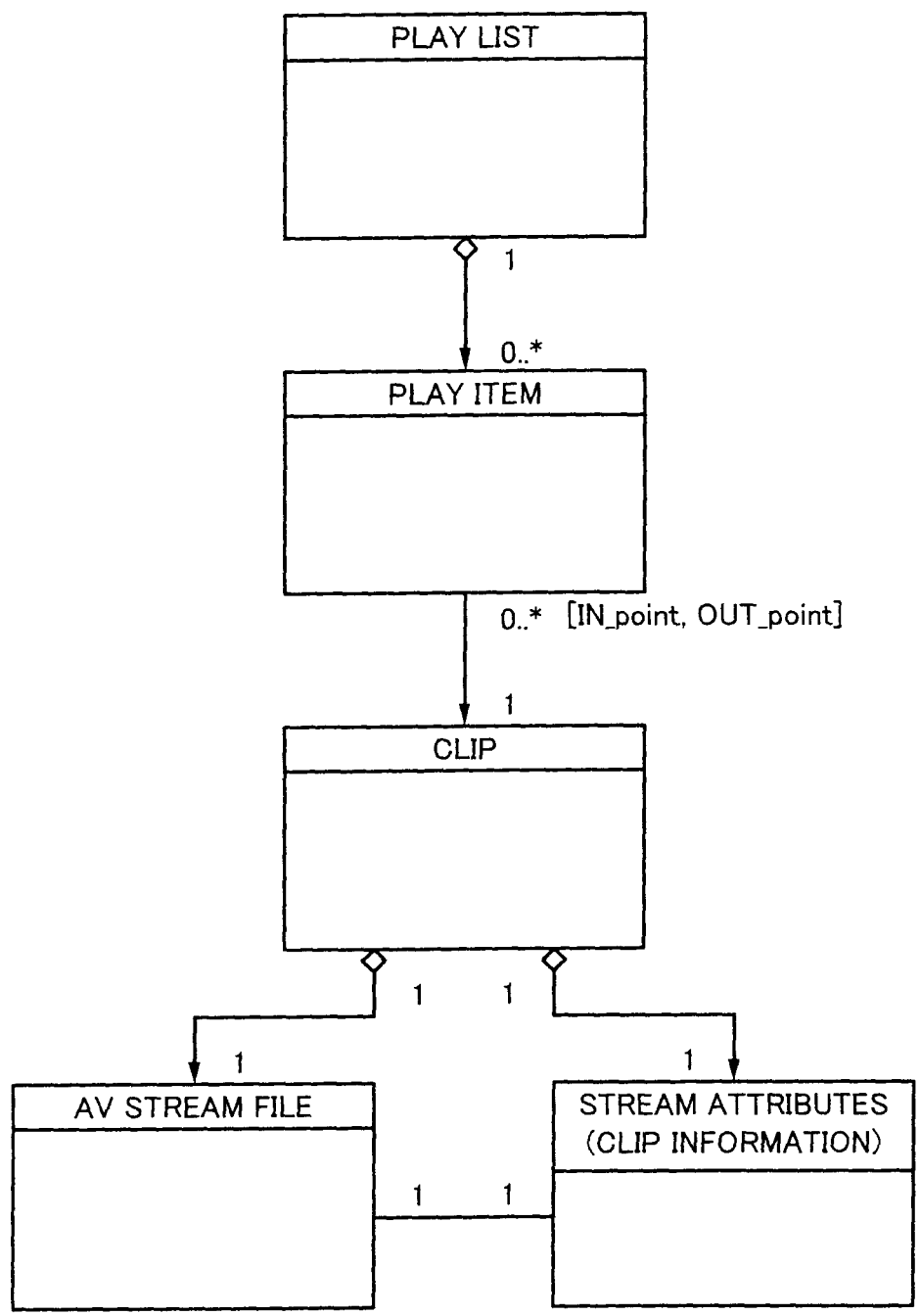
FIG. 7 is a UML diagram showing the relation of a clip AV stream, clip information, a clip, a play item, and a play list.

FIG. 7 shows a UML (Unified Modeling Language) diagram that represents the relation of the foregoing clip AV stream, clip information (stream attributes), clips, play items, and play list. One play list is correlated with one or a plurality of play items. One play item is correlated with one clip. One clip may be correlated with a plurality of play items whose start points and/or end points are different. One clip AV stream file is referenced from one clip. One clip information file is referenced from one clip. One clip AV stream file and one clip information file are correlated with the relation of one to one. With such a structure defined, a reproduction order can be non-destructively designated by reproducing only any part, not changing a clip AV stream file.

Figure 8:
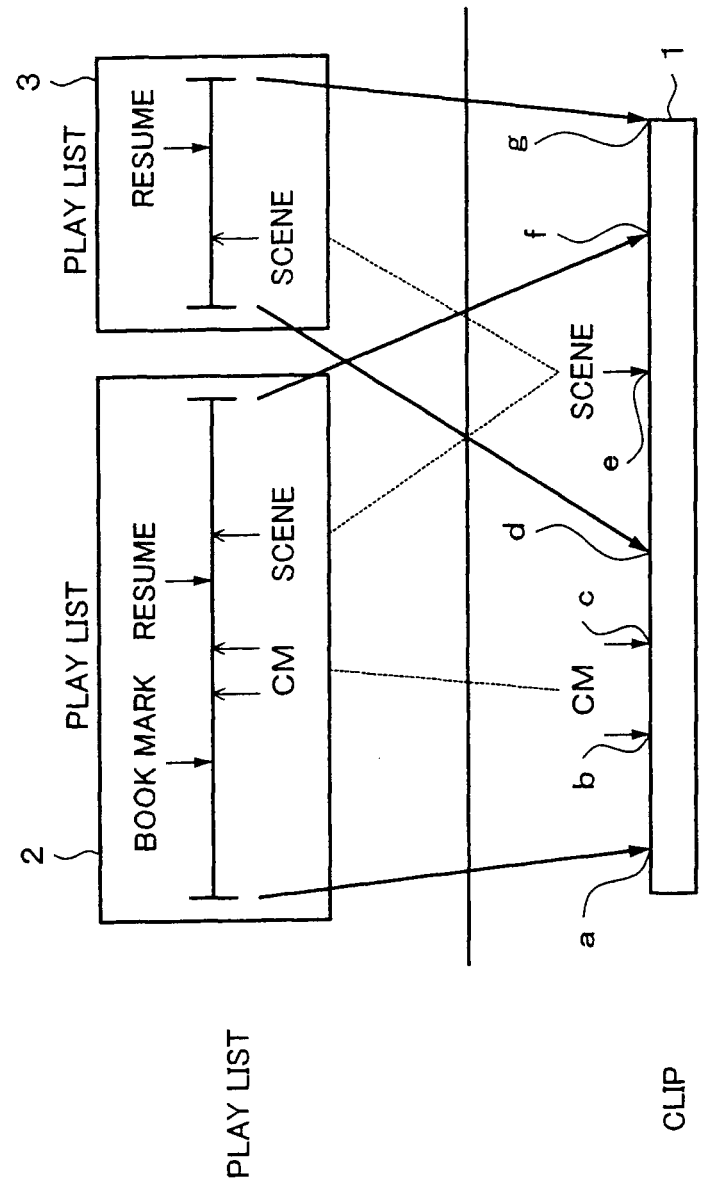
FIG. 8 is a schematic diagram describing a method for referencing the same clip from a plurality of play lists.

As shown in FIG. 8, the same clip can be referenced from a plurality of play lists. In the example shown in FIG. 8, a clip 1 is referenced from two play lists 2 and 3. In FIG. 8, the horizontal direction of the clip 1 represents the time base. The play list 2 references regions a to f of the clip 1 that include commercial message regions b and c and a scene e. The play list 3 references regions d to g of the clip 1 that include a scene e. When the play list 2 is designated, the regions a to f of the clip 1 can be reproduced. When the play list 3 is designated, the regions d to g of the clip 1 can be reproduced.

Figure 9:
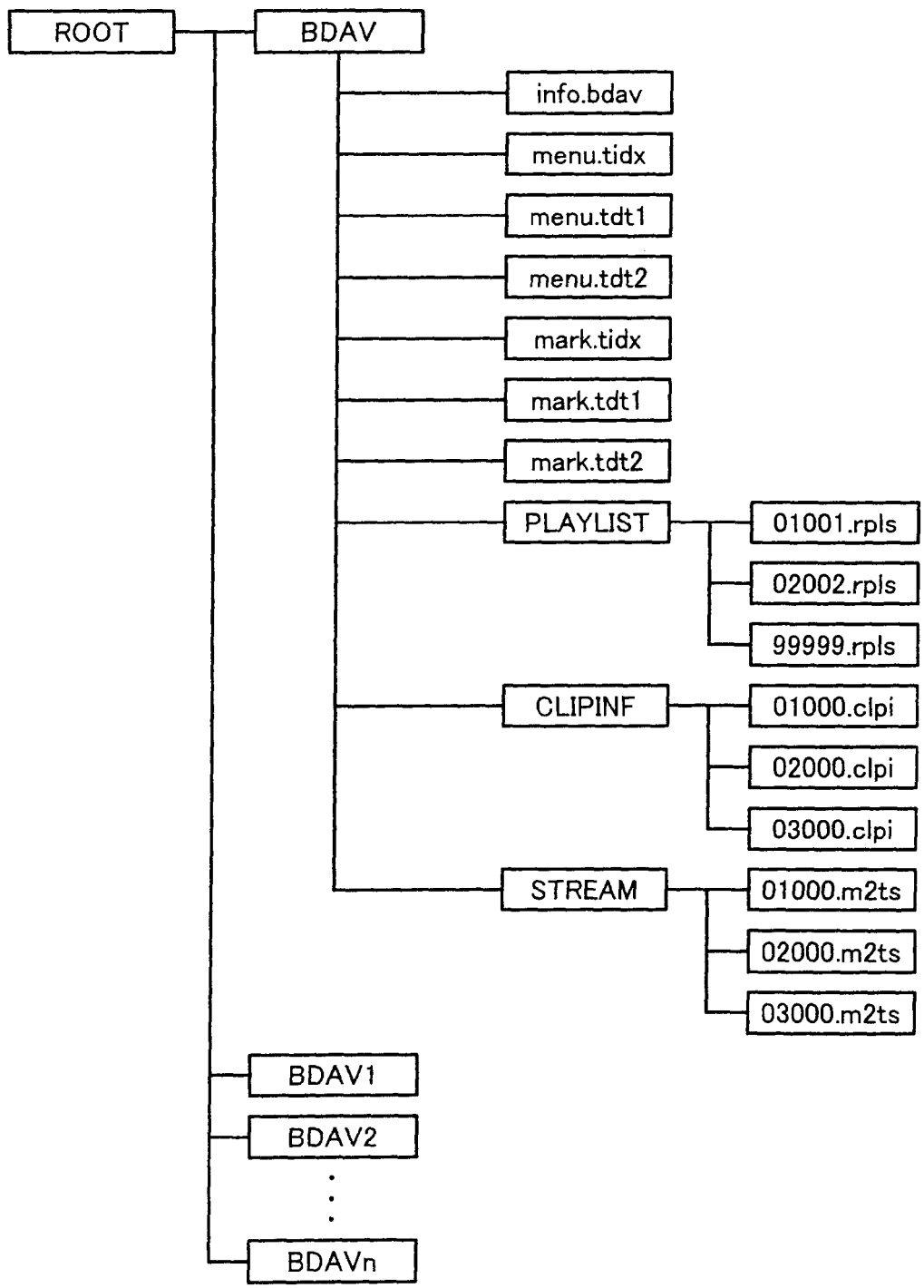
FIG. 9 is a schematic diagram describing a management structure of files recorded on a recording medium.

Next, with reference to FIG. 9, a management structure for files recorded on a recording medium prescribed in "Blu-ray Disc Rewritable Format Ver 1.0 part 3" will be described.

Files are hierarchically managed in a directory structure. One directory (a root directory in the example shown in FIG. 9) is created on the recording medium. Under the directory, files are managed by one recording and reproducing system.

Under the root directory, a directory BDAV is placed. As shown in FIG. 9, a plurality of directories such as directories BDAV, BDAV1, BDAV2, . . . , BDAVn can be placed. In the following description, the plurality of directories BDAV, BDAV1, BDAV2, . . . , and BDAVn are represented by the directory BDAV. Only the representative directory BDAV will be described.

Under the directory BDAV, the following six types of files are placed.
(1) info.bdav
(2) menu.tidx, mark.tidx
(3) menu.tdt1, menu.tdt2, mark.tdt1, mark.tdt2
(4) #####.rpls, #####.vpls
(5) %%%%%.clpi
(6)***.m2ts In the files "#####.rpls" and "#####.vpls" categorized as (4), "#####" represents any number. In the file "%%%%%.clpi" categorized as (5), "%%%%%" represents any number. In the file "*.m2ts" categorized as (6), "*" represents a number of which a file "*.m2ts" corresponds to a file "%%%%%.clpi" with the relation of one to one. A number "***" can be the same as a number "%%%%%".

The file "info.bdav" categorized as (1) is a file that has information of all the directory BDAV. The files "menu.tidx" and "mark.tidx" categorized as (2) are files that have information of thumbnail pictures. The files "menu.tdt1", "menu.tdt2", "mark.tdt1", and "mark.tdt2" categorized as (3) are files that have thumbnail pictures. The extensions "tdt1" and "tdt2" of those files represent whether or not data of thumbnail pictures in those files have been encrypted.

The files "#####.rpls" and "#####.vpls" categorized as (4) are files that have information of play lists. The files "#####.rpls" and "#####.vpls" are placed under the directory PLAYLIST, which is placed under the directory BDAV.

The file "%%%%%.clpi" categorized as (5) is a file that has clip information. The file "%%%%%.CLP" is placed under the directory CLIPINF, which is placed under the directory BDAV. The file "***.m2ts" categorized as (6) is a clip AV stream file that has a clip AV stream. A clip AV stream file is correlated with one clip information file "%%%%%.clpi" with a file name number "*". The file "***.m2ts" is placed under the directory STREAM, which is placed under the directory BDAV.

Next, each file will be described in detail. The file "info.bda" categorized as (1) is only one file placed under the directory BDAV. FIG. 10 shows a syntax that describes an example of a structure of the file "info.bdav". The syntax is represented by a descriptive method of C language, which is used as a program descriptive language for computer devices. This applies to drawings that show other syntaxes.

In FIG. 10, the file "info.bdav" is divided into blocks corresponding to functions. A field type_indicator describes a character string "BDAV" that describes that the file is "info.bdav". A field version_number represents a version of the file "info.bdav". A block UIAppInfoBDAV( ) describes information about information placed under the directory DBAV. A block TableOfPlayList( ) describes information about the arrangement of the play list. A block MakersPrivateData( ) describes unique information of the maker of the recording and reproducing apparatus.

Addresses that represent the beginnings of individual blocks are described at the beginning of the file "info.bdav".

For example, a field TableOfPlayLists_Start_address represents the start position of the block "TableOfPlayListsQ" with the number of relative bytes in the file.

FIG. 11 shows a syntax that describes an example of a structure of a block UIAppInfoBDAV( ). A field length represents the length immediately after the field length until the end of the block UIAppInfoBDAV( ) in bytes. A field BDAV_character_set represents a character set of a character sequence described in a field BDAV_name of the block UIAppInfoBDAV( ). As a character set, ASCII, Unicode, or the like can be selected.

A flag BDAV_protect_flag describes whether or not the user is unconditionally permitted to watch a content placed under the directory BDAV. When the flag has been set to "1" and the user has input a correct PIN (Personal Identification Number), he or she is permitted to watch a content placed under the directory BDAV. In contrast, when the flag BDAV_protect_flag has been set to "0", even if the user does not input his or her PIN, he or she is permitted to watch a content placed under the directory BDAV.

The personal identification number PIN is described in a field PIN. The personal identification number PIN is composed of for example a four-digit number, each digit ranging from 0 to 9. The personal identification number PIN represents a personal identification number that is required when the reproduction control is validated. Digits of the personal identification number PIN are encoded in accordance with for example ISO (International Organization for Standardization)/IEC (International Electrotechnical Commission) 646 standard.

With the foregoing information described in the block UIAppInfoBDAV( ), the reproduction restriction for the directory BDAV is prescribed. As will be described later, the reproduction restriction for each play list is prescribed with a flag playback_control_flag defined in the block UIAppInfoPlayList( ) described in the files "#####.rpls" and "#####.vpls".

In the example, to resume reproducing a content placed under the directory BDAV, a resume function can be used. The resume function allows a play list of a content to be reproduced in priority to be designated. It is assumed that the resume function is used when the user wants to resumes reproducing a content from the last stop position.

In FIG. 11, a flag resume_valid_flag describes whether the resume function is valid/invalid. When the value of the flag has been set to "0", the resume function is invalid. When the value of the flag has been set to "1", the resume function is valid. At that point, a play list designated by a field resume_PlayList_file_name is treated as a play list to be reproduced in priority.

A field ref_to_menu_thumbnail_index is a region that describes a thumbnail number that identifies a thumbnail picture that typifies the directory BDAV. In the blu-ray disc standard, a still picture that typifies the directory BDAV is referred to as menu thumbnail. A thumbnail picture that has an index thumbnail_index described in the field ref_to_menu_thumbnail_index is the menu thumbnail of the directory BDAV.

A field BDAV_name_length represents the byte length of the name of the directory BDAV described in a field BDAV_name. The number of bytes represented in the field BDAV_name_length is valid for the character string of the field BDAV_name that represents the name of the directory BDAV. The rest of the byte sequence after the valid character string represented by the field BDAV_name_length may have any value.

FIG. 12 shows a syntax that describes an example of a structure of a block TableOfPlayLists( ). A field number_of_PlayLists represents the number of play lists placed under the directory BDAV. The number of play lists is referred to as loop variable. The field number_of_PlayLists is followed by a loop of a "for" statement. The "for" statement describes play lists represented by a field PlayList_file_name. The play lists are displayed on a play list table display screen or the like. A play list is designated with a file name such as "#####.rpls" or "#####.vpls" in the field PlayList_file_name.

As described above, the files "#####.rpls" and "#####.vpls" are placed under the directory PLAYLIST. These files correspond to individual play lists in the relation of one to one.

FIG. 13 shows a syntax that describes an example of a structure of the files "#####.rpls" and "#####.VPLS". In FIG. 13, the files "#####.rpls" and "#####.vpls" each have blocks corresponding to functional information. A field type_indicator describes a character string that represents the file. A field version_number represents a version of the file.

A block UIAppInfoPlayList( ) describes attribute information of the play list. A block PlayList( ) describes information about play items that compose the play list. A block PlayListMark( ) describes information about a mark added to the play list. A block MakersPrivateData( ) describes maker's unique information of the apparatus that has recorded the play list file. Fields PlayList_start_address, PlayListMark_start_address and MakersPrivateData_start_address are placed at the beginning of each of the files "#####.rpls" and "#####.vpls". These fields describe the start addresses of the corresponding blocks as address information of 32 bits.

Since the start address of each block is described at the beginning of each of the files "#####.rpls" and "#####.vpls", data padding_word of any length can be placed before each block and/or after each block. However, the start position of the block UIAppInfoPlayList( ), which is the first block of each of the files "#####.rpls" and "#####.vpls", is fixed at the 320-th byte from the beginning of each of these files.

FIG. 14 shows a syntax that describes an example of a structure of a block UIAppInfoPlayList( ). The block UIAppInfoPlayList( ) describes various types of attribute information about the play list. The attribute information is not directly used for reproducing the play list. A field PlayList_character_set describes a character set of character string information about the play list.

A flag playback_control_flag describes whether or not display of information and reproduction of a play list are restricted in accordance with a personal identification number PIN. When the value of the flag playback_control_flag is for example "1", unless the user inputs a correct personal identification number PIN, information such as a thumbnail picture of a play list cannot be displayed and the play list cannot be reproduced. A flag write_protect_flag is an erase prohibition flag. It is necessary to structure the user interface so that when the value of the flag write_protect_flag is "1", the user cannot easily erase the play list. A flag is_played_flag describes that the play list has been reproduced. A flag is_edited_flag describes that the play list has been edited.

A field time_zone represents a time zone of which the play list was recorded. A field record_time_and_date represents the date and time on and at which the play list was recorded. A field PlayList_duration represents the reproduction duration of the play list.

Fields maker_ID and maker_model_code describe information that identifies a maker and a model of the recording apparatus that last updated the play list. The fields maker_ID and maker_model_code are for example numbers. A field channel_number represents a channel number of a recorded clip AV stream. A field channel_name represents a channel name. A field channel_name_length represents the length of the channel name described in the field channel_name. In the field channel_name, a character string having the length described in the field channel_name_length is valid. A field PlayList_name represents a play list name having an effective length of a value described in the field PlayList_name_length. A field PlayList_detail describes detailed information of the play list having an effective length of a value described in the field PlayList_detail_length.

FIG. 15 shows a syntax that describes an example of a structure of a block PlayList( ). A field length describes the length of bytes immediately after the field length until the end of the block PlayList( ). A field PL_CPI_type describes the type of CPI (Characteristic Point Information) of the play list. A field number_of_PlayItems describes the number of play items that compose the play list. A field number_of_SubPlayItems describes the number of play items for after-recording audio (sub play items) added to the play list. In short, a play list can have a sub play item when the play list satisfies a predetermined condition.

A block PlayItem( ) describes information of a play item. A block SubPlayItem( ) describes information of a sub play item.

FIG. 16 shows a syntax that describes an example of a structure of a block PlayItem( ). A field Clip_Information_file_name describes a character string of a file name of a clip information file (that is a file having an extension clpi) has the relation of one to one with a clip that the play item references. The clip information file is a file having an extension "clpi".

A field Clip_codec_identifier describes an encoding system of a clip that the play item references. In the example, the field Clip_codec_identifier is fixed to a value "M2TS". A field connection_condition describes information of how this play item is connected to the next play item. The field connection_condition describes whether or not play items can be seamlessly reproduced.

A field ref_to_STC_id designates a sequence STC_sequence of a clip that the play item references. The sequence STC_sequence is a unique structure of the blu-ray disc standard. The structure represents a range of which a PCR (Program Clock Reference) that is a reference of an MPEG2 TS (Transport Stream) is continuous on the time base. A number STC_id that is unique in the clip is assigned to the sequence STC_sequence. In the sequence STC_sequence, since a continuous time base can be defined, the start time and end time of a play item can be uniquely designated. The start point and end point of each play item should exist in the same sequence STC_sequence. A field ref_to_STC_id describes a sequence STC_sequence with a number STC_id.

Fields IN_time and OUT_time describe time stamps pts (presentation_time_stamp) of the start point and end point of the play item in the sequence STC_sequence, respectively.

Figure 17:
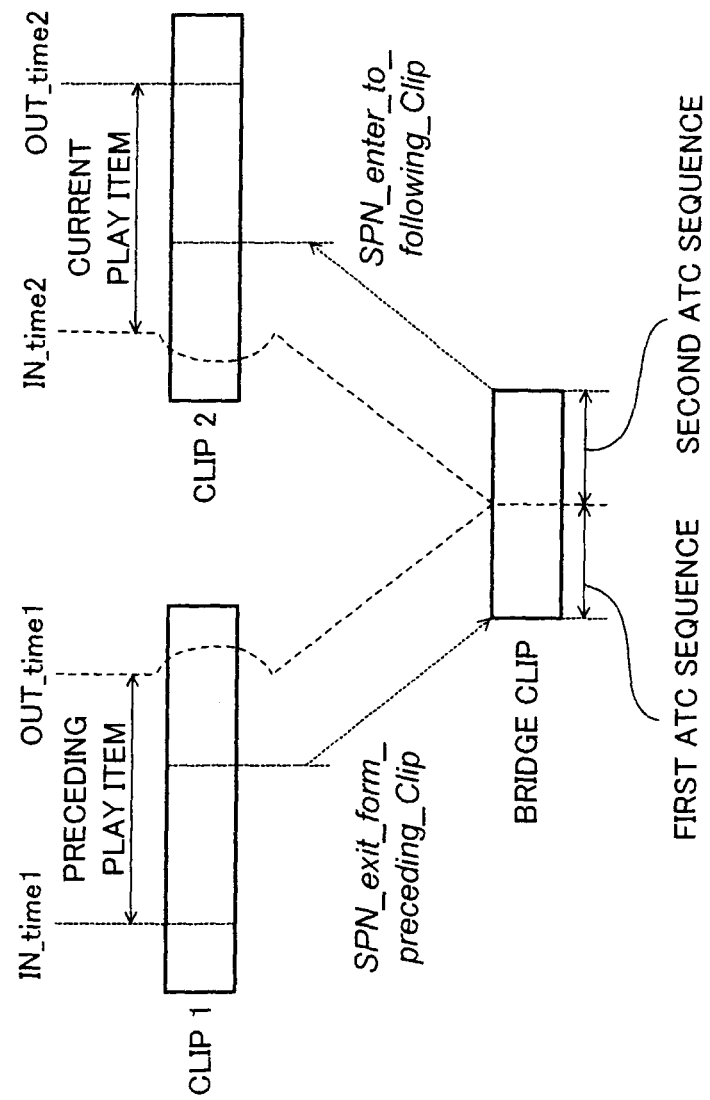
FIG. 17 is a schematic diagram describing a bridge clip.

A block BridgeSequenceInfo( ) describes information about a bridge clip (Bridge_Clip). As shown in FIG. 17, a bridge clip is a bit stream that is created when a function for seamlessly reproducing play items is accomplished. By reproducing a bridge clip instead of an original bit stream at a boundary of the preceding play item and the current play item, the two play items can be seamlessly reproduced.

FIG. 18 shows a syntax that describes an example of a structure of a block PlayListMark( ). The block PlayListMark( ) has a data structure that describes information of a mark. A mark is a structure that describes time of a play list. With a mark, a function for setting a search point to a play list, a function for dividing a play list into chapters, and so forth are accomplished. Timing of display start and display stop of a picture on a graphics plane (that will be described later) can be designated with a mark.

A field length describes the length of bytes immediately after the field length until the end of the block PlayListmark( ). A field number_of_PlayList_marks describes the number of marks in a play list. One loop of a "for" statement represents information of one mark. A flag mark_invalid_flag describes whether or not the mark is valid. When the value of the flag mark_invalid_flag is "0", it describes that the mark is valid. When the value of the flag mark_invalid_flag is "1", it describes that although information of the mark exists in the database, the mark is an invalid mark that is transparent to the user.

A field mark_type describes the type of the mark. There are a mark that represents the position of a picture as a thumbnail picture (representative picture) of the play list, a resume mark that represents a position from which reproduction is resumed, a chapter mark that represents a search point, a skip mark that represents a region to be skipped and reproduced, a mark that represents read start timing of a graphics image, a mark that represents display start timing of a graphics image, a mark that represents display stop timing of a graphics image, and so forth.

A field mark_name_length represents a data length of a field mark_name (that will be described later). A field maker_ID describes a maker of a recording apparatus that created the mark. The field maker_ID is used to identify a mark unique to a maker. A field ref_to_PlayItem_id describes what play item has time designated by the mark. A field mark_time_stamp represents time designated by the mark.

A field entry_ES_PID describes what elementary stream the mark was added (namely, whether the mark was added to a stream of which picture data and/or sound data was encoded). A field ref_to_menu_thumbnail_index and a field ref_to_mark_thumbnail_index describe thumbnail pictures that visually represent marks. A thumbnail picture is for example a still picture that was extracted at time designated by the mark.

A field duration is used when a mark has a length on the time base. When a skip mark is used, the field duration describes for what duration the skip is performed.

A field makers_information is a region that describes information unique to the maker. A field mark_name is a region that describes a name that is assigned to a mark. The size of a mark is described in the foregoing field mark_name_length.

FIG. 19 shows a syntax that describes an example of a structure of a file "%%%%%.clpi". As described above, the file "%%%%%.clpi" is placed under the directory CLIPINF. The file "%%%%%.clpi" is created for each AV stream file (file "*****.m2ts"). The file "%%%%%.clpi" has blocks corresponding to functional information. A field type_indicator describes a character string that represents the file. A field version_number describes a version of the file.

A block ClipInfo( ) describes information about a clip. A block SequenceInfo( ) describes information about an incontinuous point of PCR that represents a time reference of a transport stream of the MPEG2 system. A block ProgramInfo( ) describes information about a program of the MPEG2 system. A block CPI( ) describes information about characteristic point information CPI that represents a characteristic portion in an AV stream. A block ClipMark( ) describes mark information that represents a search index point added to a clip and commercial start and/or end points. A block MakersPrivateData( ) describes information unique to a maker of a recording apparatus.

Address information that represents the beginning of each block in the file "%%%%%.clpi" is described as fields SequenceInfo_start_address, ProgramInfo_start_address, CPI_start_address, ClipMark_start_address, and MakersPrivateData_start_address.

Since the BDAV format has the foregoing data structure, with a play list composed of play items that describe sets of start points and end points of portions to be reproduced in a clip AV stream, contents recorded on the disc can be managed in a reproduction unit that the user can recognize.

2. Outlined Description of BD-ROM Format

Next, an embodiment of the present invention will be described. According to the present invention, the foregoing BDAV format is extended for a format of a reproduction-only disc (BD-ROM: Blu-ray Disc-Read Only Memory). The extended BDAV format is referred to as BDMV format.

Next, a structure of a plane that accomplishes a menu screen for the contents of a disc will be described. A scenario structure that allows the contents producer side to designate the reproduction order of a play list is added. For the scenario structure, data necessary for accomplishing functions such as a still (pause), a random shuffle reproduction, a multiple angle, and so forth that are characteristics of the reproduction-only disc and a method for storing such data will be described.

2-1. About Planes

Figures 20, 21:
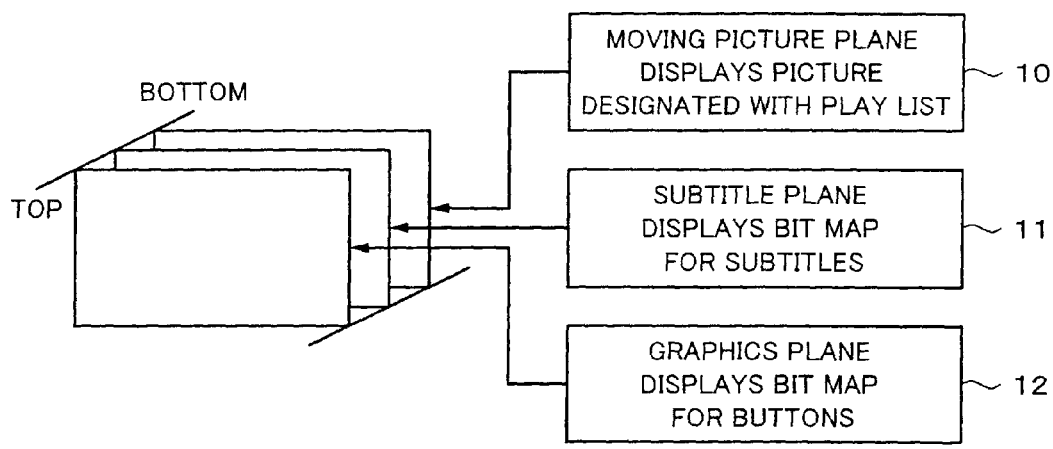
FIG. 20 is a schematic diagram showing an example of a plane structure used as a display system of a picture according to an embodiment of the present invention.
FIG. 21 is a schematic diagram showing examples of resolutions and displayable colors of a moving picture plane, a subtitle plane, and a graphics plane.

According to the embodiment of the present invention, a plane structure as shown in FIG. 20 is used. A moving picture plane 10 is displayed on the rearmost side (bottom). The moving picture plane 10 deals with a picture (mainly, moving picture data) designated by a play list. A subtitle plane 11 is displayed above the moving picture plane 10. The subtitle plane 11 deals with subtitle data displayed while a moving picture is being reproduced. A graphics plane 12 is displayed on the most front. The graphics plane 12 deals with character data for a menu screen and graphics data such as bit map data for buttons. One display screen is composed of these three planes.

The difference between the embodiment of the present invention and the conventional DVD video is in that sub pictures for subtitles, a menu screen, buttons, and so forth are separated into the subtitle plane 11 and the graphics plane 12 so that the subtitles and buttons are independently controlled. In the conventional DVD video, graphics such as a menu screen and buttons and subtitles are controlled by the same mechanism. They are displayed on the same plane. The number of bit map pictures that can be displayed at the same time is limited to one. Thus, in the DVD video, a plurality of bit map pictures cannot be displayed at the same time. In contrast, according to the present invention, since the subtitle plane 11 and the graphics plane 12 are independently disposed for subtitles and graphics, respectively, the foregoing problem of the DVD can be solved.

It can be thought that the subtitle plane 11 and the graphics plane 12 are an extension portion of "Blu-ray Disc Rewritable Format Ver 1.0 part 3".

The moving picture plane 10, the subtitle plane 11, and the graphics plane 12 can be independently displayed. The moving picture plane 10, the subtitle plane 11, and the graphics plane 12 have resolutions and display colors as shown in FIG. 21. The moving picture plane 10 has a resolution of 1920 pixels×1080 lines, a data length of 16 bits per pixel, a color system of YCbCr (4:2:2), where Y represents a luminance signal and Cb and Cr represent color difference signals. YCbCr (4:2:2) is a color system having a luminance signal Y of eight bits per pixel and color difference signals Cb and Cr of eight bits each. With two horizontal pixels of the color difference signals Cb and Cr, data of one color data is composed.

The subtitle plane 11 has a resolution of 1920 pixels×1080 lines, a sampling depth of eight bits per pixel, and a color system having eight-bit color map addresses using a palette of 256 colors.

The graphics plane 12 has a resolution of 1920 pixels×1080 lines, a sampling depth of eight bits per pixel, and a color system of eight-bit color map addresses using a palette of 256 colors.

In the forgoing description, the subtitle plane 11 and the graphics plane 12 have a color system of eight-bit color map addresses using a palette of 256 colors. However, the subtitle plane 11 and the graphics plane 12 are not limited to such examples. The number of colors can be increased by changing the sampling depth and increasing the number of colors of the palette. When the sampling depth is 12 bits, the number of colors that can be used with the palette is 4096. When the sampling depth is 24 bits, YCbCr (4:4:4) and RGB (4:4:4) of which each pixel has color information can be used.

The graphics plane 12 and the subtitle plane 11 can be alpha-blended in 256 levels. When the graphics plane 12 and the subtitle plane 11 are combined with another plane, the transparency can be set in 256 levels. The transparency can be set for each pixel. In the following description, the transparency α is represented in the range of (0□α□1) where transparency α=0 represents perfect transparent; transparency α=1 represents perfect intransparent.

The subtitle plane 11 deals with picture data of for example PNG (Portable Network Graphics) format. Likewise, the graphics plane 12 can deal with picture data of the PNG format. In the PNG format, the sampling depth of one pixel is in the range from one bit to 16 bits. When the sampling depth is eight bits or 16 bits, an alpha channel, namely transparency information (referred to as alpha data) of each pixel component can be added. When the sampling depth is eight bits, transparency can be designated in 256 levels. With the transparency information of the alpha channel, alpha-blending is performed. A palette image of up to 256 colors can be used. An element (index) of the prepared palette can be represented with an index number.

Picture data dealt with the subtitle plane 11 and the graphics plane 12 is not limited to the PNG format. Alternatively, picture data that has been compression-encoded in accordance with for example JPEG system, picture data that has been run-length-compressed, or bit map data that has not been compression-encoded may be used.

Figure 22:
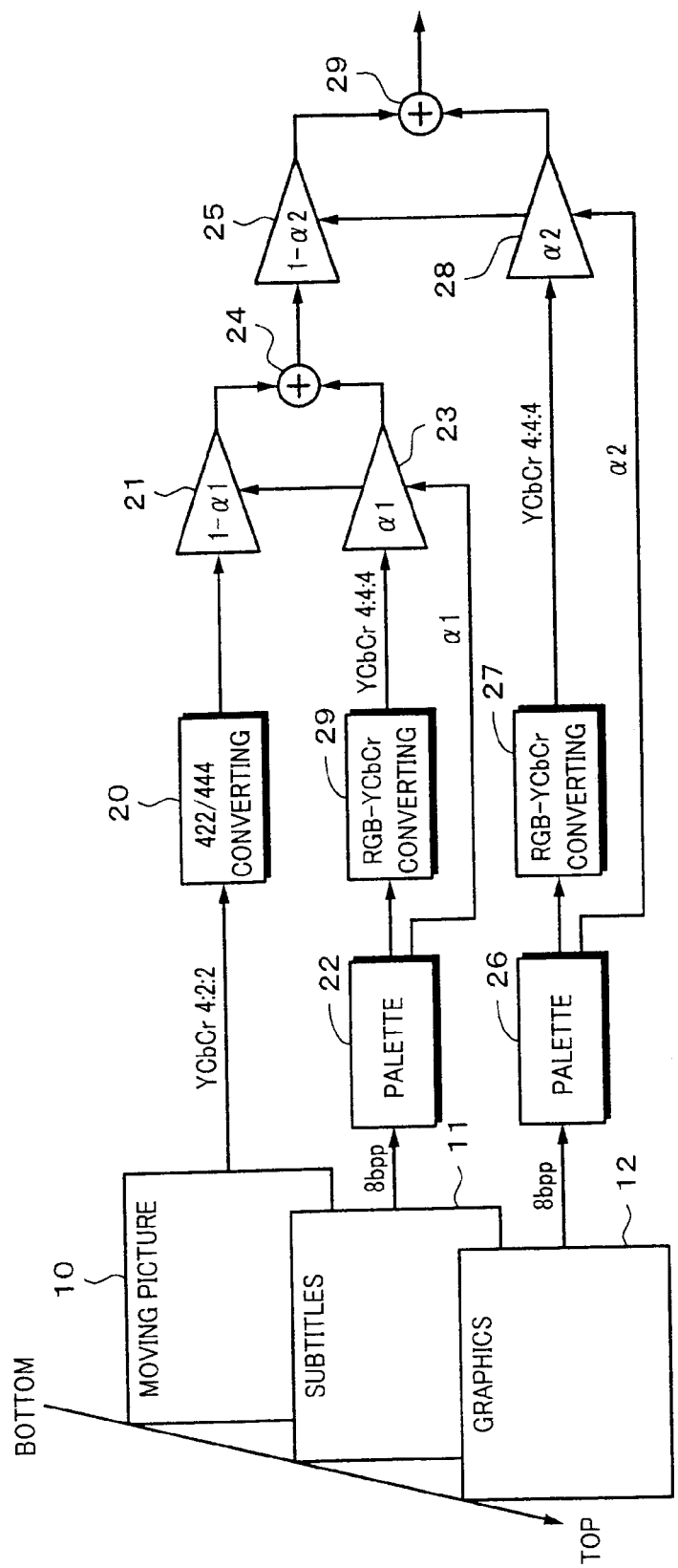
FIG. 22 is a block diagram showing an example of a structure that combines the moving picture plane, the subtitle plane, and the graphics plane.

FIG. 22 shows an example of a structure of which three planes are combined with reference to FIG. 20 and FIG. 21. Moving picture data of the moving picture plane 10 is supplied to a 422/444 converting circuit 20. The 422/444 converting circuit 20 converts the color system of the moving picture data from YCbCr (4:2:2) into YCbCr (4:4:4) and inputs the converted data to a multiplying device 21. A resolution converting circuit may be disposed between the 422/444 converting circuit 20 and the multiplying device 21 so as to convert the resolution of the moving picture data.

Picture data of the subtitle plane 11 is input to a palette 22. The palette 22 outputs picture data of RGB (4:4:4). When transparency of alpha-blending is designated for the picture data, designated transparency α1 (0□α1□1) is output from the palette 22.

FIG. 23 shows an example of input/output data of the palette 22. The palette 22 holds palette information as a table corresponding to for example a PNG format file. An index number is referenced as an address of picture data of input data of eight bits from the palette 22. In accordance with the index number, data of RGB (4:4:4) composed of data of eight bits each is output. In addition, data of the alpha-channel that represents transparency is obtained from the palette 22.

FIG. 24 shows an example of a palette table that the palette 22 has. 256 color index values [0x00] to [0xFF] (where [0x] represents hexadecimal notation) are assigned three primary color values R, G, and B and transparency α each of which is represented with eight bits. The palette 22 references the palette table in accordance with the input PNG format picture data and outputs data of colors R, G, and B (RGB data) and transparency α of eight bits each for each pixel in accordance with an index value designated by the picture data. A palette 26 also has a palette table similar to that of the palette 22.

The RGB data that is output from the palette 22 is supplied to an RGB/YCbCr converting circuit 29. The RGB/YCbCr converting circuit 29 converts the RGB data into a luminance signal Y and color difference signals Cb and Cr of eight bits each (hereinafter, they together are referred to as YCbCr data). This is because data of planes should be combined in the common data format. Data is unified to YCbCr data that is the data format of moving picture data.

The YCbCr data and the transparency data α1 that are output from the RGB/YCbCr converting circuit 29 are input to a multiplying device 23. A resolution converting circuit may be disposed between the RGB/YCbCr converting circuit 29 and the multiplying device 23 so as to convert the resolution of the YCbCr data. The multiplying device 23 multiplies the input YCbCr data by the transparency data α1. The multiplied result is input to one input terminal of an adding device 24. The multiplying device 23 multiplies each of the luminance signal Y and the color difference signals Cb and Cr of the YCbCr data by the transparency data α1. A complement (1−α1) of the transparency data α1 is supplied to the multiplying device 21.

The multiplying device 21 multiplies the moving picture data that is input from the 422/444 converting circuit 20 by the complement (1−α1) of the transparency data α1. The multiplied result is input to the other input terminal of the adding device 24. The adding device 24 adds the multiplied results of the multiplying device 21 and the multiplying device 23. As the result, the moving picture plane 10 and the subtitle plane 11 are combined. The added result of the adding device 24 is input to a multiplying device 25.

Like the subtitle plane 11, data of RGB (4:4:4) is output as picture data of the graphics plane 12 from the palette table 26 and input to an RGB/YCbCr converting circuit 27. When the color system of picture data of the graphics plane 12 is RGB (4:4:4), it is converted into YCbCr (4:4:4) and output from an RGB/YCbCr converting circuit 27. The YCbCr data that is output from the RGB/YCbCr converting circuit 27 is input to a multiplying device 28. A resolution converting circuit may be disposed between the RGB/YCbCr converting circuit 27 and the multiplying device 28 so as to convert the resolution of the YCbCr data.

When transparency of alpha-blending has been designated to index values of the palette 26, designated transparency α2 (0□α2□1) is output from the palette 26. The transparency data α2 is supplied to the multiplying device 28. The multiplying device 28 multiplies each of the luminance signal Y and the color difference signals Cb and Cr of the YCbCr data that is input from the RGB/YCbCr converting circuit 27 by the transparency data α2. The multiplied result of the multiplying device 28 is input to one input terminal of an adding device 29. A complement (1−α2) of the transparency data α2 is supplied to the multiplying device 25.

The multiplying device 25 multiplies the added result of the adding device 24 by the complement (1−α2) of the transparency data α2. The multiplied result of the multiplying device 25 is input to the other input terminal of the adding device 27. The adding device 27 adds the multiplied results of the multiplying device 25 and the multiplying device 28. As a result, the graphics plane 12 and the combined result of the moving picture plane 10 and the subtitle plane 11 are combined.

When the transparency a of a non-picture region of the subtitle plane 11 and the graphics plane 12 is designated to 0 (α=0), a plane below those planes 11 and 12 becomes transparent. As a result, moving picture data on the moving picture plane 10 can be displayed as a background of the subtitle plane 11 and the graphics plane 12.

The structure shown in FIG. 22 can be accomplished by hardware or software.

In the foregoing description, the graphics plane 12 has a resolution of 1920 pixels×1080 lines and a color system of eight-bit color map addresses using a color palette of 256 colors. However, it should be noted that the resolution and number of colors of the graphics plane 12 are not limited to the foregoing example.

For example, the graphics plane 12 may have a resolution of 960 pixels×540 lines and a sampling depth of 24 bits of which each pixel has color information of eight bits for each color of RGB and alpha-data of eight bits. In this case, the number of colors that can be used becomes much larger than the foregoing 256 colors. As a result, enrichment of pictures increases. Since the number of pixels decreases, the rewriting speeds of the planes do not decrease. When the graphics plane 12 is used for natural pictures and high speed animations, it will be effective.

In that example, the number of pixels is one fourth of the forgoing example of 1920 pixels×1080 lines. On the other hand, since the amount of data per pixel is increased four times from eight bits to 32 bits, the amount of data of the graphics plane 12 does not change in total. Thus, that example can be easily accomplished by changing the method for using the frame memory without need to use an additional memory.

In addition, since color information of eight bits is assigned to each color of RGB, the number of colors that can be displayed is sufficient. Thus, the palette 22 shown in FIG. 22 can be omitted. Picture data on the graphics plane 12 is directly input to the RGB/YCbCr converting circuit 27. The alpha-data α2 is extracted and supplied to the multiplying device 28 not through the RGB/YCbCr converting circuit 27.

In contrast, the resolution of each of the moving picture plane 10 and the subtitle plane 11 that are combined with the graphics plane 12 is 1920 pixels×1080 lines. When a picture is actually displayed, one pixel of the graphics plane 12 whose resolution is quartered is repeatedly displayed for four pixels of 2 pixels×2 lines on the moving picture plane 10 or the subtitle plane 11. After the apparent resolutions are adjusted, the moving picture plane 10 and the subtitle plane 11 are combined.

With the foregoing planes designated, a menu screen and buttons necessary for the reproduction-only disc standard can be displayed. When a button is selected on the menu screen, a play list corresponding to the button is reproduced. At that point, information about a link of play lists should have been recorded on a disc. The menu screen will be described in Section 2-2 that follows. A scenario that defines a link of play lists will be described in Sections 2-3 and 2-4.

2-2. About Menu Screen

Figure 25:
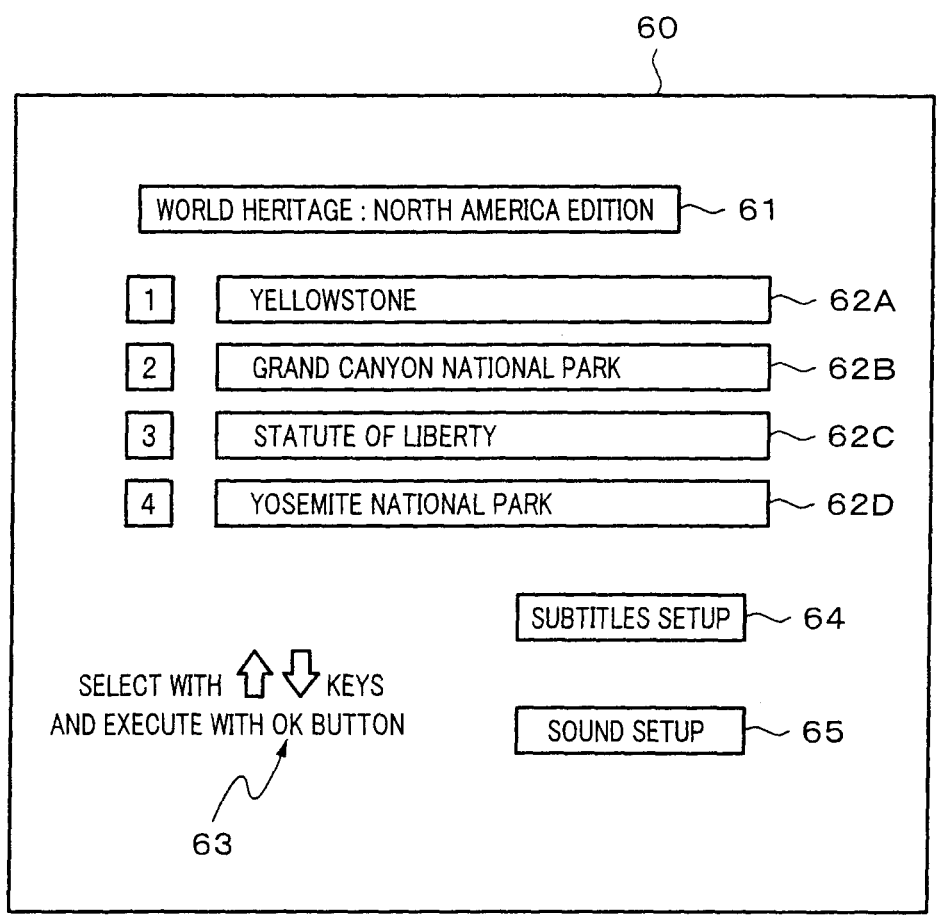
FIG. 25 is a schematic diagram showing an example of a menu screen displayed on the graphics plane.

A screen that prompts the user to perform an operation, for example, a menu screen, can be displayed on the graphics plane 12. FIG. 25 shows an example of a menu screen 60 displayed on the graphics plane 12. On the menu screen 60, characters and images are displayed at particular positions. With the characters and images, "links" and "buttons" that allow the user to select to new operations can be placed.

A "link" describes an access method to a predetermined file with a character string or image data. When the user designates the character string or image data on a screen with for example a pointing device, he or she can access the predetermined file in accordance with the access method designated with the character string or image data. A "button" has three types of image data that represent a normal state, a selection state, and a pressed state for a "link". When the user designates one button image, the image data is changed in accordance with the state that he or she has operated so that he or she can easily recognize the current state of the button.

When the user designates a "link" or a "button", he or she moves a cursor on the screen with the mouse and clicks a mouse button (presses the mouse button several times) on a character string or an image on the "link" or an image on a "button". The same operation can be performed with another pointing device other than the mouse. Alternatively, with a remote control commander or a key operation of a keyboard, the user can designate a "link" or a "button". At that point, the user selects his or her desired "link" or "button" with a predetermined key such as a direction key and designates the selected "link" or "button" with an OK key or the like.

In the example shown in FIG. 25, a title 61 as image data is displayed at an upper portion of the menu screen 60 that is displayed on the graphics plane 12. The title 61 is followed by selection items 62A, 62B, 62C, and 62D as links. When the user selects and designates one of the selection items 62A, 62B, 62C, and 62D with a key operation of for example the remote control commander, a file linked to the designated selection item is accessed.

AT lower positions of the menu screen 60, buttons 64 and 65 are displayed. With the buttons 64 and 65, subtitles can be displayed and a language of output sound can be selected from for example English and Japanese. When the buttons 64 and 65 are operated in the foregoing manner, files used to display their setup screens are accessed and the predetermined screens are displayed.

At a lower left portion of the menu screen 60, a character string 63 that describes a method for selecting an item is displayed. The character string 63 is displayed on the graphics plane 12.

To display the menu screen 60 as shown in FIG. 25, any descriptive language for describing a screen display method, link information, and so forth is required. Although there are many types of descriptive languages for describing a menu screen for a blu-ray disc, two types of descriptive languages will be explained.

(1) A descriptive language of which original display control commands for subtitles and buttons are added to a command system of which DVD video navigation commands are changed and extended. The commands of this descriptive language are referred to as original commands.

(2) HTML (Hyper Text Markup Language), which is a descriptive language widely used in WWW (World Wide Web) of the Internet and ECMA script that is a script language that has a high affinity with HTML.

2-3. About Scenario

On the menu screen 60 for the foregoing blu-ray disc, a table of for example play lists is displayed with image data, a character string, buttons, and so forth. It is expected that when a particular play list is designated, the designated play list is read and reproduced from the disc.

In the example shown in FIG. 25, a table of play lists is displayed on the menu screen 60. In reality, images and sound of the menu screen 60 and those that are generated in accordance with an item selected on the menu screen 60 are composed of a plurality of play lists. When a plurality of play lists that compose one menu item are correlated, a mechanism of which a story is branched can be accomplished. When a story is branched, a multiple story function that causes the contents of the story to vary in accordance with the user's selection, an automatic language reproducing function that causes a proper language to be automatically reproduced in accordance with a designated language of the player, and a parental function that causes scenes to be changed in accordance with the age of the user can be accomplished.

Although those functions are especially effective for recoded discs, but they are not prescribed in the current blu-ray disc standard, which mainly aims to record/reproduce television broadcasts.

Figure 26:
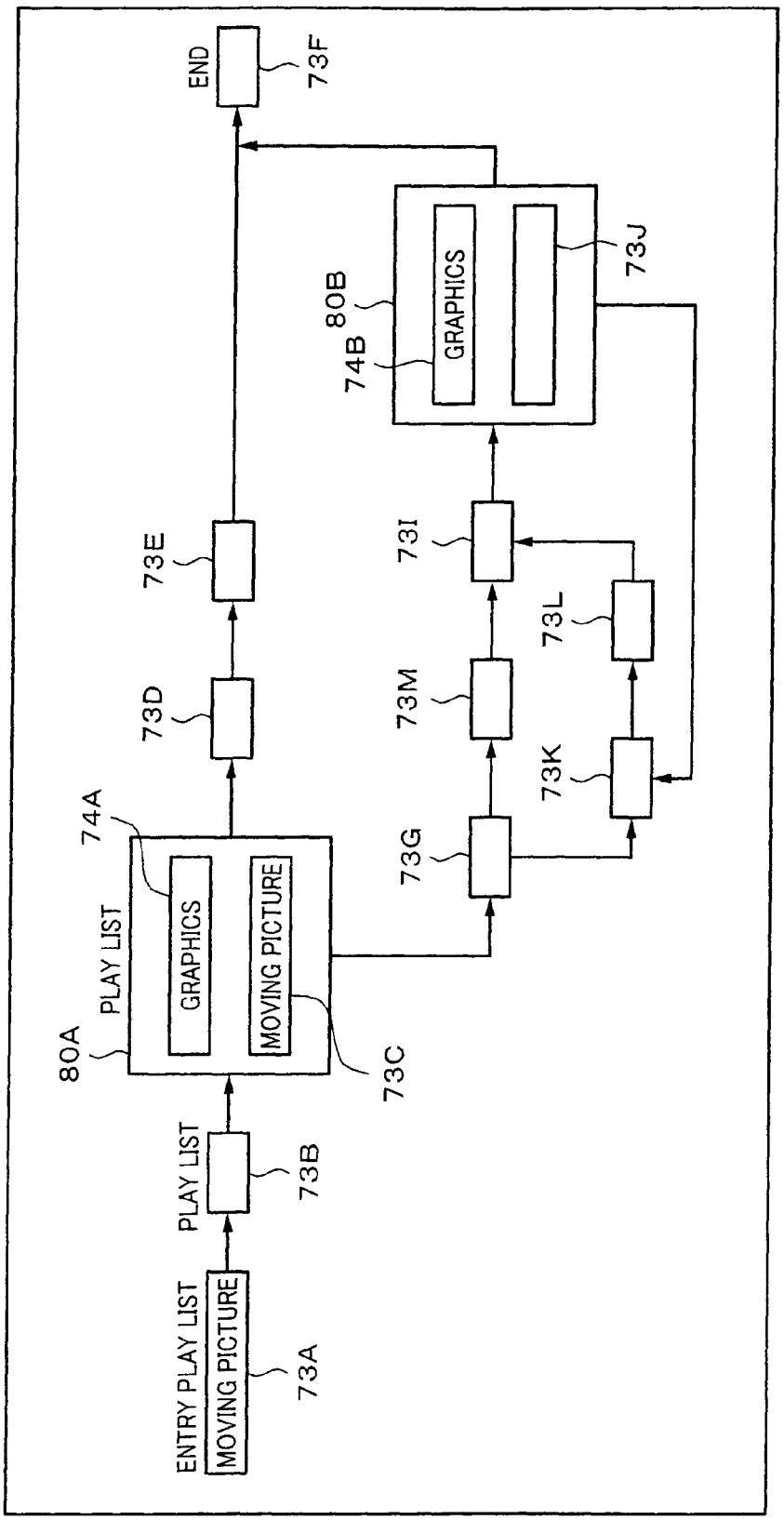
FIG. 26 is a schematic diagram showing an example of an internal structure of a scenario.

In the following description, the structure of which a plurality of play lists are arranged is referred to as scenario. FIG. 26 shows an example of an internal structure of a scenario 70 using original commands. The scenario 70 has a plurality of play lists 73A to 73M. In addition, the scenario 70 has two portions (screens 80A and 80B) on which branch selection screens are displayed with the graphics plane 12. The screen 80A has graphics data 74A and a play list 73C with which a branch selection screen is displayed. Likewise, the screen 80B has a graphics data 74B and a play list 73J with which a branch selection screen is displayed.

A scenario designates both an arrangement of play lists and display timing at which they are displayed on the graphics plane 12. The display timing of the play lists on the graphics plane 12 can be designated with display control commands added to an image displayed on the graphics plane.

In the example shown in FIG. 26, the menu screen 60 corresponds to the screen 80A of the scenario 70. A selection item (for example, the selection item 62A) on the menu screen 60 is composed of graphics 74A. When the selection item 62A is designated on the menu screen 60, the play list 73D that corresponds to the selection item is reproduced.

In the scenario 70 shown in FIG. 26, when a disc is loaded into the player, the play list 73A is reproduced. After the play list 73A has been reproduced, the play list 73B is reproduced. After the play list 73B has been reproduced, the play list 73C is reproduced. As a result, the graphics data 74A is read and the screen 80A that prompts the user to select a branch of the story is displayed.

After the screen 80A is displayed, the story is branched in accordance with a user's selection. In the example shown in FIG. 26, when a first selection is performed, the screen 80A is displayed. Thereafter, the play lists 73D, 73E, and 73F are reproduced in succession. As a result, the reproduction of the scenario 70 is completed. After the play list 73F has been reproduced, the main menu screen (for example, the foregoing menu screen 60) may be displayed again.

When a second selection is performed on the screen 80A, after the screen 80A is displayed, the play list 73G is reproduced. A mark may be set in the play list 73G at predetermined timing. When the play list 73B is reproduced, the play list 73G may be branched at the position of the mark or fully reproduced in accordance with the setting of the reproducing apparatus, user's another scenario, or a selection on the branch selection screen. When all the play list 73G is reproduced, after the play list 73G is reproduced, the play lists 73M and 73I are reproduced in succession. Thereafter, the play list 73J is reproduced.

When the play list 73G is branched at the position of the mark, the play lists 73K and 73L are reproduced in succession. After the play list 73L has been reproduced, the reproduction is resumed from the position of the mark that has been set in the play list 73I.

In the play list 73J, the graphics data 74B is read. The screen 80B that prompts the user to select a branch of the story is displayed. In the first selection on the screen 80B, the play list 73F is reproduced. In the second selection of the screen 80B, the play list 73K is reproduced from the position of the mark that has been set in the play list 73K.

When a scenario is reproduced, operations corresponding to a detected mark, a user's input, and player's operation change are performed in accordance with command sequences (programs) executed by the player for play lists.

Figure 27:
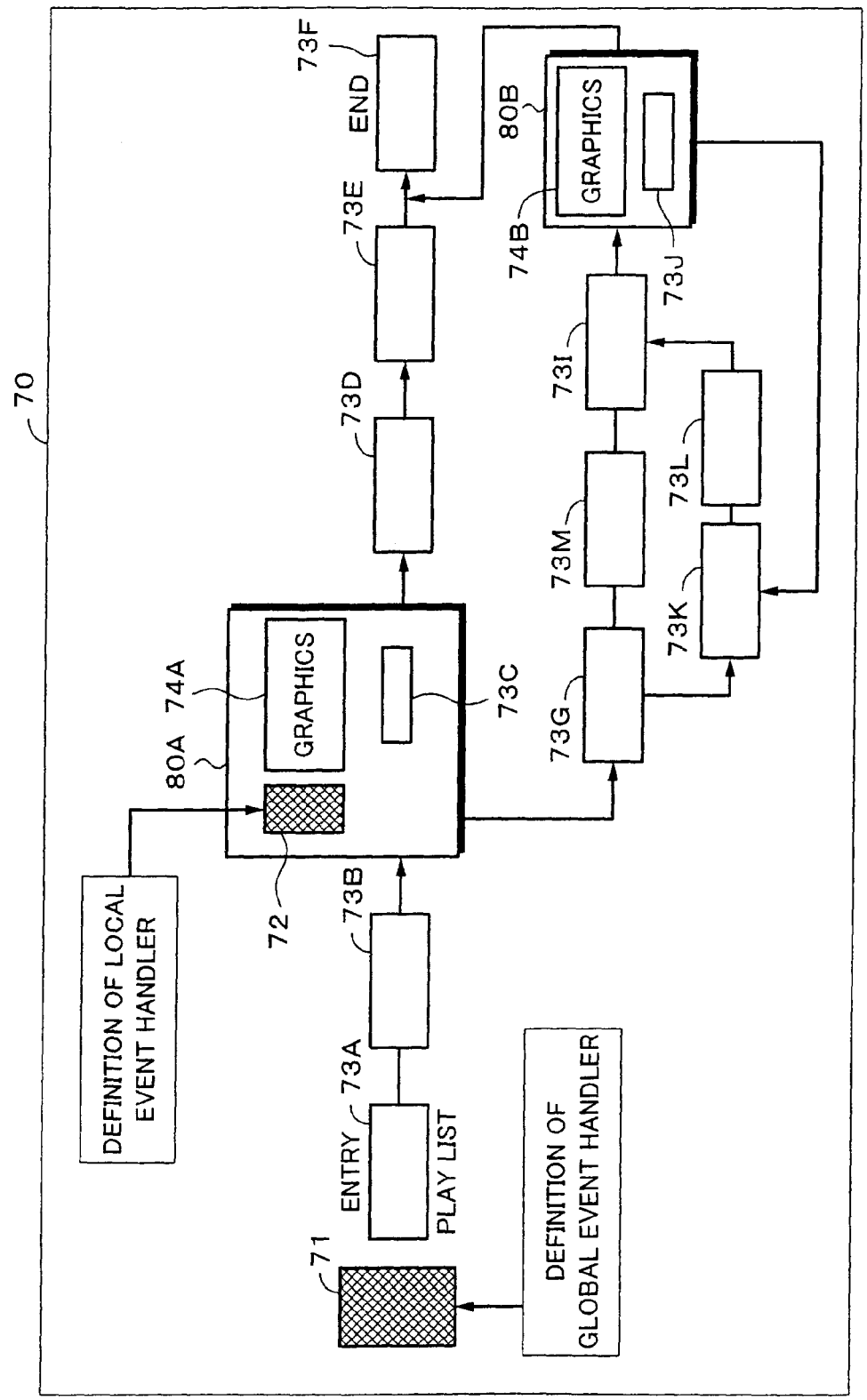
FIG. 27 is a schematic diagram showing an example of an internal structure of a scenario.

Next, with reference to FIG. 27, a scenario structure using the HTML and ECMA script as descriptive languages will be described. In FIG. 27, for simplicity, similar portions to those in FIG. 26 will be denoted by similar reference numerals and their description will be omitted.

A scenario 70' shown in FIG. 27 has the same menus and branches as the scenario 70 shown in FIG. 26. The scenario 70' can be advance in the same manner as the scenario 70. The scenario 70' has a plurality of play lists 73A to 73M. The scenario 70' has two portions (screens 80A and 80B) on which branch selection screens are displayed on the graphics plane 12.

The screen 80A has graphics data 74A and a play list 73C for a branch selection screen. The screen 80B has graphics data 74B and a play list 73J for a branch selection screen. The scenario 70' designates an arrangement of play lists and display timing at which they are displayed on the graphics plane 12 is displayed. Display timing at which a play list is displayed on the graphics plane 12 can be designated with a mark placed in the play list.

A mark, a user's input, and an operation change of the player are detected in accordance with an event driven model. When reproduction of a play list is started, reproduction of a play list is completed, a mark is detected while a play list is being reproduced, or a user inputs data by a key operation of the remote control commander, an event takes place. When a program has an event handler that is executed upon occurrence of an event, an operation expected for the event is executed by the player.

The scenario 70' shown in FIG. 27 has two event handlers 71 and 72. Among them, the event handler 71 is a global event handler that describes an event handler that is effective all the scenario 70. Even if any of the play lists 73A to 73M is being reproduced, when a menu button of the remote control commander is pressed, the menu screen 60 for a table of scenarios is displayed. Next, an operation for a reproducing process for a play list for the menu screen 60 will be described. In this case, an event handler that corresponds to an event that takes place when the menu button of the remote control commander is pressed (menu button press event) and that is a command that causes a play list for the menu screen 60 to be processed is described as global event handler 71.

The event handler 72 is a local event handler that is executed only while a predetermined play list is being reproduced or a predetermined user input screen is being displayed. For example, when the user designates a link displayed on the screen 80A as a branch selection screen, an operation for reproducing another play list is accomplished by describing a command that causes the play list to be reproduced against an event of which the link is designated as a local event handler.

Such a definition of an event handler is described with the ECMA script. The ECMA script is a cross-platform script language in accordance with JavaScript®. The ECMA script is prescribed by ECMA (European Computer Manufacturers Association). The ECMA script has a high affinity with an HTML document and allows a unique object to be defined.

2-4. Categories of Scenarios

Figure 28:
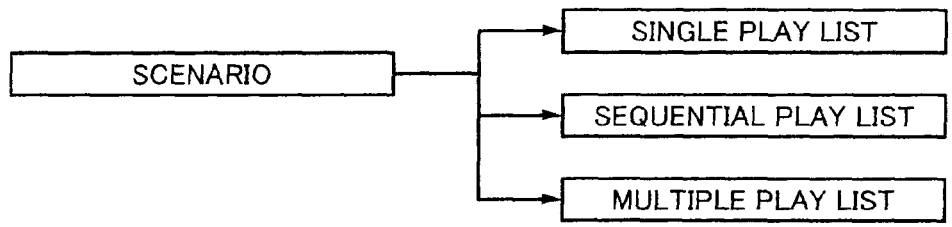
FIG. 28 is a schematic diagram describing categories of a structure of a scenario.

As will be described later, one scenario is defined in the BDVM directory. One scenario is composed of one or a plurality of play lists. Categories of scenarios will be described with reference to FIG. 28, FIG. 29A, FIG. 29B, and FIG. 29C. Based on connections of play lists, structures of scenarios can be largely categorized as three types that are (1) single play list, (2) sequential play list, and (3) multiple play list as shown in FIG. 28.

Figure 29A:
FIG. 29A, FIG. 29B, and FIG. 29C are schematic diagrams describing categories of structures of play lists.

The single play list, categorized as (1), is a scenario composed of one play list as shown in FIG. 29A. For the single play list, a time line can be defined. There is no interrupt during reproduction of the scenario. When the content of the single play list is a movie, after the disc is loaded, only a movie main part is reproduced.

Figure 29B:
Figure 29C:
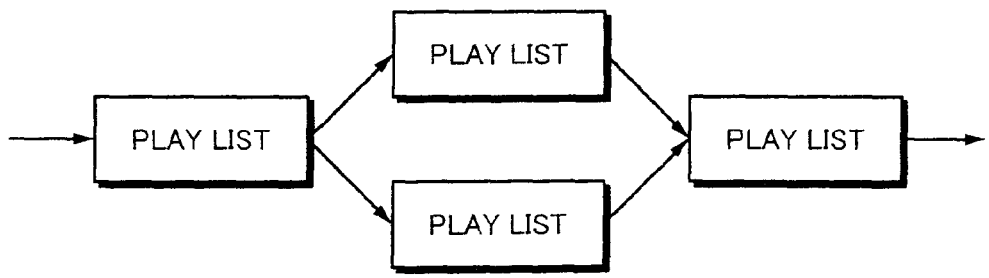

The sequential play list, categorized as (2), is a scenario composed of a plurality of play lists that are linearly arranged without a branch as shown in FIG. 29B. The play lists are arranged in such a manner that the end of one play list is connected to the beginning of the next play list. In the sequential play list, a time line can be defined for each play list. When the content of the sequential play list is a movie, the scenario is composed of a menu screen and a movie main part. After the disc is loaded, a play list that causes a menu screen to be displayed is executed. When the reproduction of the movie main part is designated on the menu screen, the next play list is executed and the movie main part is reproduced.

The multiple play list, categorized as (3), is a scenario that has a branch of a play list and a connection of play lists. In the multiple play list, a time line cannot be defined through all play lists. Instead, a time line is defined in each play list. With the multiple play list, an interactive function and a game function for varying reproduction contents in accordance with a user's input can be accomplished. When the content of the multiple play list is a movie, a multiple angle function that allows the user to select a desired angle from various angles photographed for the same scene can be accomplished.

In the reproduction-only medium, one scenario is defined for the BDVM directory. However, it is necessary to allow the user to recognize the scenario in smaller units. Nevertheless, the unit of a play list does not always accord with a unit that the user can recognize. When one play list describes three movies, it is necessary to allow the user to see a search point of each movie. A search point (entry point) that is independent from the structure of a play list is referred to as title and/or chapter.

Figure 30:
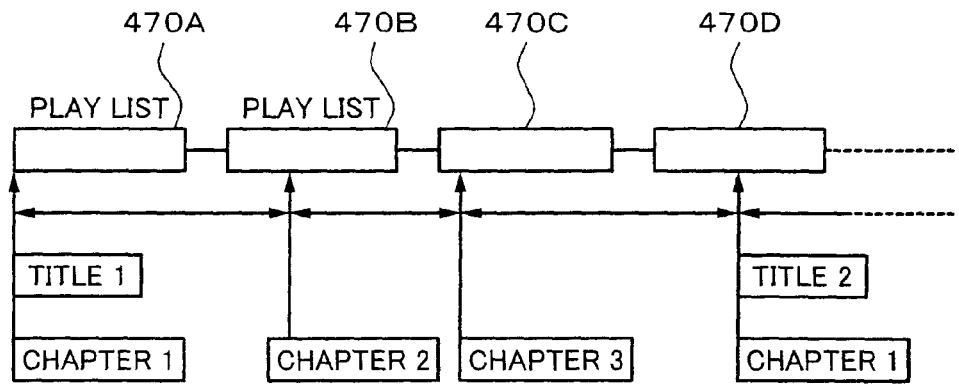
FIG. 30 is a schematic diagram describing titles and chapters.

Next, with reference to FIG. 30, titles and chapters will be described. A title represents any reproduction start point in a scenario. In the example shown in FIG. 30, a title 1 is placed at the beginning of a play list 470A. A title 2 is placed in the middle of a play list 470D. A region after the beginning of the play list 470A until the title 2 is the title 1. A chapter is a unit of which a title is sub-divided. The can also recognize a chapter as a reproduction start point. The title 1 is sub-divided into chapters. In the example shown in FIG. 30, the title 1 has chapters 1, 2, and 3. Thus, the title 1 is sub-divided into three portions. As shown in FIG. 30, each of a title and a chapter can be placed in the middle of a play list.

2-5. About Virtual Player Model

Next, a model of a reproducing apparatus that operates in accordance with description of a scenario will be considered. The modeled reproducing apparatus is referred to as BD (Blu-ray disc) virtual player. The definition of the structure of the BD virtual player is referred to as BD virtual player model.

Next, with reference to FIG. 31, the BD virtual player model will be described. After a disc is loaded into a BD virtual player 30, it reads as a PBC program 40 a scenario described in the scenario descriptive language defined in the present invention from the disc and operates in accordance with the description of the scenario.

The BD virtual player 30 reproduces data from a disc shaped recording medium defined according to an embodiment of the present invention. The BD virtual player 30 is an object in a computer environment such as a personal computer. The computer environment is not limited to a general-purpose personal computer. Instead, the computer environment includes a software environment incorporated with a dedicated reproducing apparatus and/or recording and reproducing apparatus that reproduces data from a disc shaped recording medium defined according to the embodiment of the present invention. Hereinafter, a disc shaped recording medium defined according to the embodiment of the present invention is referred to as disc.

The BD virtual player 30 roughly has two states A and B. In the state A, the BD virtual player 30 reproduces a play list and graphics. In the state B, the BD virtual player 30 stops reproducing a play list and graphics. A state change from one state to another state and a designation of the next operation in one state are performed by commands to an object of the BD virtual player 30.

The state A has a plurality of operations. As operations in the state A, there would be a high speed reproduction, a variable speed reproduction such as a reverse reproduction, and a special reproduction such as a jumping reproduction that starts from any time of a disc. When data of the graphics plane 12 is displayed, the variable speed reproduction and the special reproduction of the BD virtual player 30 would be restricted.

A PBC (Play Back Control) program 40 corresponds to a scenario recorded on the disc. As will be described later, a scenario describes a reproducing method for a play list recorded on the disc and a displaying method for a menu screen. The PBC program 40 and the BD virtual player 30 exchange commands through an API (Application Programming Interface) 41 so as to reproduce a play list recorded on the disc.

In more reality, when the state of the BD virtual player 30 changes, the PBC program 40 causes necessary information to be transferred to common parameters 32 defined as a dedicated memory of the BD virtual player 30 through the API 41. Values of the common parameters 32 are set directly with commands exchanged directly between the PBC program 40 and the BD virtual player 30 through the API 41 or indirectly with player commands 31 executed through the API 41.

According to the embodiment of the present invention, the BD virtual player 30 is controlled under an event driven model. While the BD virtual player 30 is operating, various events take place. Events are generated by hardware/OS (Operating System) 50 when the user performs a key input or operates the remote control commander or a timer interrupt takes place. The events are sent to the BD virtual player 30. Alternatively, events may be generated when a mark is detected in a reproduced play list. Furthermore, events may be generated by the BD virtual player 30 itself for example the state of which the operation of the player is changed is detected.

The types of events that take place are defined in the BD virtual player model. When an event takes place, an event handler corresponding to the event is executed. As a result, an operation prescribed in the standard for the player is executed.

Interrupt events of the BD virtual player 30 are roughly categorized as (1) an event that takes place in a content that is being reproduced, (2) an event that takes place with an interrupt by the user, and (3) an event that takes place due to a state change of the player.

The event (1), which takes place in a content that is being reproduced, is a predetermined interrupt. Whenever the content is reproduced, the event (1) takes place at the same timing. While the BD virtual player 30 is reproducing a play list, when time designated by a mark described in the play list has elapsed on the disc, a mark detection interrupt takes place in the BD virtual player 30. When a timer is designated by a script, a timer interrupt event takes place at the designated time or 10 seconds after the timer setup time designated by the script.

The event (2), which is a user's interrupt, is an event whose occurrence and occurrence timing cannot be predicted. When the user operates a key of the remote control commander, the interrupt event takes place. In this case, since it is uncertain when the user performs a key operation, the timing cannot be obtained in advance.

The event (3), which takes place due to a state change of the BD virtual player 30, is an event that causes a change of a stream of sound or subtitles to be informed. This event takes place when the state of the player changes from the reproduction state to the stop state or vice versa for a content. An event due to the state change of the player may take place in association with the event (1), which takes place in a content that is being reproduced, or the event (2), which takes place due to a user's interrupt event. As an example of an event that causes a change of a stream of sound or subtitles to be informed, when an interrupt event of a user's key operation of the remote control commander takes place, a stream of sound or subtitles is changed. As a result, since the state of the BD virtual player 30 changes, the event that causes the state change to be informed takes place.

When the HTML and ECMA script are used as descriptive languages, a display control using the graphics plane 12 is described as an HTML (Hyper Text Markup Language) 4.0 document or an XHTML (eXtensible HTML) document. As events for a display screen of the graphics plane 12, HTML 4.0 build-in events are used. If events other than the HTML 4.0 built-in events are required, they can be described using the ECMA script.

When the HTML format and the ECMA script are used in combination, if an event takes place, a process that is performed depends on whether an event handler designated with an attribute of an element of the event exists in the document. When an event handler exists, it is executed. When an event handler does not exist, it is determined whether or not a global event handler exists in the document. As a result, if a global event handler exists in the document, the event handler is executed. When the document does not describe an event handler in the script language, the BD virtual player 30 performs a default event process prepared for the event.

An event handler can be described as an attribute of an element of an HTML document or a method captureEvents of the ECMA script.

Next, the method for describing an event handler using an HTML document will be described. For example, an event onload, an event onunload, an event onclick, and an event onkeypress of built-in events prescribed in the HTML 4.0 can be used. Each of these events is described as an attribute in an element of a tag.

The event onload takes place when the user agent ends one window or all frames defined with a pair of tags <FRAMESET> </FRAMESET>. When a menu screen is displayed, the event onload takes place.

A window is a unit in which a browser application displays an HTML file in accordance with the prescription of the HTML. A frame is used to display a plurality of HTML files on divided regions of one window. HTML files in a frame and a frame itself are referred to as frame. The event onload attribute can be used with the element BODY and the element FRAMESET.

The event onunload takes place when the user agent removes one HTML document from one window or one frame. The event onunload attribute can be used with the element BODY and the element FRAMESET.

The event onclick takes place when an element is pointed with the pointing device or the like. For example, when a click operation of a mouse button is performed, the event onclick takes place. The event onclick attribute can be used with almost any element of the HTML 4.0.

The event onkeypress takes place when a key is pressed or released on or from an element. For example, when a predetermined key is pressed on the keyboard or a key of the remote control commander is pressed in a region defined with a particular element on the screen and placed in the selection state, the event onkeypress takes place. The event onkeypress attribute can be used with almost any element of the HTML 4.0.

Since the operation of the BD virtual player 30 cannot be sufficiently controlled with events of the foregoing HTML, it is necessary to define original events. FIG. 32A, FIG. 32B, and FIG. 32C show examples of original events defined in the BD virtual player 30. The events are described in an HTML document using the ECMA script. As an attribute name that designates an event handler, "on" is added to the beginning of an event name.

An event TimerFired takes place when the value of a countdown timer becomes "0" or when the value of a count up timer becomes a predetermined value. An event PlayStopped and an event PlayStilled take place when reproduction is stopped or paused. An event StillReleased takes place when the pause state is released. An event PlayPaused and an event PauseReleased take place when the user temporarily stops the reproduction and when the user releases the pause state of the reproduction. An event PlayStarted takes place when the reproduction is started. An event PlayRepeated takes place when the beginning of a region to be repeatedly reproduced is detected.

An event SPDisplayStatusChanged takes place when the display/non-display state of a sub picture (subtitle) stream is changed. An event SelectedAudioChanged and an event VideoStopped take place when an audio stream and a video stream to be reproduced is changed, respectively.

An event ScenarioStarted and an event ScenarioEnded take place when the beginning and end of a scenario are detected, respectively. An event PlayListStarted and an event PlayListEnded take place when the beginning and end of a play list are detected, respectively. An event PlayItemStarted and an event PlayItemEnded take place when the beginning and end of a play item are detected, respectively.

An event MarkEncountered takes place when a mark is detected while a play list is being reproduced. This event is used when image data is displayed on for example the graphics plane 12. The type and number of a detected mark are described in the common parameters 32.

An event ButtonPressed takes place when a button placed on a screen is pressed. For example, when a button placed on the graphics plane 12 is virtually pressed by a key operation or a click operation of the mouse, the event ButtonPressed takes place.

An event ValidPeriodStarted takes place when a valid period starts. This event can be used when a valid period for which a link can be selected is designated. An event ValidPeriodEnded takes place when the valid period ended. This event can be used when a link is forcedly executed.

An event KeyPressed takes place when a key of the remote control commander is pressed. The type of a pressed key is identified with a "switch" statement or the like of an event handler.

When original commands are used as a scenario descriptive language, events necessary for executing a scenario can be defined as a language. Thus, when a scenario is described using original commands, unlike the case that the general-purpose ECMA script is used, it is not necessary to define an event suitable for executing a scenario in a program.

2-6. About Commands

The BD virtual player 30 has commands. With these commands, the operation and the state of the BD virtual player 30, the retrieval and control of information about a video stream, an audio stream, and a sub picture (image data on the subtitle plane 11), the operation for the common parameters 32, processes for timer and key input interrupts, and the control of picture data handled on the graphics plane 12 are defined.

Figure 31:
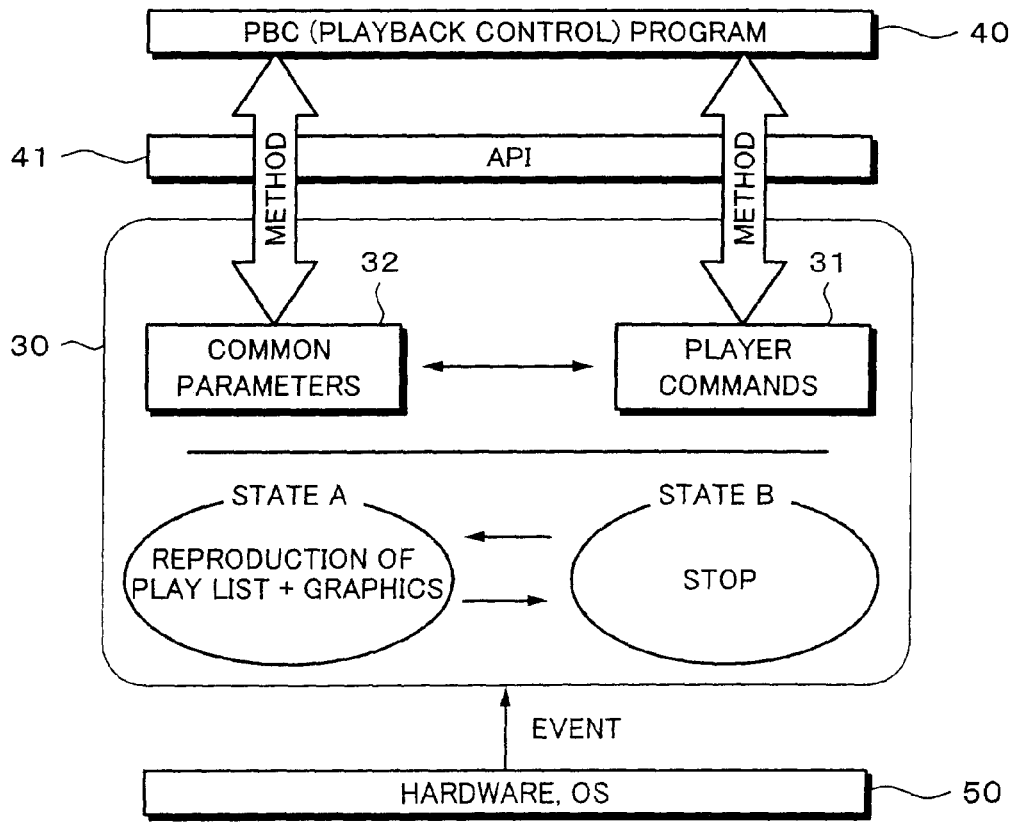
FIG. 31 is a schematic diagram describing a BD virtual player model.

These commands are built in the API 41 of the BD virtual player 30 described in FIG. 31. These commands are called in accordance with the description of the PBC program 40 through the API 41. The reproduction for a disc of the BD virtual player 30 is controlled in accordance with these commands. A real example of the PBC program 40 will be described later.

Commands that the BD virtual player 30 has slightly differ between the case that original commands are used as a scenario descriptive language and the case that the HTML and ECMA scrip are used. First of all, with reference to FIG. 33A, FIG. 33B, FIG. 33C, FIG. 33D, FIG. 33E, FIG. 33F, FIG. 33G, and FIG. 33H, commands in the case that original commands are used as a scenario descriptive language will be described.

Next, commands for designating a reproduction start position will be described. A command LinkPlayList (playListNumber) causes the reproduction of a play list designated by "playListNumber" to be started. A command LinkPlayItem (playListNumber, playItemNumber) causes the reproduction of a designated play item of a designated play list to be started. "playItemNumber" is "PlayItem_id" whose value starts from "0". When "playItemNumber" is designated a value "0", a play list to which the play item belong is reproduced from the beginning.

A command Link (position) (object) causes the current position to be moved in a scenario. This command causes the current position to be moved to the adjacent play list, play item, or chapter. A parameter "position" is one of "prey", "next", "top", "Parent", or "tail". A parameter "object" describes a moving method for an object (a play list, a play item, or a chapter) represented by the parameter "object".

A command Exit causes the reproduction of a scenario to be stopped. In this case, the value of the standard register is not held. A command RSM causes resume information stored in the memory of the player to be called, set to a register, and the reproduction of the scenario to be started.

Next, commands for obtaining the state of the player will be described. A command getMenuDescriptionLanguage( ) causes a language used to display a menu to be obtained. A command getScenarioNumber( ) a command getPlayListNumber( ) and a command getChapterNumber( ) cause a scenario number, a play list number, and a chapter number that are being reproduced, respectively, to be obtained. A command getPlayerSupport( ) causes version information of the player to be obtained.

Next, commands for video streams will be described. A command getVideoStreamAvailability( ) causes information that describes whether or not a designated video stream to be contained. A command setVideoStreamNumber( ) describes a video stream to be decoded. A command getVideoStreamNumber( ) causes the number of a video stream that is being selected to be obtained. Attributes of a video stream are for example an encoding system, a resolution, an aspect ratio, a display mode in the case that the aspect ratio is 4:3, and presence/absence of closed caption. A command setAngleNumber( ) describes an angle number. A command getAngleNumber( ) causes an angle number that is being selected to be obtained. A command getMaxVideoStreams( ) causes a maximum number of bit streams to be obtained.

Next, commands for audio streams will be described. A command getAudioStreamAvailability( ) causes information that describes whether or not a designated audio stream is contained to be obtained. A command getAudioStreamLanguage( ) causes information about a language of a designated audio stream to be obtained. A command getAudioStreamStatus( ) causes the state of a designated audio stream to be obtained. A command setAudioStreamStatus( ) causes a state of a designated audio stream to be designated. States of an audio stream are for example reproduction or non-reproduction. A command getAudioStreamAttribute( ) causes an attribute of a designated audio stream to be obtained.

Next, commands for sub picture streams (subtitle data) will be described. A command getSPStreamAvailability( ) causes information that describes whether or not a designated sub picture streams is contained to be obtained. A command getSPStreamLanguage( ) causes a language used in a designated sub picture stream to be obtained. A command getSPDisplayStatus( ) causes a display state of a sub picture stream to be obtained. A command setSPDisplayStatus( ) causes a display state of a sub picture stream to be designated. Display states of a sub picture stream are for example display on/off states thereof. A command getSPStreamAttribute( ) causes an attribute of a designated sub picture stream to be obtained. Attributes of a sub picture stream are for example an aspect ratio of 4:3 and a wide screen.

Next, commands for the common parameters 32 will be described. In the drawings, these commands are denoted by register read/write. A command clearReg( ) causes all registers of a memory region of the BD virtual player 30 to be initialized. A command setReg( ) causes a value to be set to a designated register. A command getReg( ) causes a value to be read from a designated register.

Next, commands for timers will be described. A command sleep( ) causes a process to be stopped at designated time. A command setTimeout( ) causes a function or a process to be executed after designated time has elapsed. A command setInterval( ) causes a process to be executed at designated intervals. Commands for timers can be designated in the unit of a millisecond. A command clearTimer( ) causes a process of a designated registration timer ID to be stopped. A command pauseTimer( ) causes a timer that has a registration timer ID to be temporarily stopped. A command resume- Timer( ) causes a timer that has a designated registration timer ID to be resumed from the paused state.

As a command for an effect sound, a command playSoundEffect (sound_id) causes a designated effect sound to be reproduced.

When commands exemplified in FIG. 33A, FIG. 33B, FIG. 33C, FIG. 33D, FIG. 33E, FIG. 33F, FIG. 33G, and FIG. 33H are described in a post command region and a button command region that will be described later, a jump to a predetermined play list can be accomplished. Besides these commands shown in FIG. 33A, FIG. 33B, FIG. 33C, FIG. 33D, FIG. 33E, FIG. 33F, FIG. 33G, and FIG. 33H, other commands can be defined.

Next, with reference to FIG. 34A, FIG. 34B, FIG. 34C, FIG. 34D, FIG. 34E, FIG. 34F, FIG. 34G, FIG. 34H, FIG. 34I, and FIG. 34J, commands that use the HTML and ECMA script as a scenario descriptive language will be described.

Next, commands for player operations will be described. A command playScenario (scenarioNumber, [scenarioTime]) causes a scenario designated by "scenarioNumber" to be reproduced. "scenarioNumber" is a URI (Universal Resource Identifier) that represents the location of a file that describes a scenario structure. A command playPlayList (playListNumber) causes a play list designated by "playListNumber" to be reproduced. A command playChapterMark (playListNumber, chapterNumber) causes a play list designated by "playListNumber" to be reproduced from a chapter designated by "chapterNumber". A command playPlayItem (playListNumber, playItemNumber) causes a play list designated by "playListNumber" from a play item designated by "playItemNumber". "playItemNumber" is "playItem_id". When a value "0" is designated to "playItem_id", a play list to which the play item belongs is reproduced from the beginning.

A command play (position) (object) causes the current position to be moved to an adjacent play list or play item. A parameter "position" is any one of "prey", "next", "top", "goUp", and "tail". A parameter "object" describes a moving method to a moving object (a play list, a play item, or a chapter).

A command stop( ) causes the reproduction of a scenario to be stopped. In this case, the value of the standard register is not held. A command resume( ) causes the reproduction to be resumed from the last stop position. A command playSoundEffect( ) causes a selected effect sound to be reproduced.

Next, commands for player states will be described. A command getMenuDescriptionLanguage( ) causes a language of a menu that is displayed to be obtained. A command getScenarioNumber( ), a command getPlayListNumber( ), and a command getChapterNumber( ) cause a scenario number, a play list number, and a chapter number that are being reproduced to be obtained, respectively.

Next, commands for video streams will be described. A command setVideoStreamNumber( ) describes a video stream to be decoded. A command getVideoStreamNumber( ) a command getVideoStreamStatus( ) and a command getVideoStreamAttr( ) cause a video stream number, a state, and an attribute of a video stream that is being reproduced to be obtained, respectively. Attributes of a video stream are for example an encoding system, a resolution, an aspect ratio, a display mode in the case that the aspect ratio is 4:3, and presence/absence of a closed caption. A command setAngleNumber( ) describes an angle number. A command getAngleNumber( ) causes an angle number that has been selected to be obtained. A command getMaxVideoStream( ) causes a maximum number of video streams to be obtained.

Next, commands for audio streams will be described. A command getAudioStreamAvailability( ) causes information that describes whether or not a designated audio stream is contained to be obtained. A command getAudioStreamLanguage( ) causes information about a language of a designated audio stream to be obtained. A command setAudioStreamStatus( ) causes a state of a designated audio stream to be obtained. A command setAudioStreamStatus( ) causes a state of a designated audio stream to be designated. States of an audio stream are for example whether or not it is reproduced. A command getAudioStreamAttribute( ) causes an attribute of a designated audio stream to be obtained.

Next, commands for sub picture streams (subtitle data) will be described. A command getSPStreamAvailability( ) causes information that describes whether or not a designated sub picture stream is contained to be obtained. A command getSPStreamLanguage( ) causes a language used in a designated sub picture stream to be obtained. A command getSPDisplayStatus( ) causes a display state of a sub picture stream to be obtained. A command setSPDisplayStatus( ) describes a display state of a sub picture stream. Display states of a sub picture stream are for example whether or not the sub picture stream is displayed. A command getSpStreamAttribute( ) causes an attribute of a designated sub picture stream to be obtained. Attributes of a sub picture stream are for example whether the sub picture stream is displayed with an aspect ratio of 4:3 or with a wide screen.

Next, commands for the common parameters 32 will be described. Commands for the common parameters 32 are represented as commands for register read/write in FIG. 34A, FIG. 34B, FIG. 34C, FIG. 34D, FIG. 34E, FIG. 34F, FIG. 34G, FIG. 34H, FIG. 34I, and FIG. 34J. A command clearReg( ) causes all registers of a memory region of the BD virtual player 30 to be initialized. A command setReg( ) causes a value to be set to a designated register. A command getReg( ) causes a value to be read from a designated register.

Next, commands for timers will be described. A command sleep( ) causes a process to be stopped at designated time. A command setTimeout( ) causes a function or a process to be executed after designated time has elapsed. A command setInterval( ) causes a process to be executed at intervals of designated time. Commands for timers can be designated in the unit of a millisecond. A command clearTimer( ) causes a process that has a designated registration timer to be stopped. A command pauseTimer( ) causes a timer that has a designated registration ID to be temporarily stopped. A command resumeTimer( ) causes a timer that has a designated registration timer ID to be resumed from the pause state.

As a command for a key input, a command getPressedKey( ) causes the type of a key that has been input (pressed) to be obtained.

Next, commands for graphics will be described. A command loadGraphics (htmlfile, ID) causes a file designated by "htmlfile" to be read and the file to be expanded to the graphics plane 12 in a non-display state. An "ID" is assigned to an expanded graphics image and referenced with a command that will be described later. A command showGraphics (ID) causes an image expanded on the graphics plane 12 by the foregoing command load Graphics (htmlfile, ID) to be displayed. A command hideGraphics (ID) causes an image designated by "ID" to be hidden.

Next, other commands will be described. A command random (input Number num) causes a random number from 1 to "num" to be generated. Random numbers are generated by a unique definition. A command catchEvent (eventname, eventhandler) causes a function designated by "eventhandler" to be executed when an event designated by "eventname" takes place.

2-7. About Execution of Commands

Next, execution of commands that are defined as described above will be described. First of all, the case that original commands are used as a scenario descriptive language will be described. When original commands are used as a scenario descriptive language, a scenario has two regions for commands including a program having commands that cause the player to be operated. The two regions are referred to as global command region and local global command region.

The global command region has programs that are effective for the entire scenario. For example, the global program region describes a program that causes the player to initialize parameters when a disc is loaded into the player and to jump to a play list that composes a menu screen. The local command region describes programs for play lists. Local commands are categorized as four types of commands that are pre-commands, play item commands, post commands, and button commands.

Figures 35A, 35B:
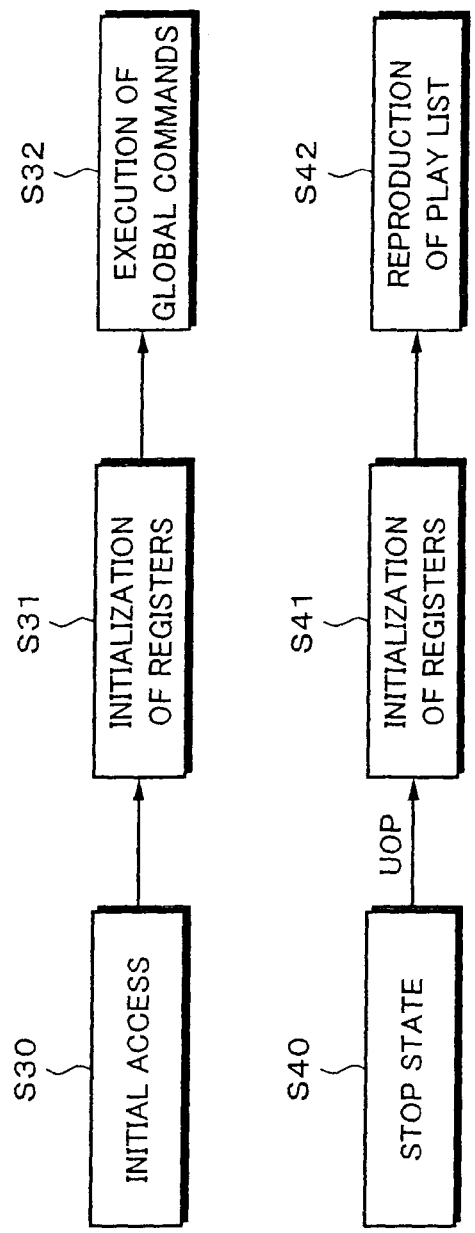
FIG. 35A and FIG. 35B are flow charts showing outlined operations of the BD virtual player by commands of a scenario that describes original commands as a descriptive language.

FIG. 35A and FIG. 35B show an outlined operation of the BD virtual player 30 with a scenario that describes original commands as a descriptive language. FIG. 35A shows an example of a disc loading operation of the BD virtual player 30. As described above, one scenario is created for the BDMV directory that will be described later. When the disc is loaded into the player and then an initial access is performed for the disc (at step S30), registers, namely, the common parameters 32 are initialized (at step S31). At the next step S32, a program is read from the disc and executed. The initial access represents an operation of which reproduction for a disc is performed first time for example when a disc is loaded into the player.

A command group (a program) that is initially read and executed when the disc is loaded into the player is referred to as global commands. The global commands describe for example an advertisement picture (trailer) and a jump command that jumps to a play list that composes a menu screen. The player reproduces the play list in accordance with the commands.

FIG. 35B shows an example of an operation of the player 30 when the user presses for example the play key while the player is in the stop state. This operation corresponds to the state change from the state B to the state A of the BD virtual player 30 as described in FIG. 31. In the stop state (at step S40), the user causes the BD virtual player 30 to operate in the reproduction mode with for example the remote controller (UOP: User Operation). At a result, the registers (namely, the common parameters 32) are initialized (at step S41). At the next step S42, the BD virtual player 30 enters a play list reproduction phase.

Figure 36A:
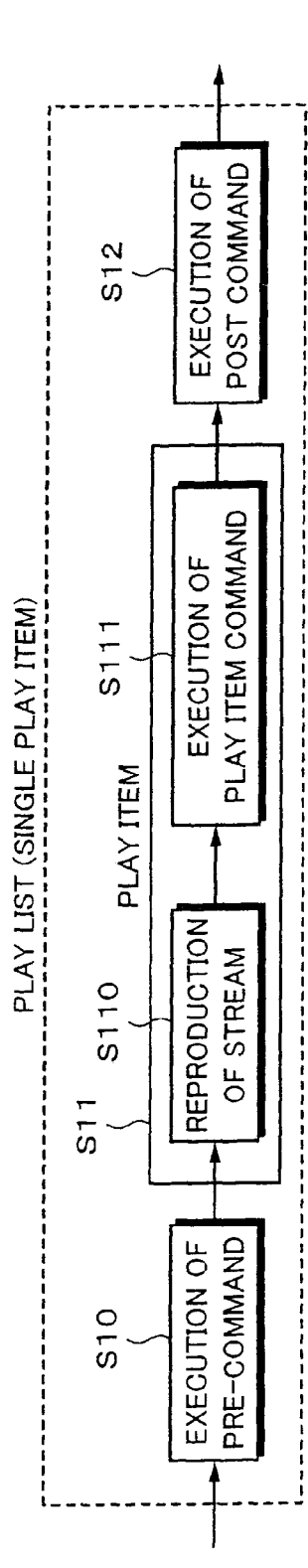
FIG. 36A and FIG. 36B are flow charts describing reproducing operations in accordance with play lists.

Next, with reference to FIG. 36A and FIG. 36B, reproduction of a play list in the play list reproduction phase will be described. FIG. 36A shows an example of which a play list is composed of a single play item. A play list has a pre-command region, a play item command region, and a post-command region that describes respective programs. In the play list reproduction phase, a pre-command of the pre-command region is executed (at step S10). After the pre-command has been executed, the player enters a play item reproduction phase for play items that compose the play list (at step S11). In the play item reproduction phase, a stream whose start point and end point are designated by a play item is reproduced (at step S110). When the stream has been reproduced up to the end point, the play item command is executed (at step S111). After the play item command has been executed, a post command of the post-command region is executed (at step S12). As a result, the play list has been reproduced.

The post command is normally a jump command that describes as a jump command a play list to be reproduced next or a play list that composes a menu screen. When there is no a jump command, the player enters the stop state (the state B shown in FIG. 31B).

Figure 36B:
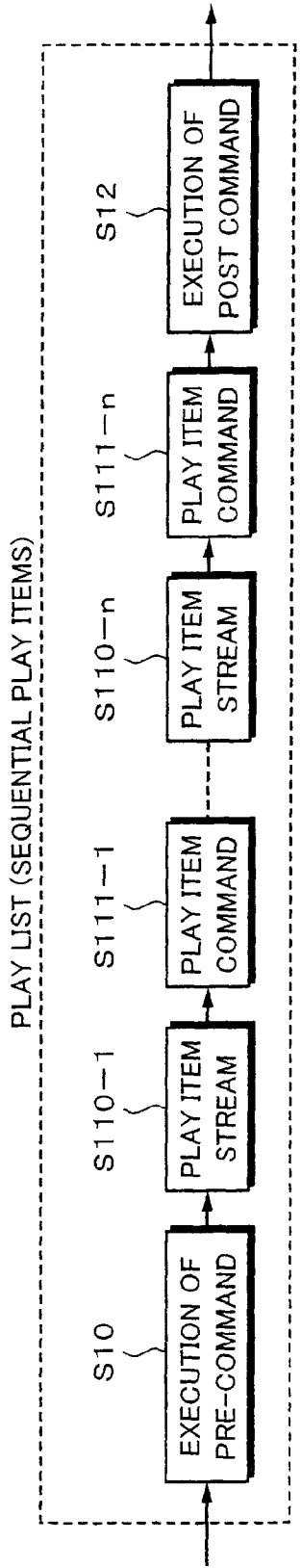

FIG. 36B shows an example of which a play list describes a plurality of play items. In this case, the play list has a pre-command region, a play item command region, and a post-command region that describe respective commands. When the play list describes a plurality of play items, the play item command region describes play item streams and play item commands of play items arranged in a time sequence.

When the play list describes a plurality of play items, in the play list reproduction phase, a pre-command is executed (at step S10). In the next play item reproduction phase, a stream is reproduced from the start point to the end point of each play item and a play item command is executed for each play item. In the example shown in FIG. 36B, a first play item stream is reproduced (at step S110-1). Thereafter, the corresponding play item command is executed (at step S111-1). Thereafter, a second play item stream (not shown) is reproduced (at step S110-2). The corresponding play item command is executed (at step S111-2). These operations are repeated for the number of the play items. After the last play item stream has been reproduced (at step S110-n) and the corresponding play item command has been executed (at step S111-n), the play item reproduction phase is completed. After the play item reproduction phase has been completed, a post command is executed (at step S12). As a result, the play list reproduction phase is completed.

Figure 37A:
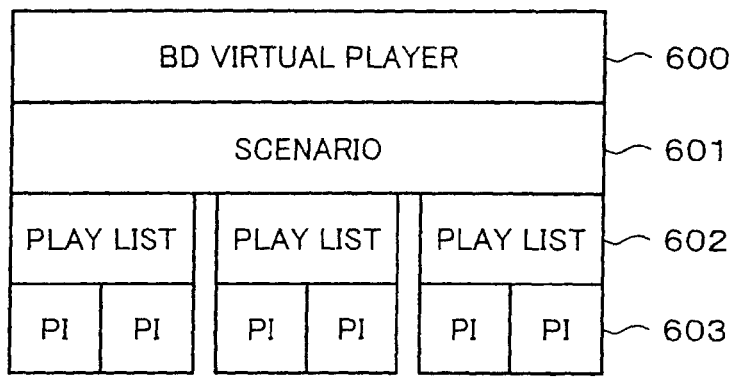
FIG. 37A and FIG. 37B are schematic diagrams showing examples of hierarchical structures of scenarios.

According to the embodiment of the present invention, scenarios, play lists, and play items that are executed on the BD virtual player 30 can be hierarchically considered. In other words, as shown in FIG. 37A, one scenario layer 601 is placed under a BD virtual player layer 600. A play list layer 602 that has one or a plurality of play lists is placed under the scenario layer 601. A play item (PI) layer 603 is placed under the play list layer 602. Each play list may have one or a plurality of play items.

Figure 37B:
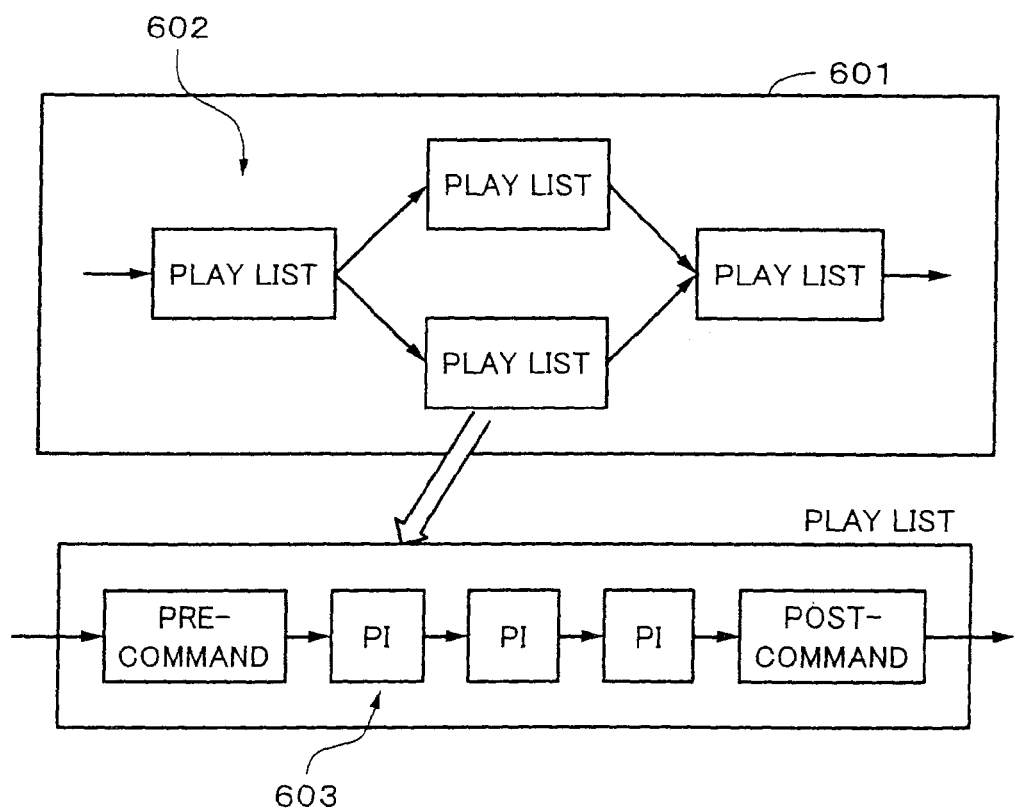

In such a hierarchical structure, play lists and play items are executed by the BD virtual player through the scenario layer 601. Thus, when control commands for play lists are described in a scenario, branches and so forth of the play lists can be easily accomplished. This applies to play items as shown in FIG. 37B.

Next, an example of which the HTML and ECMA script are used as a scenario descriptive language will be described. In the following, a more practical example of the PBC program 40 that uses the HTML and ECMA script as a scenario descriptive language will be described.

When a scenario is described using the HTML and ECMA script, one script file is created for one scenario. When the menu screen 60 is displayed on the graphics plane 12, one HTML file is created for one screen. A script file and an HTML file have extensions "js" and "html", respectively. These extensions distinguish these two types of files. A file of a script program that is initially executed when a disc is loaded into a drive device has a fixed file name for example "startup.js".

Figure 38:
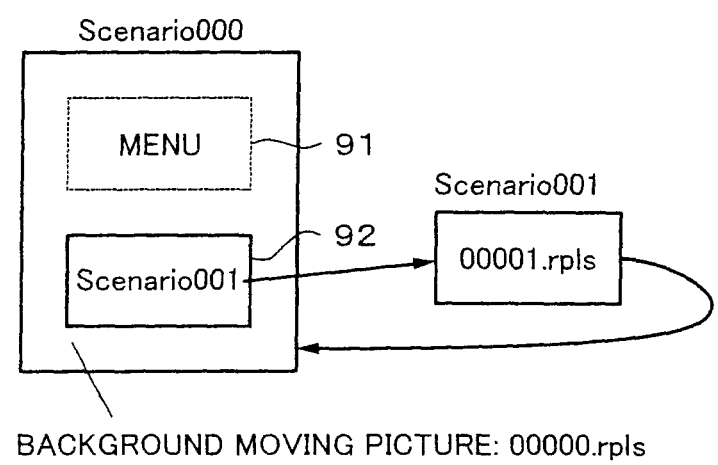
FIG. 38 is a schematic diagram showing an example of a structure of a scenario recorded on a disc.

Next, as an example, a disc having a scenario structure shown in FIG. 38 will be considered. This disc has two scenarios Scenario000 and Scenario001. The scenario Scenario000 causes a menu screen 91 that has a link button to the scenario Scenario001 to be displayed. When the disc is loaded into the reproducing apparatus, the menu screen 91 is displayed. When a button 92 on the menu screen 91 is clicked, the scenario Scenario001 is reproduced. After the scenario Scenario001 has been reproduced, the menu screen 91 is displayed again.

FIG. 39 shows an example of a list of files necessary for the structure shown in FIG. 38. In this example, six files that are a file "startup.js", a file "scenario000js", a file "000.html", a file "00000.rpls", a file "scenario001.js", and a file "00001.rpsi" are required.

Among those files, the file "scenario000js" is a script file that describes structural information of the scenario Scenario000. The file "scenario000js" describes structural information of the menu screen 91, namely a scenario list screen. The file "000.html" is an HTML file that describes layout information of the menu screen 91. The file "00000.rpls" is a play list file that is displayed as a background of the menu screen 91. The file "scenario001.js" is a script file that describes structural information of the scenario Scenario001. The file "00001.rpls" is a play list file that describes information of a play list reproduced in accordance with the scenario Scenario001.

In FIG. 39, contents files (a clip information file "%%%%%.clip" and an AV stream file "*****.m2ts") that are reproduced in accordance with the play list files "00000.rpls" and "00001.rpls" are omitted.

Figure 40:
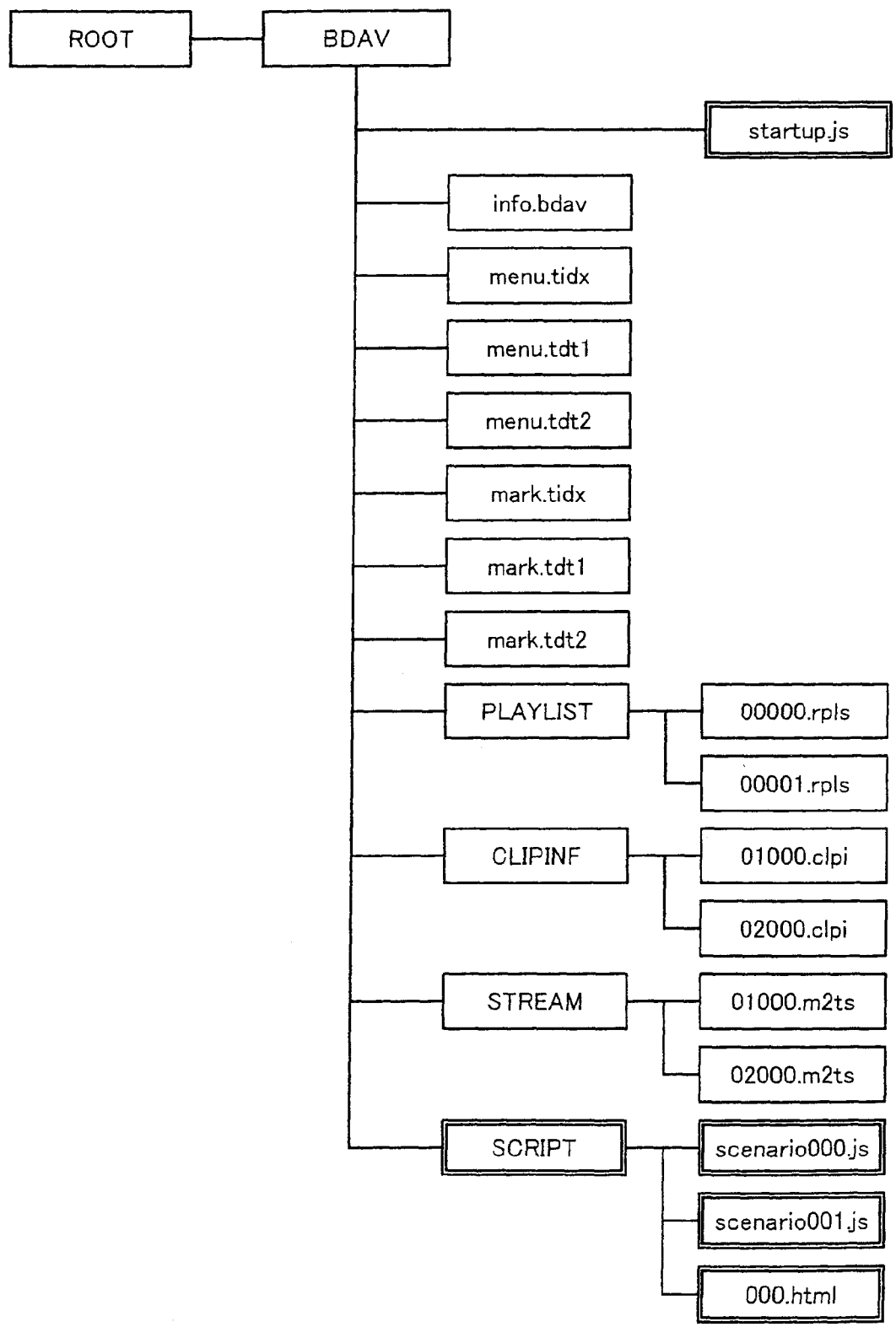
FIG. 40 is a schematic diagram showing an example of a structure of a directory in the case that a scenario is recorded on a disc.

Each file shown in FIG. 39 is recorded on a disc in accordance with a directory structure as shown in FIG. 40. The file "startup.js" is placed immediately under the directory BDAV. The directory SCRIPT is placed under the directory BDAV. Script files (for example, "Scenario000.js") and HTML files (for example, file "000.html") that describe structural information of a scenario are placed under the directory SCRIPT.

FIGS. 41 to 44 show practical examples of descriptions of script files and HTML files. FIG. 41 is an example of the description of the file "startup.js". The file "startup.js" defines the number of scenarios and names thereof recorded on the disc. A method playScenario ("scenario000") causes the file "scenario000js" to be called and the scenario Scenario000 to be reproduced. When the scenario Scenario000 is reproduced, the menu screen 91 is displayed.

FIG. 42 is an example of the description of the file "scenario000js". When an event that defines a function and describes a method catchEvent( ) with "on" (see FIG. 32A, FIG. 32B, and FIG. 32C) takes place, contents defined in the function are executed. In the example shown in FIG. 42, an HTML file "000.html" that describes layout information of the menu screen 91 is designated. Read timing and display timing of the menu screen 91 to the graphics plane 12 are controlled. In addition, a method playPlayList ("00000.rpls") causes the play list "00000.rpls" to be reproduced.

The file "scenario000js" causes a moving picture of the play list "00000.rpls" to be displayed on the moving picture plane 10. In addition, the file "scenario000js" causes the menu screen 91 to be displayed on the graphics plane 12 at timing of a mark detected while the play list "00000.rpls" is being reproduced.

FIG. 43 is an example of the description of the file "000.html". In a portion surrounded by tags <style type="text/css"> and </style>, layout information on the menu screen 91 for an image referenced by "menu" and "scenario000" is described. In the example shown in FIG. 43, the layout information is described with absolute coordinates on the screen. Image data referenced with the image name "menu" is displayed as an image having a width of 200 pixels and a height of 50 pixels at a position of 200 pixels from the upper end of the screen and 800 pixels from the left end of the screen. Likewise, image data referenced with the image name "scenario" is displayed as an image having a width of 400 pixels and a height of 100 pixels at a position of 700 pixels from the upper end of the screen and 700 pixels from the left end of the screen.

In a portion surrounded by tags <script type="text/javascript"> and </script>, event handlers for mouse operations on Moverhandler (f), on Mounthandler (f), and on Mclickhandler (f) are defined. In the example shown in FIG. 43, image data "201.png", "200.png", and "202.png" as button images are correlated with the event handlers on Movehandler (f), on Mouthandler (f), and on Mclickhandler (f). In addition, the event handler on Mclickhandler (f) causes the scenario file "scenario001.js" to be reproduced.

In a portion surrounded by tags <body> and </body>, image data displayed on the graphics plane 12 of the menu screen 91 is described. File names ("100.png" and "200.png") of image data corresponding to image names described in the portion surrounded by the tags <style type="text/css"> and </style> are described. When events on Mouseover, on Mouseout, and onclick take place for the image data referenced by the image name "scenario000" in accordance with an operation of a pointing device such as a mouse, event handlers on Moverhandler (0, on Mouthandler (f), and on Mclinckhandler (f) are executed, respectively.

The event on Mouseover is an event that takes place when the cursor is placed at a designated region. The event on Mouseout is an event that takes place when the cursor is left from a designated region. The event onclick is an event that takes place when a predetermined operation for example a clicking operation of the pointing device for example the mouse is performed while the cursor is placed in a designated region.

FIG. 44 is an example of the description of the file "scenario001.js". A function UOPControl( ) defines an operation of which while the scenario file "scenario001.js" is being reproduced, if the menu key of the remote controller is pressed, the scenario Scenario000 for displaying the menu screen 91 is reproduced. A function playListEnded( ) defines an operation of which when the play list of the scenario file "scenario001.js" has been reproduced, the scenario000 for displaying the menu screen 91 is reproduced. The scenario file "scenario001.js" causes the play list "00001.rpls" to be reproduced.

Next, operations shown in FIG. 41 to FIG. 44 will be described. When the disc is loaded into the reproducing apparatus, the file "startup.js" is read from the disc. The file "scenario000.js" is called from the file "startup.js". When the scenario "scenario000" described in the file "scenario000.js" is executed, a moving picture of the play list "00000.rpls" is displayed on the moving picture plane 10 in accordance with the description shown in FIG. 42.

The file "000.html" is called at timing corresponding to a mark described in the play list "00000.rpls". The menu screen 91 that displays a table of scenarios is expanded on the graphics plane 12 and displayed in accordance with the description of the file "000.html". The menu screen 91 is also composed of one scenario, which is the scenario "scenario000".

On the menu screen 91, the image file "100.png" of a character string for example "Menu" and the image file "200.png" of a character string for example "Scenario001" are placed. These image files are placed on the graphics plane 12 and these character strings are displayed. On the moving picture plane 10 displayed as a background of the graphics plane 12, a moving picture of the play list "00000.rpls" is displayed. The moving picture of the play list "00000.rpls" on the moving picture plane 10 and the menu screen 91 of the file "000.html" on the graphics plane 12 are superimposed and displayed on the same screen. As a result, the menu screen 91 is displayed with a background of the moving picture.

At that point, predetermined transparency is designated to a screen (the menu screen 91) on the graphics plane 12. The menu screen 91 can be transparently displayed on the moving picture on the moving picture plane 10. In this example, marks are described at the beginning and the end of the play list "00000.rpls". When the play list "00000.rpls" is reproduced, the menu screen 91 is displayed. After the play list "00000.rpls" has been reproduced, the menu screen 91 is cleared.

On the menu screen 91, a cursor that can be moved by user's key operations of the remote controller is displayed. When the cursor is superimposed with the image file "200.png", the event Mouseover defined in the file "000.html" takes place. When the event Mouseover takes place, the event handler on Movehandler( ) corresponding to the event on Mouseover is executed so as to represent the state that the image file "200.pn" is focused. When the event handler on Moverhandler( ) is executed, the image file "200.png" is replaced with the image file "201.png". The image file "201.png" is a button image or the like whose color is different from the image file "200.png".

When the cursor is placed on the image file "201.png", if the user performs a clocking operation by a predetermined key of the remote control commander, the event handler on Mclickhandler( ) corresponding to the event onclick is executed. As a result, the image file "201.png" is replaced with the image file "202.png" that represents the state that the image file "201.png" has been selected. The image file "202.png" is a button image that virtually represents the state that a button was pressed.

When event handlers corresponding to events "focused" and "clicked" are described in the file "000.html", a menu screen that has an interactive function that responds to a user's input is accomplished.

When a button image of "Scenario0001" is clicked on the menu screen 91, a reproducing process for the scenario "Scenario001" is performed. When the file "scenario001.js" is executed, the scenario "Scenario001" is reproduced. As shown in FIG. 44, a method playPlayList ("0001.rpls") described in the file "scenario001.js" is called. As a result, the play list "00001.rpls" is reproduced.

After the play list "00001.rpls" has been reproduced, a play list reproduction end event PlayListEnded( ) takes place. The event handler playScenario ("scenario000.js") corresponding to the event causes the scenario "Scenario000.js" to be reproduced. In this example, after the scenario "Scenario001" has been reproduced, the menu screen 91 is displayed again.

While the scenario "Scenario001" is being reproduced, even if a key designated by "keyID" is operated, the scenario "Scenario000.js" is reproduced and the menu screen 91 is displayed.

The descriptions of the HTML and ECMA scripts shown in FIG. 41 to FIG. 44 are just examples. In other words, the present invention is not limited to such examples. The HTML and ECMA scripts have flexibility in their descriptions. Thus, even if the HTML and ECMA scripts are partly changed, similar operations can be accomplished.

2-8. About Syntaxes

Next, syntaxes of files in the case that original commands are used as a scenario descriptive language will be described. First of all, a method for recording commands and databases that describe a scenario to a disc will be described. FIG. 45 shows an example of a file management structure in the case that original commands are used as a scenario descriptive language.

On the disc, one root directory is created. A portion under the root directory is managed by one reproducing system. Under the root directory, a directory BDMV is placed. As shown in FIG. 9, a plurality of directories BDMV can be placed under the root directory.

Under the directory BDMV, two files "scenario.hdmv" and "entrylist.data" are placed. In addition, a plurality of directories "PLAYLIST", "CLIPINF", and "STREAM" are placed.

FIG. 46 shows a syntax that describes an example of a structure of the file "scenario.hdmv". The file "scenario.hdmv" is a file that is initially read and executed when an initial access is performed (namely, when the disc is loaded). The file "scenario.hdmv" has a file identification code (a field type_indicator) and a version number (a field version_number). The version number is followed by functional data blocks.

The field type_indicator has a data length of 32 bits. The field type_indicator has a predetermined character string that describes that the file is "scenario.hdmv". The field version_number has a data length of 32 bits for a version number. A field Scenario_start_address has a data length of 32 bits for an unsigned integer of a value that represents the position of the block Scenario( ) with the relative number of bytes from the beginning of the file "scenario.hdmv".

A block Autoplay( ) starts from the 41-st byte (fixed position) of the file. The block Autoplay( ) describes a program that is executed when an initial access is performed (reproduction for the disc is initially performed for example the disc is loaded). The block Autoplay( ) is followed by any number of padding words (padding_word) that allow a space to be formed after the block.

FIG. 47 shows a syntax that describes an example of a structure of the block Autoplay( ) shown in FIG. 46. A field length has a data length of 32 bits for an unsigned integer. The field length describes the data length immediately after the end of the field length until the end of the block Autoplay( ) in bytes. A field number_of_commands describes the number of fields command(i) preceded thereby. The field command(i) has a data length of 32 bits as shown in FIG. 33A, FIG. 33B, FIG. 33C, FIG. 33D, FIG. 33E, FIG. 33F, FIG. 33G, and FIG. 33H. The field command(i) describes a set of parameters of the player and commands such as a reproduction start command for a designated play list and a calculation command.

A block Scenario( ) describes a "scenario" as explained above. The block Scenario( ) describes information about the reproduction order of play lists and a local command region for each play list.

FIG. 48 shows a syntax that describes an example of a structure of the block Scenario( ). The block Scenario( ) is a block that defines information of a scenario, namely links among play lists. The block Scenario( ) describes information about the foregoing pre-commands, post-commands, and play item commands and these commands themselves. The block Scenario( ) has a region for fields of information about commands described therein and a region for those pre-commands, post-commands, and play item commands.

A field length describes a value that represents the length immediately after the end of the field length to the end of the block Scenario( ) in bytes. A field number_of_PlayLists describes the number of play lists that composes the scenario. The field number_of_PlayLists is followed by data of each play list. Data for each play list is repeated the number of times designated by a loop counter i in a for loop, the maximum value of i being represented by the field number_of_PlayLists.

A field Pre_Command_start_id describes a start number of a pre-command in a command table (a pre-command is executed before a play list is reproduced). A number described in the field Pre_Command_start_id describes a loop counter j in a for loop that describes a field PI_Command (i) that will be described later. Likewise, a field Post_Command_start_id describes a start number of a post command in the command table (a post command is executed after a play list is reproduced). A number described in the field Post_Command_start_id describes the loop counter j in the for loop that describes the field PL_Command (j) that will be described later.

A field Number_of_Pre_Commands describes the number of pre-commands that compose a program. Pre-commands are executed before a play list is reproduced. Likewise, a field number_of_Post_Commands describes the number of post-commands that composes a program. Post commands are executed after a play list has been reproduced. These programs are described in a command table that will be described later.

A field number_of_PlayItems describes the number of play items that composes the play item. A field PI_Command_start_id represents a start number of a play item command in a command table. A play item command is executed after the play item has been reproduced. A number described in the field PI_Command_start_id describes a loop counter j in a command table that will be described later. A field number_of_PI_Commands describes the number of play item commands, which are executed after the play item has been reproduced. Commands after the position described in the field PI_Command_start_id until the number of commands described in the field number_of_PI_Commands are executed after the play item has been reproduced.

A field number_of_PL_Commands describes the number of commands in a command table preceded by the field number_of_PL_Commands. The command table has a for loop that describes a field PL_Command (j). Commands in the command table are assigned number j. The number j corresponds to the loop counter j in the for loop that describes the command table. A field PL_Command (j) describes one command. The number j is referenced from the foregoing field Pre_Command_start_id, the field Post_Command_start_id, and the field PI_Command_start_id.

FIG. 49 shows a syntax that describes an example of a data structure of the file "entrylist.data". The file "entrylist.data" describes a file identification code (a field type_indicator), a version number (a field version_number), and a block start address (a field ScenarioEntry_start_address). The block start address is followed by functional data blocks.

The field type_indicator has a data length of 32 bits for a predetermined character string that describes entry points of a title and a menu. A field version_number has a data length of 32 bits for a version number. The field ScenarioEntry_start_address has a data length of 32 bits for an unsigned integer value that describes the start position of the block ScenarioEntry( ) with the relative number of bytes from the beginning of the field "entrylist.data".

FIG. 50 shows a syntax that describes an example of a structure of a block AppInfo( ). A field length has a data length of 32 bits for an unsigned integer that describes the length immediately after the end of the field length until the end of the block AppInfo( ) in bytes. A field BDMV_name_character_set describes a character set for a field BDMV_name that will be described later. A field PIN_valid_flag describes whether or not a personal identification number should be set when reproduction is performed. When the setting is valid, a field PIN that is followed by the field PIN_valid_flag describes a personal identification number. A field BDMV_name_length describes the length of a valid portion of a field BDMV_name that is preceded by the field BDMV_name_length. The field BDMV_name is a region that describes a name of the directory BDMV in which the file "entrylist.data" is placed. The name of the directory BDMV is described in the text format.

The field BDMV_name has a fixed data length of 255 bytes. The name of the directory BDMV is described for a length described in the field BDMV_name_length after the beginning of the field BDMV_name.

FIG. 51 shows a syntax that describes an example of a structure of the block ScenarioEntry( ). The block ScenarioEntry( ) describes search points of a scenario. As described above, one scenario is created for the directory BDMV. A scenario links a plurality of play lists placed under the directory BDMV so as to define the reproduction order of the play lists. When the user sees a scenario, it does not always look like one picture unit or one sound unit, but as if it were composed of a plurality of "titles".

When three movies are recorded on one disc, only one scenario that defines the reproduction order of the movies exists on the disc. However, the user would see them as if three titles were recorded on the disc. Alternatively, a list of three titles would be displayed. Including a title menu that allows the user to select one of the titles, he or she would see them as if four titles were recoded. Since the user considers a menu screen as one picture unit or one sound unit, according to the embodiment of the present invention, a menu screen is treated as one type of a title.

Since the unit of a scenario that defines a link of play lists is different from the unit that the user recognizes data as picture and audio, it is necessary to define search points in a scenario. A search point in a scenario is referred to as title entry. The block ScenarioEntry( ) describes information of a title entry.

Returning to FIG. 51, a field length has a data length of 32 bits for an unsigned integer that describes the length immediately after the field length until the end of the block ScenarioEntry( ) in bytes. A field name_character_set describes a character set of a field TopMenu_name and a field Title_name that are preceded by the field name_character_set.

The next block Top menu PL( ) describes an entry point to a play list or a play list group that composes a menu displayed when the user presses the title menu key of the remote controller. One scenario has one top menu. The top menu is used to present for example titles to the user. A sub menu on which the user can set audio and subtitles can be placed as a lower menus of the top menu. A sub menu is also referred to as stream setup menu.

In short, a field flags is a region that describes attribute information of a top menu. A field TopMenu_ref_to_PlayList_file_name describes a play list that composes a top menu or a play list that is an entry to a play list group. A field TopMenu_ref_to_PlayItem_id describes the number of a play item from which the top menu starts in a play list described in the field TopMenu_ref_to_PlayList_file_name. When the play list is reproduced from the beginning, the value of the field TopMenu_ref_to_PlayItem_id is "0". A field TopMenu_name_length represents the length of the name assigned to a top menu. A field TopMenu_name describes a character string of the name assigned to a top menu.

The block Top Menu PL( ) describes information about a title. A field number_of_Titles describes the number of title search points (title entries) in a for loop immediately preceded by the field number_of_Titles. In short, a field flags is a region that describes attribute information about a title. A field Title_ref_to_PlayList_file_name describes the file name of a play list that includes a title entry. A field Title_ref_to_PlayItem_id is used when a title starts from a particular play item of a play list described in the field Title_ref_to_PlayList_file_name. A field Title_name_length describes the length of the name assigned to a title. A field Title_name describes a character string of the name assigned to a title.

Information about a sub menu is described. "Stream Setup Menu" is followed by an entry point to a play list or a play list group that composes a stream setup menu (namely, a sub menu) for each play item. A stream setup menu can be used for each play list to select such as sound, subtitles, or angle. For example, when the buttons 64 and 65 shown in FIG. 25 are pressed, a sub menu is displayed as a screen.

A field number_of_PlayLists describes the number of play lists used for a stream setup menu. The value of the field number_of_PlayLists is used as the number of loop times of a for loop immediately preceded by the field number_of_PlayLists. In short, a field SSMenu_flags is a region that describes attribute information about a stream setup menu. A field SSMenu_ref_to_PlayList_file_name describes a play list that composes a stream setup menu or a play list that is an entry of a play list group. A field SSMenu_ref_to_PlayItem_id describes the number of a play item from which a stream setup menu starts in a play list described in the field SSMenu_ref_to_PlayList_file_name. When a play list is reproduced from the beginning, the value of the field SSMenu_ref_to_PlayItem_id is "0".

FIG. 52 shows a syntax that describes an example of a structure of a file "xxxxx.mpls". In FIG. 52, the file "xxxxx.mpls" has functional blocks of information. A field type_indicator describes a character string of the file. A field version_number describes the version of the file. Fields PlayList_start_address and PlayListMark_start_address describe the start addresses of corresponding blocks as address information having a data length of 32 bits.

A block PLControlInfo( ) describes attribute information about the play list. A block PlayList( ) describes information about a play item that composes the play list. A block PlayListMark( ) describes information of a mark added to the play list.

In the file "xxxxx.mpls", since start addresses of the block PLControlInfo( ), PlayList( ), and PlayListMark( ) are followed by these blocks, padding data padding_word can be placed before and/or after each block in a desired length. The start position of the first block PLControlInfo( ) is fixed at the 41-st byte from the beginning of the file.

FIG. 53 shows a syntax that describes an example of a structure of the block PLControlInfo( ). The block PLControlInfo( ) describes various types of attribute information about a play list, not directly required to reproduce the play list. A field PlayList_character_set describes a character set of character string information about a play list.

A field PL_playback_type describes a value as shown in FIG. 54. The field PL_playback_type describes whether the play list is a regular play list that is sequentially reproduced, a play list of which play items are reproduced at random, or a play list of which play items are shuffled and reproduced. The random shuffle is designated in the unit of a play list. One play list should not describe a regularly reproduced play item and a randomly shuffled play item block. When the disc is a reproduction-only recording medium, the producer may designate a random reproduction or a shuffle reproduction. At that point, such information is required.

A field playback_count describes the number of times of reproduction of a play item when the play list is a random reproduction play list or a shuffle reproduction play list. A field playback_count describes the number of play items that are randomly reproduced or shuffle-reproduced.

A field PL_UOP_mask_table( ) describes information about restriction of user's operations. When the user is prohibited from performing operations such as playback, fast forward, fast rewind, and so forth while a play list is being reproduced, this region is properly described. When a proper value is described in the field PL_UOP_mask_table( ), an alarm notice, a copyright notice, and so forth can be prevented from being skipped even if a fast forward operation or the like is performed.

A field PL_random_access_mode describes a value shown in FIG. 55. The field PL_random_access_mode describes whether a random access of which any position of the play list is jump-reproduced from another play list can be performed. When there is a play list that the disc producer wants the user to see, the value of the field PL_random_access_mode is set to [0x1]. When this play list is jump-reproduced, fast forward operation, fast rewind operation, reproduction from any time, and so forth are prohibited. At that point, the play list is reproduced from the beginning. When the disc is a reproduction-only recording medium, scenes such as a logo of a contents production company and precautions to be seen to the user may be recorded thereon. The field PL_random_access_mode describes information necessary for prohibiting such scenes from being skipped against variable speed reproduction operation or the like. The field PL_UOP_mask_table( ) describes a restriction to the user against an operation for the player while a play list is being reproduced. In contrast, the PL_random_access_mode describes a restriction to the user against a jump-reproduction for the current play list from another play list.

A field PlayList_duration describes a reproduction duration of a play list. A field PlayList_name describes a play list name having an effective length with a value described in the field PlayList_name_length. A field PlayList_detail describes detailed information about a play list having an effective length with a value described in the field PlayList_detail_length.

FIG. 56 shows a syntax that describes an example of a structure of a block PlayList( ). A field length describes a byte length immediately after the field length until the end of the block PlayList( ). A field number_of_PlayItems describes the number of play items that compose the play list. A field number_of_SubPlayItems describes the number of auxiliary play items (sub play items) reproduced along with the main play item.

A block PlayItem( ) describes information of a play item. A block SubPlayItem( ) describes information of a sub play item.

FIG. 57 shows a syntax that describes an example of a structure of the block PlayItem( ). A field Clip_Information_file_name describes a character string of a file name of a clip information file (that has an extension of "clpi") corresponding to a clip that play item references in the relation of 1 to 1.

A field Clip_codec_identifier describes an encoding system of a clip referenced by the play item. According to the embodiment, the field Clip_codec_Identifier describes a fixed value "M2TS2". In other words, according to the embodiment, the encoding system of a clip referenced by a play item is fixed to a system represented by the value "M2TS".

A flag is_multi_angle describes whether or not the play item has a multiple angle structure.

A field connection_condition is information that describes in what manner the play item and the next play item are connected. The field connection_condition describes whether or not play items can be seamlessly reproduced.

A field ref_to_STC_id describes a sequence STC_sequence in a clip referenced by the play item. The sequence STC_sequence has a unique structure of the blu-ray disc standard that describes that PCR (Program Clock Reference) as a reference of the time base of an MPEG2 TS (Transport Stream) represents a continuous range. The sequence STC_sequence describes a number STC_id that is unique in the clip. Since a continuous time base can be defined in the sequence STC_sequence, the start time and the end time of a play item can be uniquely designated. In other words, the start point and the end point of each play item should be present in the same sequence STC_sequence. A field ref_to_STC_id describes a sequence STC_sequence with a number STC_id.

Fields IN_time and OUT_Time describe time stamps pts (presentation_time_stamp) of the start point and the end point of the play item in the sequence STC_sequence, respectively.

A field PI_UOP_mask_table( ) describes data about a restriction against user's operations. Even if the user performs such a restricted operation, the player should not respond to that. To restrict a fast forward operation while a menu screen is being displayed, data about a restriction against such an operation is described in the field PI_UOP_mask_table( ).

The field PI_UOP_mask_table( ) is described for each play item. The field PI_UOP_mask_table( ) describes information that has the same object as the field PL_UOP_mask_table( ) of the foregoing block PLControlInfo( ), which describes information about reproduction of a play list. A user's operation can be prohibited in either a play list or a play item. A user's operation during reproduction of a play item is prohibited depending on the result of an OR operation of information of a play list and information of a play item.

In short, a field PID_filter( ) is a table that describes the priority in streams reproduced by play items.

A field PI_random_access_mode describes a value as shown in FIG. 58. The field PI_random_access_mode describes whether or not a random access can be performed for jump-reproduction of any position of a play item. When there is a play list that the disc producer side wants the user to see, a value [0x1] is described in the field PI_random_access_mode. Thus, when reproduction of a play item is started, the user can be prohibited from performing a fast forward operation, a rewind operation, a reproducing operation from any time, or the like.

A field still_mode describes whether or not after reproduction of a play item is started, the reproduction is temporarily stopped. The field still_mode describes a value as shown in FIG. 59. When the value of the field still_mode is [0x1], it describes that reproduction of the play item is temporarily stopped for a period described in the next field still_time. Thus, still pictures can be successively displayed at intervals of a predetermined period like a slide show. In this case, each still picture is a play item. In addition to a setting for a designated time period, a setting for a non-designated time period of which reproduction is stopped until the user inputs data (pause setting) can be described in the field still_time. When the value of the field still_mode is [0×2], the pause setting can be performed.

When the value of the foregoing flag is_multi_angle is for example "1", the play item is a multiple angle play item. After "Angle", information about multiple angles is added.

A field number_of_angles describes the number of angles. A field is_seamless_angle_change describes a value as shown in FIG. 60. The field is_seamless_angle_change describes whether or not each angle has been recorded on the disc so that each angle can be seamlessly changed.

The next for loop describes information about clips that compose angles. A field Clip_Information_file_name in the for loop describes a character string of a field name of a clip information file (that has an extension "clpi") that corresponds to each clip that the play item references in the relation of 1 to 1. A field ref_to_STC_id describes a sequence SC_sequence of each clip that the play item references.

An angle corresponding to a value angle_id=0 has been defined in the first half part of the block PlayItem( ) like a regular play item that is not an angle play item. Angles after the value angle_id=1 are defined in the for loop. The for loop does not contain an angle corresponding to the value angle=0.

FIG. 61 shows a syntax that describes an example of a structure of a block SubPlayItem( ). A field length describes the length immediately after the field length until the end of the block SubPlayItem( ) in bytes. A field Clip_Information_file_name describes a character string of a file name of a clip information file (that has an extension "clpi") that corresponds to a clip that the sub play item references in the relation of 1 to 1.

A field Clip_codec_identifier describes an encoding system of a clip that the sub play item references. According to the embodiment, the field Clip_codec_Identifier is fixed to a value "M2TS".

A field is_repeat_flag describes a value as shown in FIG. 62. The field is_repeat_flag is a flag that describes whether or not the sub play item is repeatedly reproduced not in synchronization with a main play item (main path). When the value of the field is_repeat_flag is "1", the sub play item is repeatedly reproduced until the main play item has been reproduced not in synchronization therewith. When the value of the field is_repeat_flag is "0", the sub play item is reproduced once in synchronization with the main play item.

If the sub play item is a sub play item for only audio, when "1" is described in the field is_repeat_flag, BGM (Back Ground Music) can be reproduced.

A field SubPlayItem_type describes what characteristic the sub play item has. For example, when the value of the field SubPlayItem_type is "1", it describes that the sub play item is a sub play item for only audio.

A field ref_to_STC_id describes a sequence STC_sequence of a clip that the play item references. Fields SubPlayItem_IN_time and SubPlayItem_OUT_Time describe time stamps pts (presentation_time_stamp) of the start point and end point of the sub play item in the sequence STC_sequence.

When the value of the foregoing field is_repeat_flag is "0" and it represents that the sub play item is reproduced in synchronization with the main play item, the field sync_PlayItem_id and the field sync_start_PTS_of_PlayItem describe from what time of the main play item the sub play item is reproduced in synchronization therewith.

Figure 63:
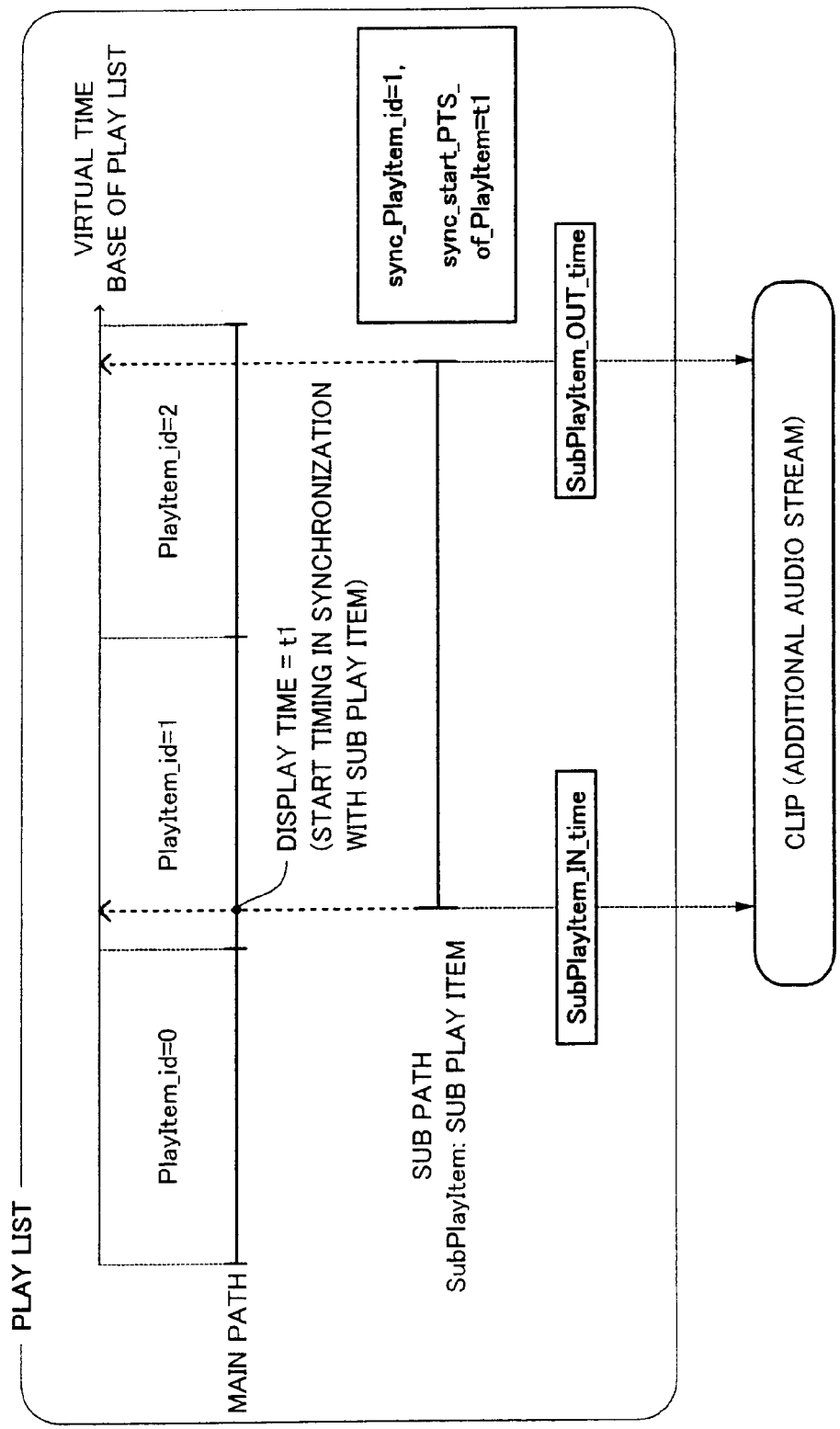
FIG. 63 is a schematic diagram showing the relation between a main path and a sub path on a time base.

As shown in FIG. 63, the field sync_PlayItem_id describes a play item of a main path (PlayItem=1). The field sync_start_PTS_of_PlayItem describes time of the main play item at which reproduction of a sub play item is started (t1). A field SubPlayItem_IN_time and a field SubPlayItem_OUT_time describe a period for which a click as a sub play item is reproduced.

FIG. 64 shows a syntax that describes an example of a structure of the file "zzzzz.clpi". In FIG. 53, the file "zzzzz.clpi" has functional blocks of information. A field type_indicator describes a character string of the file. A field version_number describes the version of the file. A field SequenceInfo_start_address, a field ProgramInfo_start_address, a field CPI_start_address, and a field ClipMark_start_address describe start positions of respective blocks.

FIG. 65 shows a syntax that describes an example of a structure of a block ClipInfo( ). A field length describes the length immediately after the field length until the end of the block ClipInfo( ).

A field application_type describes how a clip AV stream (that has an extension "m2ts") has been multiplexed. The field application_type describes a value as shown in FIG. 66. The field application_type describes whether the clip AV stream is a normal video stream or a stream that has been multiplexed suitably for a still picture.

More practically, in the example, the value of the field application_type is "1" and it describes that the file of the corresponding clip AV stream complies with the rule of the BDMV transport stream according to the embodiment. With the clip AV stream, a normal moving picture is reproduced.

When the value of the field application_type is "2", it describes that the file of the corresponding clip AV stream complies with the rule of the BDMV transport stream for a still picture that synchronizes with the reproduction of audio. The clip AV stream is a file in accordance with for example the MPEG2 format. In the clip AV stream, video data and audio data have been multiplexed. The video data has a structure of which I pictures of the MPEG2 are arranged as still pictures. As a result, the still pictures can be reproduced like a slide show on the time base of audio. This reproduction is referred to as time base slide show.

When the value of the field application_type is "3", it describes that the file of the corresponding clip AV stream complies with the rule of the BDMV transport stream for still pictures reproduced not in synchronization with audio. The audio data and the video data are structured as different files. While the audio data is being reproduced, the video data is displayed in such a manner that still pictures are changed at any intervals or as designated by the user. The video data can be structured in such a manner that for example I pictures of the MPEG2 are arranged as still pictures. Such reproduction is referred to as browsable slide show.

When the value of the field application_type is "0", the corresponding clip AV stream does not comply with the rule of the BDMV transport stream.

It is assumed that multiplexing suitable for displaying still pictures allows an application such as a slide show of still pictures to be easily accomplished. In such an application, when one still picture is capsulate-multiplexed with subtitles and graphics data to be superimposed, they can be easily read.

When a still picture is multiplexed with subtitles and graphics in the same manner as a normal moving picture, subtitles to be displayed along with a still picture are multiplexed with picture data of a preceding still picture (namely, so-called multiplexing phase difference takes place). As a result, unless stream data is read for a long time, a still picture superimposed with subtitles and graphics cannot be displayed.

According to the embodiment of the present invention, graphics data for video data and subtitles is contained in TS (Transport Stream) packets of the MPEG-2 system standard. One TS packet is composed of 188 bytes. The foregoing video data and graphics data are divided so that they are contained in TS packets. When a packet of subtitle data corresponding to particular still picture data (called picture P1) is preceded by a packet of the next still picture (called picture P2), to display subtitles corresponding to the picture P1, data of the picture P2 should have been read.

When a particular still picture is multiplexed with only associated subtitles and graphics (capsulated), a stream that is not affected by other data can be created. When such an operation is repeated for each still picture and streams are connected, one stream of which data of each still picture (and associated subtitles and graphics data) is connected in series can be obtained. The stream that has been multiplexed in such a manner is referred to as still picture BDMV stream.

There are two types of BDMV streams for still pictures that are time base slide show and browsable slide show. According to the embodiment, the two types are distinguished with different numbers of the field application_type.

When a still picture and associated subtitles and graphics are capsulated and recorded, accessibility of which still pictures are changed and reproduced is improved.

Returning to FIG. 65, a field Clip_stream_type describes the type of a clip AV stream. The value of the field Clip_stream_type may be fixed to "1" that represents a normal clip in the reproduction-only disc standard. A field TS_recording_rate describes a record rate of a clip AV stream file in bytes/second. A field num_of_source_packets describes the number of packets contained in a clip AV stream. A field BD_system_use and a block TS_type_info_block( ) do not relate to the present invention. These description will be omitted.

FIG. 67 shows a syntax that describes an example of a structure of a block SequenceInfo( ). A field length describes the length immediately after the field length until the end of the block SequenceInfo( ) in bytes. A field num_of_ATC_sequence describes the number of sequences ATC_sequence that have been recorded in a continuous time period. When a reproduction-only medium is used, since the number of sequences ATC_sequence is "1", the description of the field num_of_ATC_sequences will be omitted. A field SPN_ATC_start describes the beginning of the sequence ATC_sequence with a packet number. When the number of sequences ATC_sequence is "1", the beginning of the sequence ATC_sequence accords with the beginning of the clip AV stream file. Thus, the value of the field SPN_ATC_start is "0".

A field num_of_STC_sequences describes the number of sequences STC_sequence of the sequence ATC_sequence. When a reproduction-only medium is used, since the number of sequences STC_sequence is "1", the description thereof will be omitted. A field offset_STC_id describes a fixed value "0". A field PCR_PID describes a PID of a TS packet that has a PCR (Program Clock Reference) of an MPEG2 TS. A field SPN_STC_start describes the beginning of a sequence STC_sequence with a packet number. When the number of sequences STC_sequence is 1, since the field SPN_STC_start accords with the beginning of the clip AV stream file, the value of the field SPN_STC_start is "0". A field presentation_start_time and a field presentation_end_time describe a valid range of the clip AV stream. The range described in the field presentation_start_time and the field presentation_end_time can be referenced from a play item.

FIG. 68 shows a syntax that describes an example of a structure of a block ProgramInfo( ). A syntax structure of a block ProgramInfo( ) for a recordable medium can be applied to that for a reproduction-only medium. Since there is no new structure in the block ProgramInfo( ), detailed description is omitted. In the block ProgramInfo( ), as restrictions, a value "1" can be described in a field num_of_program_sequences and a value "1" can be described in a field num_of_groups.

FIG. 69 shows a syntax that describes an example of a structure of a block StreamCodingInfo( ). Like the block ProgramInfo( ), the block StreamCodingInfo( ) has a syntax structure similar to that of the recordable medium. With respect to video data, the block StreamCodingInfo( ) describes attribute information of a format of video data, a frame rate, and an aspect ratio. With respect to audio data, the block StreamCodingInfo( ) describes attribute information of a sampling frequency and so forth. When the syntax structure of the recordable medium is applied to the reproduction-only medium, as shown in FIG. 69, it is necessary to add a field language_code that describes a language of subtitles and audio streams to the block StreamCodingInfo( ). This information is effective when the most suitable language for audio and subtitles is selected in accordance with setting of the player.

FIG. 70 shows a syntax that describes an example of a structure of a block CPI( ). Generally, in an encoded stream such as an MPEG stream that has been compressed between frames, the stream can be decoded at limited positions for example the beginning of a GOP (Group Of Picture). The CPI (Characteristic Point Information) is a database that is a collection of information about start positions at which data can be decoded. The database correlates reproduction times and addresses of a file. The CPI tabulates information that describes start positions at which data can be decoded.

When data is reproduced from any time, by referencing the CPI as such a database with the reproduction time, the address of the reproduction position in the file can be obtained. Since this address is the beginning at which data can be decoded, the player can read data therefrom and quickly display a picture.

A start position at which data can be decoded (in this example, the start position of a GOP) is described in the CPI and is referred to as EP (Entry Point) entry.

A field CPI_type describes the type of CPI. The field CPI_type describes a value as shown in FIG. 71. According to the present invention, the type of the field CPI_type describes CPI for a reproduction-only medium. In reality, the value of the field CPI_type is "8" that describes an EP entry map for BDMV (EP_map_type_for_BDMV).

FIG. 72 shows a syntax that describes an example of a data structure of a block EP_map of an EP entry for a reproduction-only medium, in other words, a block EP_map_for_BDMV( ) of the foregoing field CPI_type. The map EP_map is a table that correlates reproduction times and addresses of a file for start positions of GOPs. In the example shown in FIG. 72, as a table that correlates PTS (Presentation Time Stamp) of MPEG and SPN (Source Packet Number) for start positions of GOPs, a database is created. SPN represents a source packet number that corresponds to a byte address from the beginning of a file.

The structure of the map EP_map for the recordable medium is almost the same as the structure of the map EP_map for the reproduction-only medium. According to the embodiment, to reduce the data amount and speed up searches, coarse searches and fine searches are performed for individual values. Thus, the internal structure of the map EP_map is divided into two for loops corresponding to coarse searches and fine searches. Consequently, the map EP_map for the reproduction-type disc is more complicated than a simple table "that correlates PTSs of the first I pictures of GOPs and addresses in a file".

A field EP_fine_table_start_address describes the position of a table used for fine searches. The next for loop describes tables for coarse searches. The for loop describes fields PTS_EP_coarse and SPN_EP_coarse. A field ref_to_EP_fine_id describes a table number for fine searches referenced from coarse searches. The fields PTS_EP_coarse and SPN_EP_coarse describe high order bits of a PTS and an SPN.

The for loop is followed by a padding word. The padding word is followed by a for loop that describes fields PTS_EP_fine and SPN_EP_fine. In addition, the for loop describes a flag is_angle_change_point and a field I_end_position_offset. The flag is_angle_change_point describes whether each EP point corresponds to an angle changeable point when the clip AV stream has a multiple angle structure.

2-9. Decoder Model

Figure 73B:
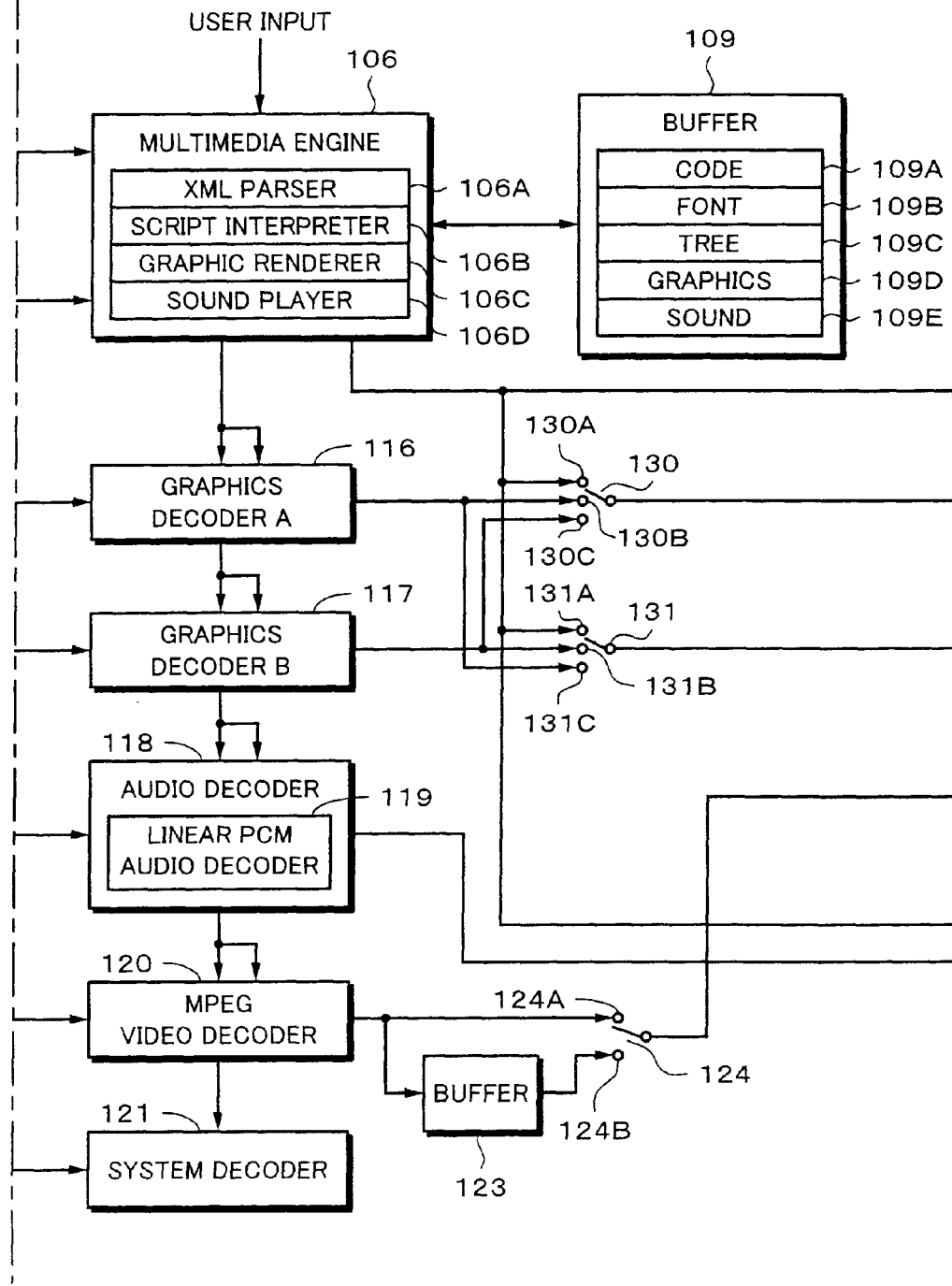
Figure 73C:
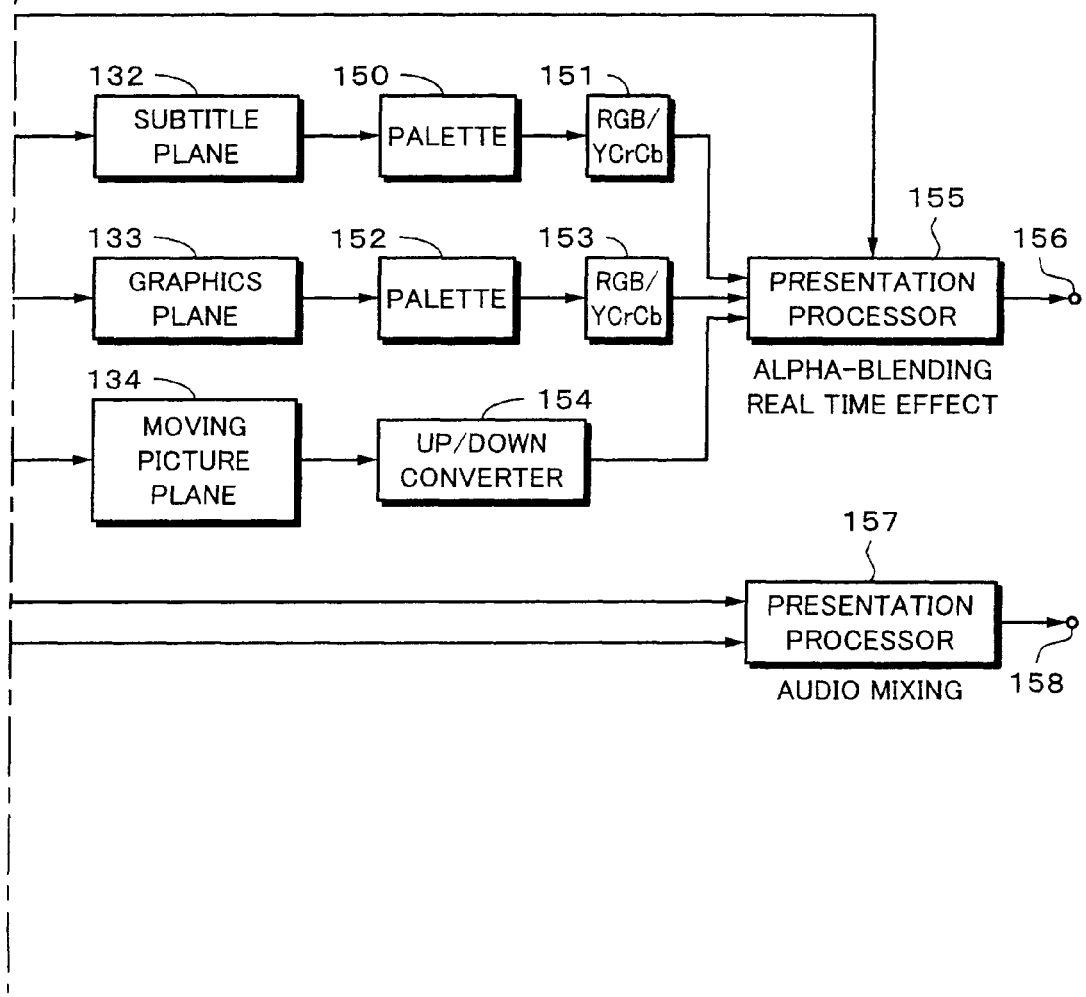

FIG. 73A, FIG. 73B, and FIG. 73C are functional block diagrams showing an example of a structure of a player decoder 100 according to an embodiment of the present invention. The player decoder 100 interprets data reproduced from a disc loaded into a drive device (not shown), outputs an AV stream, and allows the user to interactively operate the output AV stream.

All operations of the player decoder 100 are controlled by a CPU (Central Processing Unit) (not shown). Streams and data flows of individual portions of the player decoder 100 are monitored and controlled by the CPU.

It is assumed that unless otherwise specified, a scenario described with original commands is executed by the player decoder 100.

When the disc is loaded into the drive device (not shown), as described above, the file "scenario.hdmv" and the file "entrylist.data" are reproduced. In accordance with the descriptions of the file "scenario.hdmv" and the file "entrylist.data", other necessary files are read from the disc and thereby a content recorded on the disc is reproduced. For example, in accordance with the descriptions of the file "scenario.hdmv" and the file "entrylist.data", moving picture data displayed on the moving picture plane 10, image data displayed on the subtitle plane 11 and the graphics plane 12, a play list file, and so forth are read from the disc.

In the following description, among those data that is read from the disc, streams such as moving picture data, sub pictures (subtitle data), and sound data that should be continuously processed are referred to as real time streams. In contrast, non-real time data such as scenario files and play list files that are not required to be continuously processed are referred to as store objects. The store objects are stored in a memory or the like and expanded thereon. Store objects stored in the memory are expanded when necessary.

The player decoder 100 has two systems of input channels that are channel (1) and channel (2). A store object is input to an input terminal 101 of the input channel (1). A real time stream is input to an input terminal 202 of the input channel (2). Alternatively, a store object may be input to the input terminal 202. According to the embodiment, a real time stream and a part of a store object that are input to the input terminal 202 are for example MPEG2 TSs.

A store object that is input to the input terminal 101 is not limited to data that is read from a disc. For example, the player decoder 100 would be provided with a network connecting function. At that point, a store object obtained through the network would be input to the input terminal 101. Image data for button images, new scenario data, and so forth would be obtained through the network and input from the input terminal 101. Alternatively, data such as subtitle data that is treated as a real time stream would be obtained through the network and input from the input terminal 101.

A real time stream that is input to the input terminal 202 is not limited to an MPEG2 TS. As long as a real time stream can be transmitted in the unit of a packet and multiplexed with video data, audio data, still picture data, or the like, a stream that has another format can be input. At that point, a PID filter 110 that will be described later is used as a demultiplexer that demultiplexes video data, audio data, still picture data, or the like.

When the rotation speed of the disc in the drive device is increased for example twice and the read transfer speed of the disc is increased, the reading operations for two systems of the channels (1) and (2) drive device from the disc are performed in time division basis.

Next, the system of the input channel (1) will be described. A store object that is input to the input terminal 101 is input to a switch circuit 102. When a program code of an ECMA script, an HTML file, or the like as a store object is input, the switch circuit 102 selects an output terminal 102A. The input program code is stored in a code buffer 104.

When image data as a store object is input, the switch circuit 102 selects an output terminal 102B. As a result, the input image data is input to a switch circuit 103. When a real time stream that is input to the input terminal 202 does not contain image data displayed on the subtitle plane 11 or the graphics plane 12, the switch circuit 103 selects an input terminal 103A. The image data that is input from the switch circuit 102 is stored in a contents buffer 105.

Likewise, when image data displayed on the subtitle plane 11 or the graphics plane 12 is contained in a real time stream that is input to the input terminal 202, the switch circuit 103 selects an input terminal 103B. As a result, the image data is stored in the contents buffer 105. Store objects stored in the code buffer 104 and the contents buffer 105 are read when necessary and supplied to a multimedia engine 106.

The image data of the store object stored in the contents buffer 105 is also supplied to a graphics decoder A 116 and a graphics decoder B 117 through switch circuits 107 and 108, respectively.

The multimedia engine 106 comprises an XML parser 106A, a script interpreter 106B, and a graphic renderer 106C. The multimedia engine 106 may be composed of independent hardware. Alternatively, the multimedia engine 106 may be accomplished by a process of a predetermined program that a CPU (not shown) executes.

The XML parser 106A has a function for parsing an XML (Extensible Markup Language) document. In addition, the XML parser 106A can also parse an HTML document. An HTML document parsed by the XML parser 106A is converted into a format that can be executed by the player decoder 100. The script interpreter 106B analyzes an ECMA script and converts it into a format that can be executed by the player decoder 100. The graphic renderer 106C decodes image data and obtains a format that can be expanded on the subtitle plane 11 and the graphics plane 12.

The multimedia engine 106 performs processes for the XML parser 106A, the script interpreter 106B, and the graphic renderer 106C with a work memory of a buffer 109. For example, the XML parser 106A and the script interpreter 106B uses a code buffer 109a of the buffer 109. The graphic renderer 106C uses a graphics buffer 109D of the buffer 109. The buffer 109 further comprises a font buffer 109B that stores font data used to display a character string and a tree buffer 109C that stores the parsed result of the HTML document by the XML parser 106A in a hierarchical tree structure.

When for example a combination of an HTML document and an ECMA script is used as a scenario descriptive language, an ECMA script is read from the code buffer 104 and used for the multimedia engine 106 in accordance with the description of the ECMA script. When necessary, the multimedia engine 106 reads another ECMA script and an HTML document from the code buffer 104 and reads image data from the contents buffer 105. Data that is stored in the code buffer 104 and the contents buffer 105 can be stored in the code buffer 104 and the contents buffer 105 until the data becomes unnecessary. Thus, data stored in the code buffer 104 and the contents buffer 105 can be repeatedly read when necessary.

In addition, the multimedia engine 106 performs a demultiplexing process for the plurality of types of input data, a JavaVM (Java (registered trademark) virtual machine) function, and so forth. Moreover, the multimedia engine 106 receives a user's input from a remote control commander, a pointing device, or the like and performs a process in accordance with the user's input. The user's input is supplied to the graphics decoder graphics decoder A 116, the graphics decoder B 117, an audio decoder 118, an MPEG video decoder 120, and a system decoder 121 that will be described later.

Image data processed by the graphic renderer 106C is supplied to a subtitle plane 132 and a graphics plane 133 through switch circuits 130 and 131, respectively. In this example, it is assumed that image data supplied to the subtitle plane 132 and the graphics plane 133 has the PNG format. Timing at which the image data is supplied to the planes 132 and 133 is controlled by the multimedia engine 106.

The subtitle plane 132 and the graphics plane 133 correspond to the foregoing subtitle plane 11 and graphics plane 12, respectively. A moving picture plane 134 corresponds to the foregoing moving picture plane 10. Each of the subtitle plane 132, the graphics plane 133, and the moving picture plane 134 is composed of for example a frame memory.

The multimedia engine 106 supplies a control signal that causes one of the moving picture plane 134, the subtitle plane 132, and the graphics plane 133 to be selected to a presentation processor 155 that will be described later. Likewise, the multimedia engine 106 supplies a control signal that controls an output of an audio stream to a presentation processor 157 that will be described later.

Next, the system of the input channel (2) will be described. A real time stream that is input as an MPEG2 TS to the input terminal 202 is supplied to the PID filter 110. The PID filter 110 extracts a PID (Packet Identification) from the MPEG2 TS transport stream and detects an attribute of a stream contained in a transport packet. The PID filter 110 separates the input real time stream into corresponding systems for each transport packet in accordance with the attribute of the stream.

When a transport packet is a packet in which image data of a store object is contained, the transport packet is temporarily stored in a buffer TBn 111A. The transport packet is read at predetermined timing and input to the switch circuit 103 through the input terminal 103B that has been selected. Thereafter, the transport packet is stored in the contents buffer 105 through the switch circuit 103.

When the PID filter 110 has determined that the transport packet contains sub picture data in accordance with the PID, the transport packet is temporarily stored in a buffer TBn 111 B and a buffer Bn 112B. The transport packet is read at predetermined timing and input to the switch circuit 107 through an input terminal 107B that has been selected. The transport packet is supplied to the graphics decoder A 116 through the switch circuit 107.

The graphics decoder A 116 removes header information from the supplied transport packet, decodes sub picture data contained in the transport packet, and obtains image data for subtitles or the like. The image data is input to an input terminal 130B of the switch circuit 130 and expanded to the subtitle plane 132 through the switch circuit 130.

When subtitle data is obtained through a network and then input to the input terminal 101, the subtitle data is stored in the contents buffer 105 through the switch circuit 102 and the switch circuit 103. An input terminal 107A of the switch circuit 107 is selected. As a result, the subtitle data is supplied from the contents buffer 105 to the graphics decoder A 116.

When the PID filter 110 has determined that a transport packet contains graphics data in accordance with the PID, the transport packet is temporarily stored in a buffer TBn 111C and a buffer Bn112C. The transport packet is read at predetermined timing and input to the switch circuit 108 through an input terminal 108B that has been selected. The transport packet is supplied to the graphics decoder B 117 through the switch circuit 108.

The graphics decoder B 117 removes header information from the supplied transport packet, decodes graphics data contained in the transport packet, and obtains graphics data. The image data is input to an input terminal 131 B of the switch circuit 131 at predetermined timing and expanded to the graphics plane 133 through the switch circuit 131.

The function of the graphics decoder A 116 is not largely different from the function of the graphics decoder B 117. That means that there are two systems of graphics decoders that independently operate. In other words, it is considered that subtitle data and graphics data can be independently decoded. In a real implementation, a high speed graphics decoder would be used on time division basis as if two virtual systems of graphics decoders existed.

When the PID filter 110 has determined that a transport packet contains audio data in accordance with the PID, the transport packet is temporarily stored in a buffer TBn 111D and a buffer Bn112D. The transport packet is read at predetermined timing and supplied to the audio decoder 118. Audio data contained in the transport packet is compression-encoded in accordance with for example a system based on the MPEG.

The audio decoder 118 also has for example a linear PCM (Pulse Code Modulation) audio decoder 119. The audio decoder 118 removes header information from the input transport stream, decodes compression-encoded audio data contained in the transport packet, and obtains linear PCM audio data.

The linear PCM audio data that is output from the audio decoder 118 is input to the presentation processor 157 for audio. In the presentation processor 157, a sound effect is added to the linear PCM audio data under the control of the multimedia engine 106 and then obtained from an output terminal 158.

When the PID filter 110 has determined that a transport packet contains moving picture data in accordance with the PID, the transport packet is temporarily stored in a buffer TBn 111E, a buffer MBn113, and a buffer EBn114, read at predetermined timing, and supplied to the MPEG video decoder 120. The moving picture data contained in the transport packet has been compression-encoded in accordance with the MPEG2 system.

The MPEG video decoder 120 removes header information from the supplied transport packet, decodes moving picture data that has been compression-encoded in accordance with the MPEG2 system, and obtains base band moving picture data.

The moving picture data that is output from the MPEG video decoder 120 is input to an input terminal 124A of a switch circuit 124. In addition, the moving picture data is input to an input terminal 124B of a switch circuit 124 through a buffer 123. In the switch circuit 124, the input terminals 124A and 124B are selected at predetermined timing. Output moving picture data is expanded on the moving picture plane 134.

When the PID filter 110 has determined that the transport packet contains system information in accordance with the PID, the transport packet is supplied to the system decoder 121 through buffers TBn 111F and Bsys 115. The system decoder 121 removes header information from the supplied transport packet and extracts the system information therefrom. The system information is supplied to for example a CPU (not shown).

Image data on the subtitle plane 132 is supplied to a palette 150 that corresponds to the foregoing palette 22. The palette has 256 colors. The palette is referenced with an index. RGB data is output. In addition, transparency data $\alpha 1$ is extracted. The RGB data is converted into YCbCr data by an RGB/YCbCr converting circuit 151 that corresponds to the foregoing RGB/YCbCr converting circuit 29. The YCbCr data and the transparency data $\alpha 1$ are supplied to the presentation processor 155.

Image data on the graphics plane 133 is supplied to a palette 152 that corresponds to the foregoing palette 26. The palette has 256 colors. The palette is referenced with an index. As a result, RGB data is output. In addition, transparency data $\alpha 2$ is extracted. The RGB data is converted into YCbCr data by an RGB/YCbCr converting circuit 153 that corresponds to the foregoing RGB/YCbCr converting circuit 27. The YCbCr data and the transparency data $\alpha 2$ are supplied to the presentation processor 155.

An output of the moving picture plane 134 is supplied to the presentation processor 155 through an up/down converter 154.

The up/down converter 154 is a circuit that converts the resolution of the image. The up/down converter 154 converts for example a HD (High Definition) image having a high resolution into an SD (Standard Definition) image having a standard resolution.

The presentation processor 155 performs an alpha-blending process using transparency $\alpha 1$ of image data of the subtitle plane 11 (subtitle plane 132) and transparency $\alpha 2$ of the graphics plane 12 (graphics plane 133) described in FIG. 22.

The presentation processor 155 combines image data of the moving picture plane 134 and image data of the subtitle plane 132 in accordance with the transparency $\alpha 1$ that has been set to the image data of the subtitle plane 132. In addition, the presentation processor 155 combines the image data of which the moving picture plane 134 and the subtitle plane 132 have been combined and the image data of the graphics plane 133 in accordance with the transparency $\alpha 2$ that has been set to the image data of the graphics plane 133. The image data of which the image data of the graphics plane 133, the image data (subtitle data) of the subtitle plane 132, and the image data of the moving picture plane 134 have been combined is obtained from an output terminal 156.

The presentation processor 155 can perform an effect process for image data on real time basis.

In the foregoing description, a graphics decoder 116A decodes subtitles as sub picture data and supplies the decoded data to the subtitle plane 11. It should be noted that subtitles may be supplied in another method. For example, subtitles may be supplied as character code such as text data. The character code is converted into bit map data for a character string by referencing font data stored in the font buffer 109B.

The font data is reproduced from for example a disc and input as a store object to the input terminal 101. Thereafter, the font data is stored in the code buffer 104 through the switch circuit 102. Thereafter, the font data is supplied from the code buffer 104 to the font buffer 109B through the multimedia engine 106.

A character code for subtitles is reproduced from for example a disc, input as a store object from the input terminal 101, and stored in the contents buffer 105 through the switch circuits 102 and 103. Thereafter, the character code is input as a real time stream from the input terminal 202 and supplied to the switch circuit 103 through the PID filter 110 and the buffer TBn 111A, and stored in the contents buffer 105. The character code is read from the contents buffer 105 and supplied to the multimedia engine 106.

Display timing of the character code is controlled by a program. The multimedia engine 106 references the font buffer 109B in accordance with the character code that is displayed at the display timing of the character code and selects corresponding font data. When the character code is [0x41], [0x42], [0x43], . . . (where [0x] is followed by a numeric value in hexadecimal notation), font data for characters [A], [B], [C], . . . is selected. Based on the font data, the text style and glyph shape are varied so as to generate bit map data having a size designated by the program (referred to as rendering).

The generated bit map data is supplied to the subtitle plane 132 through the switch circuit 130. This is because the subtitles should be synchronized with a moving picture on the moving picture plane 134.

The character code may be rendered by dedicated hardware instead of the multimedia engine 106 and the CPU of the system. The font data that the character code references is not limited to font data that is reproduced from a disc. Alternatively, the font data may be obtained through the network. The font data may be pre-stored in a ROM (Read Only Memory) of hardware of the player. The user may be able to select a type of font data.

When subtitles are supplied as character code, the data amount of the subtitles displayed is much smaller than that of subtitle data that is supplied as image data.

In the foregoing description, each portion of the player decoder 100 is composed of hardware. However, the present invention is not limited to such an example. For instance, the player decoder 100 can be accomplished by a process of software. In this case, the player decoder 100 can be operated on a computer device. The player decoder 100 can be accomplished by a combination of hardware and software. For example, the audio decoder 118 and the MPEG video decoder 120 may be composed of hardware. The rest of the player decoder 100 may be composed of software.

A program that causes a computer device to execute the player decoder 100 composed of only software or a combination of hardware and software is recorded on a recording medium for example a CD-ROM (Compact Disc-Read Only Memory) and supplied therewith. The CD-ROM is loaded into a CD-ROM drive of the computer device. The program recorded on the CD-ROM is installed to the computer device. As a result, the foregoing process can be executed on the computer device. Since the structure of the computer device is well known, the description thereof will be omitted.

2-10. About Buttons

Figures 74, 75:
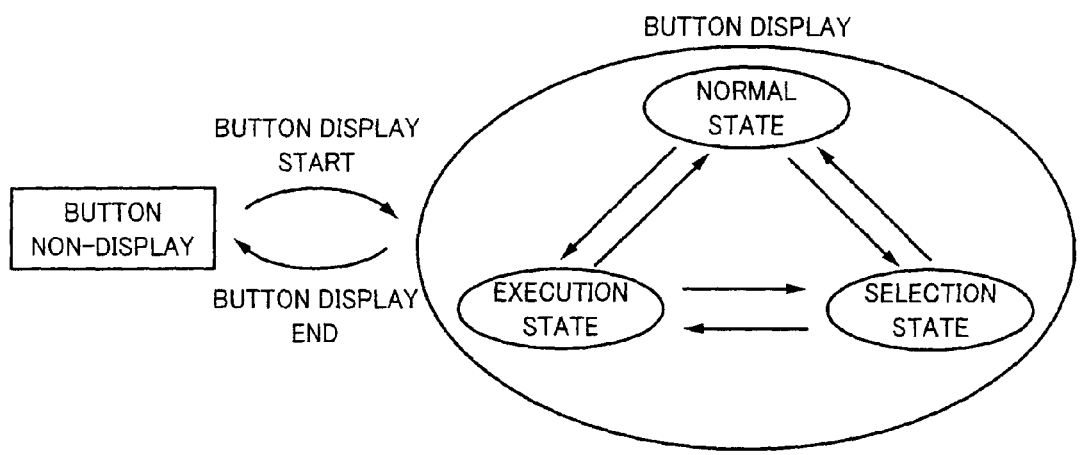
FIG. 74 is a schematic diagram showing an example of a state change of a button that is displayed.
FIG. 75 is a schematic diagram describing categories of types of objects.

Next, a user interface according to an embodiment of the present invention will be described. FIG. 74 is a schematic diagram showing an example of state change of a button displayed on the graphics plane 12. There are two button display states that are a button display state in which a button is displayed on the screen and a button non-display state in which a button is not displayed on the screen. The button non-display state is changed to the button display state. After the button is cleared, the button display state is changed to the button non-display state. The button display state has further three states that are a normal state, a selection state, and an execution state. The button display state can be changed among the three states. The button display state can be changed in one direction among the three states.

Next, with reference to FIG. 25, the state changes of the button display states will be described in detail. When a disc is loaded into the player or when the user presses the menu key of the remote controller, the menu screen 60 is displayed. When the menu screen 60 is displayed, the button display states of the buttons 62A, 62B, 62C, 63D, 64, and 65 are changed from the non-display states to the display states. Normally, one of the buttons 62A, 62B, 62C, 63D, 64, and 65 has been placed in the selection state. Now, it is assumed that the button 62A has been placed in the selection state and the other buttons have been placed in the normal state.

When the user operates for example an arrow key of the remote controller, one (for example, the button 62A) of the buttons is changed from the normal state to the selection state. In addition, the button 62A is changed from the selection state to the normal state. The cursor is moved in accordance with the user's operation. When the user operates the OK key of the remote controller, the button 62B is changed from the selection state to the execution state. As a result, a player operation assigned to the button 62B is executed.

As described above, player operations are described in a programming language using original commands and a script language such as ECMA script. The program and script of the player operations are recorded on a disc. The program and script of the player operations may be recorded as independent files on a disc. Alternatively, as graphic objects that will be described later, the program and script of the player operations may be multiplexed with a clip AV stream file. The program and script of the player operations would be downloaded to a memory or a storage device of the player through the network.

Next, data structures of image data of buttons that compose such a menu screen and control information associated with the image data will be described. Now, subtitles and graphics (still pictures) that are displayed other than a moving picture that composes a content main part recorded on a disc will be considered. Elements such as subtitles and graphics displayed on the screen are considered as objects. The types of objects are categorized as three types that are subtitles, synchronous graphics, and asynchronous graphics.

Subtitles are displayed in synchronization with a moving picture like subtitles of a movie. Subtitles are image elements that do not relate to user's inputs through for example the remote controller. Graphics are image elements such as buttons on a menu screen that can accept user's inputs. Graphics are categorized as two types of synchronous graphics and asynchronous graphics. Synchronous graphics are image elements in synchronization with a moving picture. Synchronous graphics are for example branch selection screens that are displayed at particular timing while a content main part is being reproduced. Asynchronous graphics are image elements that are displayed not in synchronization with a content main part that is being reproduced. Examples of asynchronous graphics are a menu screen that is initially displayed when a disc is loaded into the player and a screen that is displayed in accordance with a user's input. An image element that is displayed by a Java application that operates on JavaVM and an image element displayed in accordance with the description of an HTML file on browser software are asynchronous graphics.

In the relation of each image element and a main picture displayed on the moving picture plane 10, subtitles and synchronous graphics are displayed in synchronization with the main picture. Thus, both subtitles and synchronous graphics are synchronous type. On the other hand, since asynchronous graphics are displayed not in synchronization with a main picture, they are asynchronous type as the name implies.

Subtitles and graphics can be categorized in accordance with planes. Subtitles are displayed on the subtitle plane 11. Synchronous and asynchronous graphics are displayed on the graphics plane 12.

Since subtitles and synchronous graphics are displayed while a main moving picture is being displayed, it is preferred that they have a common data structure. Hereinafter, subtitles and synchronous graphics having a common data structure are referred to as graphics objects. Since graphics objects are always displayed in synchronization with a moving picture that is being reproduced, when they are multiplexed with a moving picture, they can be easily handled.

Figures 76A, 76B, 76C:
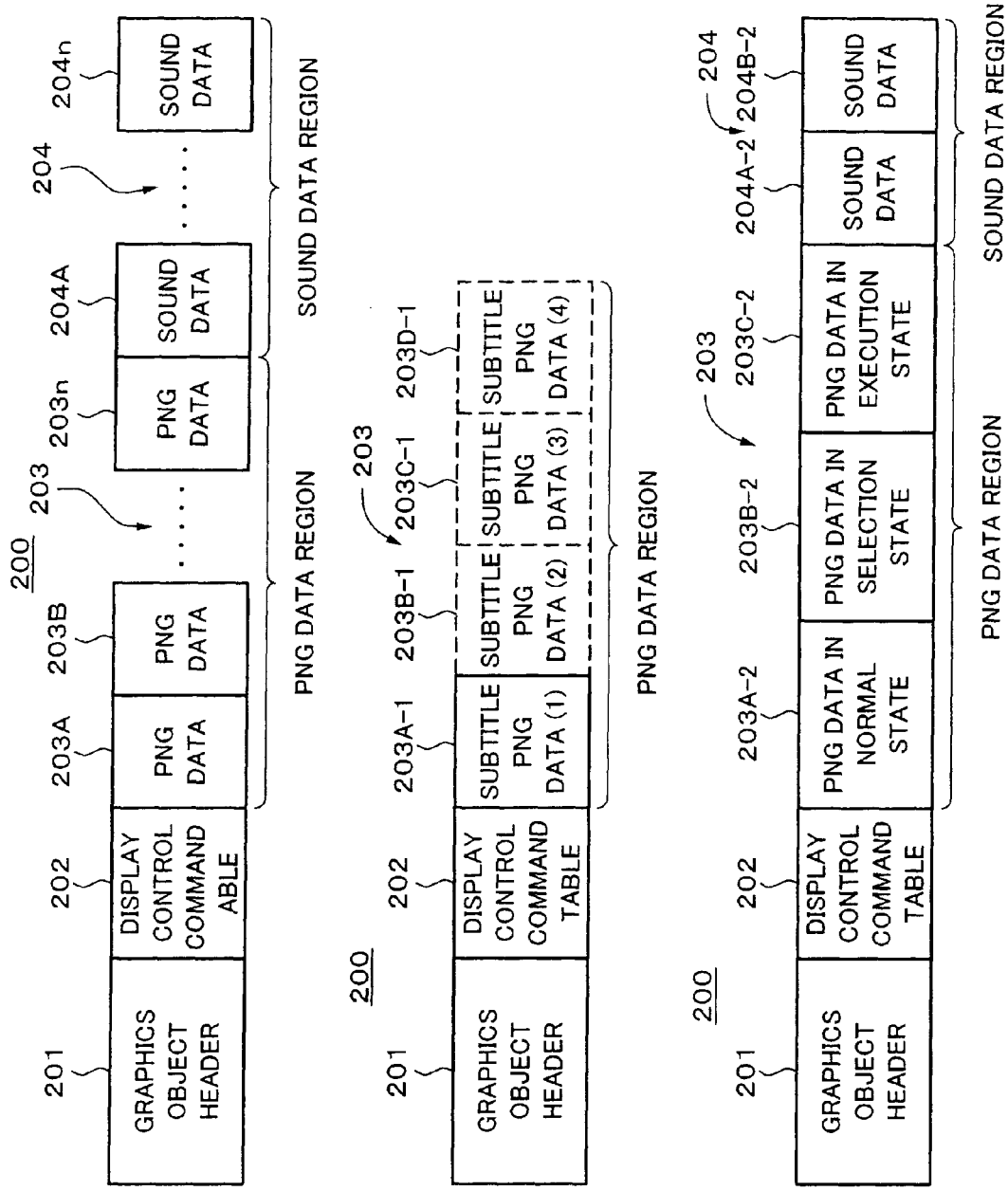
FIG. 76A, FIG. 76B, and FIG. 76C are schematic diagrams showing examples of data structures of graphics objects according to an embodiment of the present invention.

FIG. 76A, FIG. 76B, and FIG. 76C show an example of a data structure of a graphics object 200 according to an embodiment of the present invention. As shown in FIG. 76A, the graphics object 200 is composed of four regions that are a graphics object header 201, a display control command table 202, a PNG data region 203, and a sound data region 204.

In the following example, it is assumed that image data treated as the graphics object 200 has a PNG format and that the image data is PNG image data. Alternatively, the graphics object 200 may be another format image data such as bit map data having the JPEG format, image data that is compressed in accordance with the run length compressing method, or bit map data that is not compression-encoded. For convenience, image data will be represented as PNG image, PNG image data, or the like.

In FIG. 76A, FIG. 76B, and FIG. 76C, the graphics object header 201 describes information that represents attributes of the graphics object 200. The attributes of the graphics object 200 are for example the data size of the graphics object 200, the number of PNG images that the graphics object 200 has, palette data used for PNG image data that the graphics object 200 uses in common, and identification information with which the graphics object 200 is identified. The identification information is for example a number uniquely assigned to each graphics object 200. The graphics object header 201 may describe further another information.

The display control command table 202 describes information necessary for controlling display of PNG images such as display positions of PNG images that the graphics object 200 has and display start times and display end times thereof.

The PNG data region 203 describes image data that has been compression-encoded in accordance with the PNG format (hereinafter, the image data is referred to as PNG data). The PNG data region 203 can have a plurality of PNG data 203A, 203B, . . . , and 203n. The number of PNG data described in the PNG data region 203 is described in the graphics object header 201.

It is assumed that a plurality of PNG data 203A, 203B, . . . , 203N described in the PNG data region 203 are images that are strongly correlated such as a set of a plurality of still pictures that composes an animation or images of three states of a button that is displayed. When these PNG data 203A, 203B, . . . , and 203N are grouped as one graphics object, PNG images can be easily handled.

The sound data region 204 will be described latter.

The graphics object 200 has time information that describes time at which the graphics object 200 can be displayed. In the example of which a real time stream is transmitted as an MPEG2 TS, pts (Presentation Time Stamp) defined in the MPEG2 (Moving Pictures Experts Group 2) is used as the time information. The pts is time management information of an output that is reproduced. The pts is measured by a clock of 90 kHz as a value having a length of 33 bits. When the STC (System Time Clock) of the reference decoder of the MPEG system accords with the pts, a corresponding access unit is reproduced and output. One graphics object 200 can be displayed after time represented by the pts. After the time represented by the pts, the display of the graphics object 200 is turned on and off with a display control command. Since the display of the graphics object 200 is managed with the display control command, after the display of the graphics object 200 is turned off, the same graphics object 200 can be displayed.

FIG. 76B shows an example of the graphics object 200 of subtitles. A PNG data region 203 describes an image of subtitles as PNG data (1) 203A-1. When the graphics object 200 is subtitles, the graphics object 200 requires only the PNT data (1) 203A-1. When a command that causes display attributes (transparency, display color, and so forth) to be changed is added to the display control command table 202, the display of the PNG data (1) A-1 can be changed without need to change the PNG data (1) A-1 itself.

A special effect such as fade in/fade out that does not change the contents of an image can be added to for example subtitles by adding a display control command that causes transparency of the PNG data (1) A-1 to be changed to the display control command table 202. When the fade in/fade out is performed, it is not necessary to change the PNG data (1) itself. Likewise, by adding a display control command that causes palette data that the PNG data (1) A-1 references to be changed to the display control command table 202, only a display color can be changed without need to change the PNG data (1) A-1 itself.

When an effect such as an animation of which images are varied is applied to subtitles, a plurality of PNG data (2) B-1, PNG data (3) C-1, PNG data (4) D-1, . . . corresponding to individual motions of the animation may be described in one graphics object 200 as represented by dotted lines shown in FIG. 76B. In addition, PNG data of subtitles of different languages such as Japanese subtitles and English subtitles can be described as PNG data (1) A-1, PNG data (2) B-1, . . . in one graphics object 200.

FIG. 76C shows an example of a graphics object 200 that composes a button. As described above, a button has three types of states that are a normal state, a selection state, and an execution state. A button can be displayed with different images corresponding to the three types of states. When a button is displayed with different images corresponding to the three types of states, it is necessary to prepare data of three button images. The data of three button images is treated as one graphics object 200. The PNG data region 203 of the graphics object 200 describes PNG data 203A-2, 203B-2, and 203C-3 with which a button is displayed in the normal state, the selection state, and the execution state, respectively.

When the graphics object 200 has only PNG data 203A-1 for subtitles as represented by solid lines shown in FIG. 76B, a display control command for the PNG data 203A-1 is described in the display control command table 202 of the graphics object 200. When the graphics object 200 has a plurality of PNG data 203A-2, 203B-2, and 203C-2, it is necessary to identify a display control command described in the display control command table 202 for the plurality of PNG data 203A-2, 203B-2, and 203C-2.

When the initial state of a button of a graphics object 200 shown in FIG. 76C has been designated as the selection state, a button image that is displayed first and placed at the beginning of the PNG data region 203 should not be the PNG data 203A-2 for the normal state, but the PNG data 203B-2 for the selection state. According to a first embodiment of the present invention, the display control is performed outside the graphics object 200.

The initial state of each button, display start and display stop, a program that is executed in the execution state of each button, and so forth would be designated by an external script program of a graphics object 200, for example, foregoing ECMA script or JavaScript. PNG data for a button that is displayed is changed when the user operates an arrow key of the remote controller and moves the cursor. In this case, the player changes PNG data of each button in accordance with a user's input.

Figure 77:
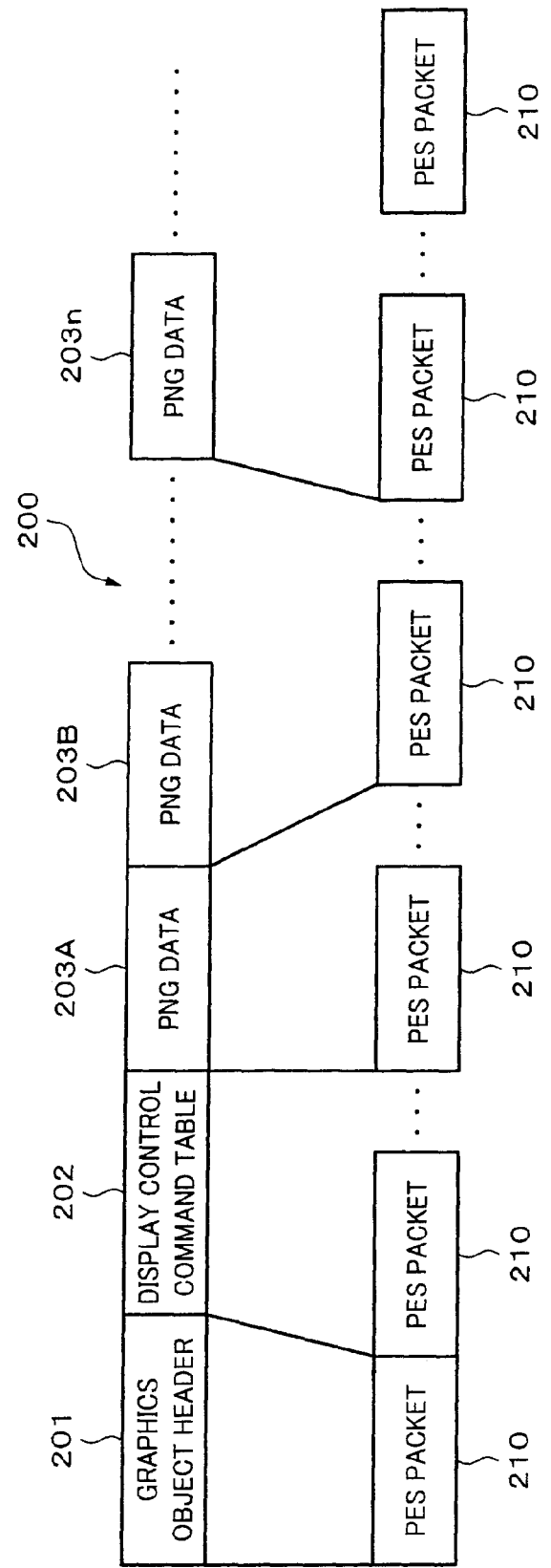
FIG. 77 is a schematic diagram showing a state of which a graphics object is divided and contained in a PES packet.

According to the embodiment of the present invention, a graphics object 200 is divided into packets that are prescribed in the MPEG2, multiplexed with a clip AV stream, and recorded as a clip AV stream file on a disc. As shown in FIG. 77, a graphics object 200 is divided and contained in PES (Packetized Elementary Stream) packets 210, 210, . . . that are prescribed in the MPEG2. At that point, the graphics object header 201, the display control command table 202, and the beginning of individual PNG data 203A, 203B, . . . , 203n are contained at the beginning of the payload of each of the PES packets 210, 210, . . . . As a result, when a graphics object 200 is reproduced, it can be easily searched for each data thereof.

A graphics object 200 divided and contained in the PES packets 210, 210, . . . is further divided into TS packets having a fixed data size of 188 bytes (not shown) and multiplexed with a stream of moving picture data and sound data such as a clip AV stream.

FIG. 78 is a functional block diagram showing an example of a structure of a graphics object decoder model 240 that decodes a graphics object 200. The graphics object decoder model 240 mainly comprises the multimedia engine 106 and the graphics decoder A 116 of the player decoder 100 described in FIG. 73A, FIG. 73B, and FIG. 73C. Since the function of the graphics decoder B 117 is the same as the function of the graphics decoder A 116, only the function of the graphics decoder A 116 will be described in the following. In FIG. 78, for simplicity, similar portions to those in FIG. 73A, FIG. 73B, and FIG. 73C will be denoted by similar reference numerals and their description will be omitted. Since FIG. 78 more functionally shows the graphics object decoder model 240 than FIG. 73A, FIG. 73B, and FIG. 73C, when necessary, the graphics object decoder model 240 will be described in comparison with structures shown in those drawings.

A clip AV stream is supplied from the terminal 202 to the PID filter 110. The PID filter 110 functions as a demultiplexer for an MPEG TS (transport stream) and extracts moving picture data, audio data, and a graphics object 200 from the MPEG TS in accordance with the PID of the TS. The moving picture data is supplied to the buffer TBn 111 E, which is a video buffer. Audio data is supplied to a buffer 111D that is an audio buffer. The graphics object 200 is supplied to the buffer TBn 111B, which is an input buffer of a graphics object (denoted by "GOBJ" in FIG. 78).

The graphics object 200 is read from the buffer TBn 111B and supplied to a GOBJ parser 224. The GOBJ parser 224 is for example one of functions of the graphics decoder A 116 shown in FIG. 73. The GOBJ parser 224 reads the graphics object header 201 from the supplied graphics object 200, extracts palette data from the graphics object header 201, and separates the display control command table 202, the PNG data region 203, and the sound data region 204 from the graphics object header 201. The palette data and the display control command table 202 are supplied to a command processor/graphic renderer 225. PNG data 203A, 203B, . . . of the PNG data region 203 are temporarily stored in a PNG decoder buffer 226. The PNG decoder buffer 226 corresponds to the buffer Bn 112B shown in FIG. 73A, FIG. 73B, and FIG. 73C.

The sound data 204A, 204B, . . . 204n of the sound data region 204 are supplied to the command processor/graphic renderer 225 and stored in respective buffers (not shown) thereof.

The PNG data 203 stored in the PNG decoder buffer 226 is decoded by a PNG decoder 227 that is one of functions of the graphics decoder A 116 and output as bit map data. The bit map data is stored in an object buffer 228. The object buffer 228 corresponds to a buffer memory disposed in the decoder 116 shown in FIG. 73A, FIG. 73B, and FIG. 73C. When PNG data 203 is decoded by software, the object buffer 228 corresponds to the graphics buffer 109D shown in FIG. 73A, FIG. 73B, and FIG. 73C.

The command processor/graphic renderer 225 reads the bit map data stored in the object buffer 228 in accordance with a display control command described in the display control command table 202 and transfers the bit map data to a plane buffer 229 at designated time. The plane buffer 229 corresponds to for example the subtitle plane 132 and the graphics plane 133 shown in FIG. 73A, FIG. 73B, and FIG. 73C. Plane buffers 229A and 229B (not shown) may be disposed for subtitles and graphics objects other than subtitles. Alternatively, the subtitle plane 132 and the graphics plane 133 may be regions different from the plane buffer 229.

The command processor/graphic renderer 225 supplies palette data supplied from the GOBJ parser 224 to a common palette table 230 that corresponds to the palette 150 shown in FIG. 73A, FIG. 73B, and FIG. 73C. The command processor/graphic renderer 225 has a part of functions of the multimedia engine 106 and a part of functions of the graphics decoder A 116 shown in FIG. 73A, FIG. 73B, and FIG. 73C.

The command processor/graphic renderer 225 reads sound data from a buffer in accordance with a display control command described in the display control command table 202 supplied from the GOBJ parser 224 and outputs the sound data. When the sound data 204A, 204B, . . . , 204n stored in the graphics object 200 have been compression-encoded, they are decoded by the command processor/graphic renderer 225 and then output.

Sound data that is output from the command processor/graphic renderer 225 is supplied to an audio mixer 231 and output to the presentation processor 157. When another type of sound data is input to the audio mixer 231, these two types of sound data are mixed at a predetermined ratio and then output.

When a graphics object 200 composes a button, PNG data 203A, 203B, and 203C corresponding to three types of states of the button are contained in the graphics object 200. The PNG data 203A, 203B, and 203C are decoded by the PNG decoder 227 and stored in the object buffer 228.

An input from for example the user's remote controller is received by the command processor/graphic renderer 225. The command processor/graphic renderer 225 reads a bit map from the object buffer 228 in accordance with the user's input and transfers the bit map to the plane buffer 229. When the user's input causes the state of the button to be changed from the selection state to the execution state, bit map data that corresponds to the button image of the execution state is selectively read from the object buffer 228 and transferred to the plane buffer 229.

The command processor/graphic renderer 225 can perform a special effect process such as an extracting process for the bit map data that is read from the object buffer 228 in accordance with a display control command.

According to the embodiment, since the sampling depth of one pixel of PNG data is eight bits, data of eight bits per pixel is arranged in the plane buffer 229. Data of the plane buffer 229 is read at intervals of a scanning period of a displaying system that performs a displaying process for such as a display device. Bit map data that is read from the plane buffer 229 is supplied to the common palette table 230 that corresponds to for example the palette 150 shown in FIG. 73A, FIG. 73B, and FIG. 73C. The common palette table 230 converts the bit map data into color information of real RGB (4:4:4) in accordance with a palette index value and extracts transparency data α1 and α2 from the bit map data. Color information of RGB (4:4:4) is converted into color information of YCbCr (4:4:4) of a converting circuit (not shown). The color information of YCbCr (4:4:4) is supplied to the presentation processor 155 shown in FIG. 73A, FIG. 73B, and FIG. 73C along with the transparency data α1 and α2.

A special effect that requires a process for changing a palette and transparency such as fade in/fade out is accomplished by the command processor/graphic renderer 225 that varies data of the common palette table 230 in accordance with a display control command. Alternatively, common palette tables 230A and 230B (not shown) may be disposed for subtitles and a graphics object 200 other than subtitles.

FIG. 79A, FIG. 79B, FIG. 79C, and FIG. 79D show examples of changes of stored data amounts of the graphics object input buffers (buffer TBn 111B, hereinafter referred to as GOBJ input buffer), the PNG decoder 227, the object buffer 228, and the plane buffer 229. The PNG decoder 227 shows a stored data amount of a buffer that the PNG decoder 227 uses when it decodes the PNG data.

FIG. 79A, FIG. 79B, FIG. 79C, and FIG. 79D show changes of data amounts on time base of three graphics objects GOBJ#1, GOBJ#2, and GOBJ#3. The decode start time of a graphics object is represented with a dts (Decoding Time Stamp) of the MPEG2 system. The start time of the valid period of an object is represented with a pts. An object is ended at time presentation_end described in the graphics object header 201. A display control command designates the display start and end of an image in the valid period.

In FIG. 79D, PNG data of the graphics object GOBJ#1 is input to the GOBJ input buffer. At time dts of GOBJ#1, decoding of the PNG data is started. In FIG. 79C, the PNG data is transferred from the GOBJ input buffer to the PNG decoder 227. The PNG data is decoded and bit map data is obtained. In reality, the PNG data is temporarily moved from the GOBJ input buffer to the PNG decoder buffer 226. The PNG decoder 227 performs a decoding process for data stored in the PNG decoder buffer 226.

Since the PNG decoder 227 has an upper limit of a decoding speed, data is supplied from the GOBJ input buffer to the PNG decoder buffer 226 so that the transfer speed of the data does not exceed the decoding speed of the PNG decoder 227. Thus, PNG data is input to the PNG decoder buffer 226 at a data transfer speed corresponding to a slope against a vertical line that represents the case of a conceptual model of which the transfer time of PNG data to the PNG decoder 227 is 0.

Even if PNG data has not been fully input to the PNG decoder 227, decoding of the PNG data can be started. In the example shown in FIG. 79A, FIG. 79B, FIG. 79C, and FIG. 79D, after the object GOBJ#1 stored in the GOBJ input buffer has been fully transferred to the PNG decoder 227, an input of PNG data of the next object GOBJ#2 to the GOBJ buffer is started.

Likewise, PNG data of the object GOBJ#2 and the object GOBJ#3 is input to the PNG decoder buffer 226 at respective transfer speeds corresponding to particular slopes B and C, respectively. In reality, the slope B varies in a plurality of regions.

When the valid period of the object GOBJ#1 starts at time pts of GOBJ#1, bit map data of the object GOBJ#1 that has been decoded and stored in the PNG decoder buffer is transferred to the object buffer 228 (FIG. 79B). The valid period of the object GOBJ#1 transferred to the object buffer 228 continues until time represented by presentation end of GOBJ#1 (end of presentation of GOBJ#1).

In the valid period of the object GOBJ#1, when a command Display ON Cmd. of GOBJ#1 (display start command for GOBJ#1) is issued, bit map data of the object GOBJ#1 stored in the object buffer 228 is transferred to the plane buffer 229 and displayed (FIG. 79A). As will be described later, the upper limit of the transfer speed of bit map data to the plane buffer 229 varies depending on an influence of a bus width and the like. Thus, bit map data is written to the plane buffer 229 at a transfer speed corresponding to for example a particular slope D.

Likewise, bit map data of the other objects GOBJ#2 and object GOBJ#3 is transferred at transfer speeds corresponding to slopes E, F, and G and written to the plane buffer 229.

The object GOBJ#1 is continuously displayed until a command Display OFF cmd. of GOBJ#1 (display end command for GOBJ#1) that causes the object GOBJ#1 to be cleared is issued. When the command Display OFF cmd. of GOBJ#1 is issued, the bit map data of the object GOBJ#1 stored in the plane buffer 229 is discarded and the object GOBJ#1 is cleared on the screen.

The objects GOBJ#2 and GOBJ#3 are successively input to the GOBJ buffer. Like the object GOBJ#1, decoding of the objects GOBJ#2 and GOBJ## is started at time dts of GOBJ#2 and time dts of GOBJ#3. PNG data is supplied to the PNG decoder 227. The PNG decoder 227 decodes the PNG data with a PNG decoder buffer and outputs bit map data. The valid period of the object GOBJ#2 is designated time pts of GOBJ#2. A command Display ON cmd. of GOBJ#2 (not shown in FIG. 79) causes the object GOBJ#2 to be displayed. The object buffer 228 transfers bit map data to the plane buffer 229. The object GOBJ#2 is displayed until the command Display OFF cmd. of GOBJ#2 is issued.

In the example shown in FIG. 79A, FIG. 79B, FIG. 79C, and FIG. 79D, after the object GOBJ#2 is cleared with a command Display OFF cmd. of GOBL#2 (not shown), the object GOBJ#2 is displayed again with a command Display ON cmd. of GOBJ#2. Bit map data of the object GOBJ#2 is kept stored in the object buffer 228 until valid period end time presentation end of GOBJ#1 is designated to the object GOBJ#2. Thus, with the command Display ON cmd. of GOBJ#2, the object GOBJ#2 can be repeatedly displayed.

The valid period designated for the object GOBJ#3 overlaps with the valid period designated for the object GOBJ#2. In this case, the object buffer 228 stores a plurality of bit map data in different regions in accordance with a blank capacity thereof. For example, while bit map data of the object GOBJ#2 is transferred from the object buffer 228 to the plane buffer 229 and displayed, when bit map data of the object GOBJ#3 is transferred from a different region of the object buffer 228, data of two bit maps can be displayed at the same time.

2-11. About Transfer Speed of Graphics

Next, the case that the graphics object decoder model 240 (hereinafter referred to as decoder model 240) is implemented to the player will be considered. To allow data reproduced from the same disc to have compatibility with different players, it would be necessary to apply predetermined restriction to the decoder model 240. For example, the decoder model 240 has an upper limit of the capability of the graphics process. Thus, when graphics data that exceeds the upper limit of the capability is input, it becomes impossible to perfectly decode the graphics data. As a result, the graphics data cannot be normally displayed.

The minimum capability of the graphics process that the player side should have will be prescribed in a standard. On the other hand, graphics that can be processed in the minimum capability prescribed in the standard will be prepared on the contents producer side. By matching the capability of the graphics process that the player side has with the capability of the graphics process that the contents producer side prepares, the reproduction compatibility can be maintained.

According to the embodiment of the present invention, in FIG. 78, a data transfer speed R(1) from the GOBJ parser 224 to the PNG decoder buffer 226 and a data transfer speed R(2) from the command processor 225 to the plane buffer 229 are prescribed.

The data transfer speed R(1) prescribes the data transfer amount pre unit time of data that is input to the PNG decoder buffer 226. In other words, the slopes A, B, and C shown in FIG. 79C correspond to the data transfer speed R(1). That prescribes the decode capability that represents the amount for which the PNG decoder 227 disposed downstream of the PNG decoder buffer 226 can decode compression-encoded graphics data in a unit time. Thus, by restricting the data transfer speed R(1), the input compression-encoded graphics data can be prevented from being imperfectly decoded and being improperly displayed.

The data transfer speed R(2) prescribes an update speed of an image. The plane buffer 229 corresponds to a screen actually displayed on the display device. The update speed of graphics that the user sees depends on the write speed of data to the plane buffer 229. The data transfer speed R(2) prescribes the minimum update interval of all a plane, namely all a screen in the unit of [bytes/second]. The slopes D, E, F, and G shown in FIG. 79A correspond to the data transfer speed R(2).

When a part of a plane is updated, since the amount of image data that is updated is small, it is updated at a shorter period than the minimum update interval prescribed as the data transfer speed R(2). The update interval is not always proportional to the data amount of the image data that is updated. The update interval is largely affected by the arrangement of image data on a plane.

Next, with reference to FIG. 80, the update speed of a plane will be described in detail. It is assumed that the object buffer 228 stores two graphics objects 460 and 461 and that these two graphics objects 460 and 461 are written to the plane buffer 229 and displayed.

The graphics objects 460 and 461 are read from the object buffer 228 and supplied to the command processor/graphic renderer 225. An output of the command processor/graphic renderer 225 is restricted at the foregoing data transfer speed R(2) so as to restrict the update speed (update interval) on the screen.

However, even if two objects have the same data amount to be rewritten, their update speeds on the screen vary depending on where they are placed on a plane and how they are deformed and moved. Thus, it is difficult to estimate their update speeds. In the example shown in FIG. 80, the update speeds of the graphics objects 460 and 461 depend on how they are placed on the plane rather than the total of their data amounts.

Thus, a data amount to be rewritten to the plane buffer is defined as a square update region referred to as window. Thus, the minimum update interval can be estimated as described below. As a result, the accomplishment of the implementation and reproduction compatibility can be improved. Since the defined region is square, it can be easily applied to a conventional graphics processor that performs a graphics process. Hereinafter, a model based on the definition of the window is referred to as window model.

For example, in FIG. 80, a plane is updated with a square region 462 that contains all the graphics objects 460 and 461 placed on the plane. The command processor/graphic renderer 225 forms image data of the square region 462 in accordance with arrangement information of the graphics objects 460 and 461. The image data of the square region 462 of the square region 462 is supplied to the plane buffer 229 through a transfer bus. The plane buffer 229 substitutes data of the square region 462 with data of the square region 462 that is newly supplied in accordance with a designated display position.

Since image data that is output from the command processor/graphic renderer 225 is bit map data, the image data has a data amount in accordance with the area of the image rather than the content of the image. In the example shown in FIG. 80, the data amount of the image of the square region 462 that contains the graphics objects 460 and 461 can be represented with for example (width×height) pixels, namely (width×height bytes). The square region 462 is referred to as window. A window fully contains one or a plurality of graphics objects. When the area of the window is minimized, the transfer data amount becomes minimum.

Since the data transfer speed to the plane buffer 229 is defined as speed R(2) [bytes/second], it is clear that the graphics objects 460 and 461 can be updated in {speed R(2)/(width×height)} seconds. After a window having a predetermined width and a predetermined height has been transferred to the plane buffer 229, when a time period of at least {speed R(2)/(width×height)} has elapsed, the next graphics object can be drawn. When the disc producer side creates a program that allows two graphics objects to be drawn at an interval of at least the foregoing time period, the same graphics can be displayed by any player. Thus, the reproduction compatibility can be maintained by any player.

As described above, a square region that surrounds a plurality of objects that are displayed at the same time is defined as a window. By dividing the data amount of the window by the transfer speed (2), the shortest update interval of the window can be estimated.

When an object is cleared from a plane, it is necessary to write data to the plane. In the foregoing window model, the entire window can be rewritten in transparent. The time period for clearing the window is the same as the shortest update interval of the window.

Figure 81A:
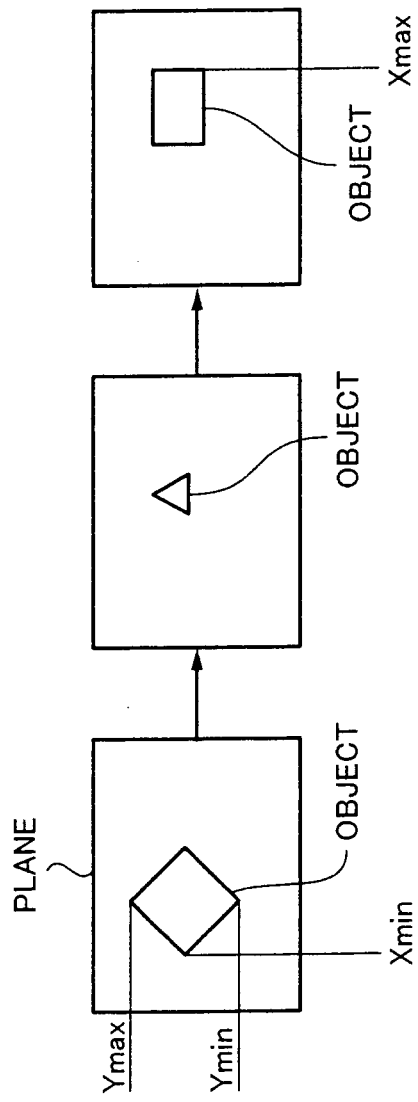
FIG. 81A and FIG. 81B are schematic diagrams describing a definition of a window.
Figure 81B:
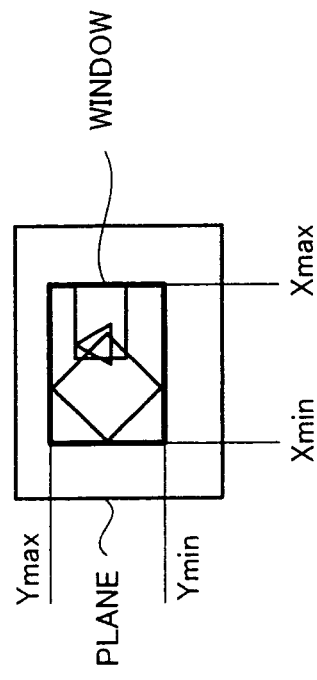
Figure 82A:
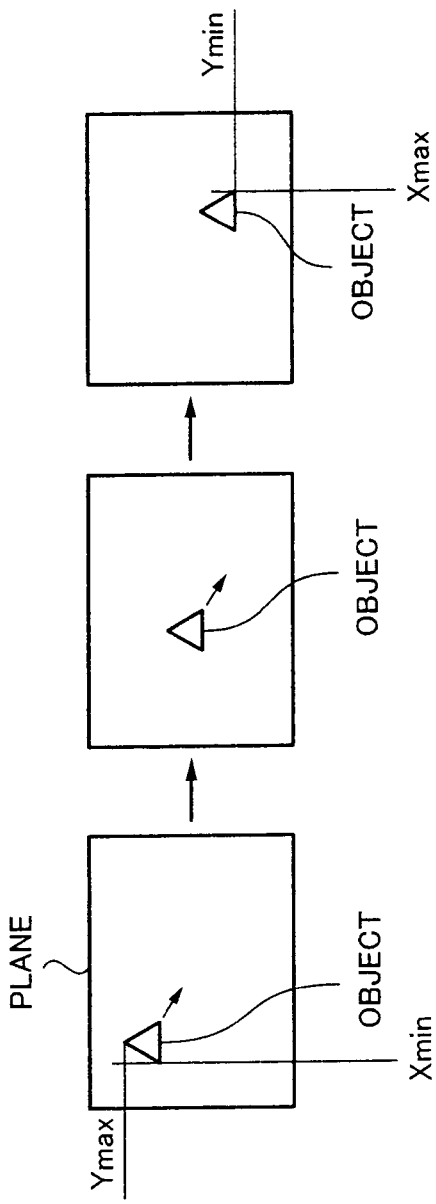
FIG. 82A and FIG. 82B are schematic diagrams describing a definition of a window.
Figure 82B:
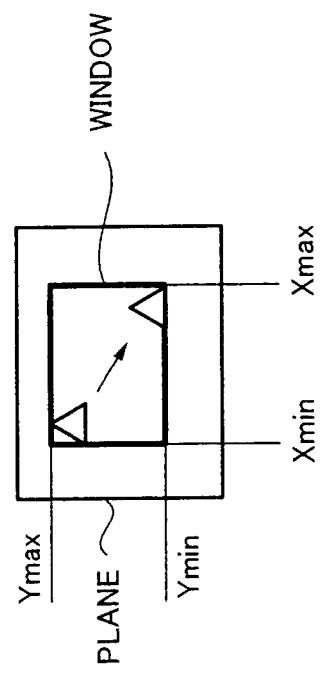

When graphics of which an object is deformed or moved on a plane are created, the operation speed of the foregoing window mode can be estimated. For example, when an object is deformed on the time base as shown in FIG. 81A, a square region $(X_{min}, Y_{min})$, $(X_{max}, Y_{max})$ that fully contains the object that varies on the time base is defined as a window. For example, as shown in FIG. 82A, when an object varies on the time base, as shown in FIG. 82B, a square region $(x_{min}, y_{min})$, $(X_{max}, y_{max})$ that fully contains a locus of the object that moves is defined as a window.

A plurality of (for example, two) windows can be created on a plane. At that point, the plurality of windows on the same plane should not overlap with each other.

According to the embodiment of the present invention, by defining the foregoing window model, the display speed can be easily obtained although it was difficult to calculate the display speed (minimum update interval) of graphics because of presence of many parameters such as the number of objects to be displayed, shapes thereof, sizes thereof, deformation thereof on the time base, and display positions thereof. Thus, the disc producer side can pre-estimate the operation speed of graphics. Thus, the compatibility of the operations of players can be improved.

When the data transfer speed R(2) is estimated, the animation speed of subtitles can be decided so that reproduction compatibility can be maintained as will be described later.

2-12. About Graphics Objects

Next, a structure of the graphics object 200 will be described in detail.

FIG. 83 shows a syntax that describes an example of a structure of the graphics object 200. The graphics object header 201, the display command control table 202, the PNG data region 203, and the sound data region 204 shown in FIG. 76A correspond to a block GraphicsObjectHeader( ), a block GOBJCommandTable( ), a block PNGImageRegion( ), and a block SoundDataRegion( ), respectively.

The block GraphicsObjectHeader( ) starts with a field length. The field length has a data length of eight bits of an integer that is 0 or larger. The field length describes the length immediately after the field length until the end of the block GraphicsObjectHeader( ) in bytes. A field presentation_end_time_stamp has a data length of 33 bits of an integer that is 0 or larger. The field presentation_end_time describes valid period end time of the graphics object 200. The valid period of the graphic object is from a pts of a PES packet header until valid period end time described in this field presentation_end_time_stamp. A field number_of_DispCmds has a data length of eight bits of an integer that is 0 or larger and describes the number of display control commands described in a block GOBJCommandTable( ). A field number_of_P-NG_images has a data length of eight bits of an integer that is 0 or larger and describes the number of PNG images described in the block PNGImageRegion( ). A field number_of_sound_data has a data length of eight bits of an integer that is 0 or larger and describes the number of sound data described in a block SoundDataRegion( ).

A block globalPaletteTable( ) in the block GraphicsObjectHeader( ) describes information of a palette table commonly used in the graphics object 200. Information of a palette table described in the block GlobalPaletteTable( ) is described as the contents of the common palette table 230. A field start_address_of_PNG_image(i) has a data length of 32 bits of an integer that is 0 or larger and describes the position at which data PNG_image(i) of an i-th PNG image starts with the relative number of bytes from the beginning of the block GraphicsObject( ).

A field PNG_file_name(i) describes a file name of PNG data that starts with the field start_address_of_PNG_image (i). The contents of the field PNG_image(i) that is a field in the block PNGImageRegion( ) are the same as those of a single PNG file. A block PNGImageRegion( ) is created by connecting one or more PNG files. For example, in FIG. 76A, the PNG data 203A, 203B, . . . , and 203n are connected and the block PNGImageRegion( ) is created. At that point, a file name can be described in the field PNG_file_name(i) so that the file name is not lost. In contrast, when the PNGImageRegion( ) is decomposed and individual PNG files are obtained, the individual fields PNG_image(i) are independent files having file names described in the field PNG_file_name(i).

A field start_address_of_sound_data(i) has a data length of 32 bits of an integer that is 0 or larger and describes the position that i-th sound data sound_data(i) starts with the relative number of bytes from the beginning of the block GraphicsObject( ).

The block GOBJCommandTable( ) is composed of a command group DispCmds(i) that is a collection of display control commands that are executed at the same time. The command group DispCmds(i) describes display control commands starting with a command execution_time (time) that describes an execution time. In other words, a portion after the command execution_time (time) until the next command execution_time (time) composes one command group DispCmd(i).

As described above, the block PNGImageRegion( ) describes a field PNG_image(i) that is data of one image that has been compression-encoded in accordance with the PNG system.

A block SoundDataRegion( ) describes real sound data as sound data sound_data(i).

Any number of padding_word can be described between the block GraphicsObjectHeader( ) and the block GOBJCommandTable( ). Likewise, any number of padding_word can be described between the block GOBJCommandTable( ) and the block PNGImageRegion( ).

FIG. 84 shows a syntax that describes an example of a structure of the foregoing block GlobalPaletteTable( ). A field number_of_palette_entries describes the number of palette data preceded thereby. When an image is described with an index number having a data length of eight bits, the maximum number of the field number_of_palette_entries is 256. Thus, 256 colors can be used. When only some of 256 colors are used, only necessary palette data is required. The field number_of_palette_entries describes the number of indexes that are used.

A field palette_index_number describes an index number assigned to a field red_value, a field green_value, a field blue_value, and a field alpha that are preceded by the field palette_index_number. Image data references colors and transparency with the index number.

In a loop of a for statement of the block GlobalPaletteTable( ), the field palette_index_number that has the same value should not be described more than twice. Each of the field red_value, the field green_value, and the field blue_value has a data length of eight bits of an integer that is 0 or larger. The field red_value, the field green_value, and the field blue_value designate red, green, and blue, respectively. The field alpha has a data length of eight bits. The field alpha represents transparency α. When the value of the field alpha is 0, it represents perfect transparent. When the value of the field alpha is 255, it represents perfect intrasparent.

Each PNG image can have a chunk of palette information PLTE. According to the embodiment of the present invention, the palette information PLTE is not used, but palette information defined by the block GlobalPaletteTable( ). When a plurality of PNG images are displayed at the same time, if the PNG images use colors of different palettes, it will be difficult to display the PNG images in correct colors. A plurality of PNG images described in the field PNG_image(i) of GraphicsObject( ) reference the common block GlobalPaletteTable( ) and use the common palette table described in the block GlobalPaletteTable( ).

Next, the command group DispCmds(i) will be described. The command group DispCmds(i) describes display control commands that control the display of a graphics object 200. In the command group DispCmds(i), a command execution_time(start_time) causes a command described before the next command execution_time(start_time) to be executed at designated time start_time. The start point of the time start_time is the pts of the graphics object 200. The unit of the time start_time is the same as that of the pts.

One command group DispCmds(i) can describe a plurality of commands that are executed at the time start_time described in the command execution_time(start_time). Commands described in the command group DispCmds(i) are executed simultaneously at the time start_time described in the command execution_time(start_time). Before the commands described in the command group DispCmds(i) have been executed, if the time start_time described in the command execution_time(start_time) of the next command group DispCmds(i+1) has elapsed, the execution of the command group DispCmds(i) is cancelled. Instead, the next command group DispCmds(i+1) is executed.

Display control commands besides the command execution_time(start_time) described in the command group DispCmds(i) would be as listed in FIG. 85A and FIG. 85B. These display control commands are assigned numbers as shown in FIG. 85.

(1) command execution_time(start_time).
(2) command that causes a graphics object to be displayed
(3) command that causes a graphics object to be cleared.
(4) command that causes a color of a palette table that is used and transparency to be changed.
(5) command that causes the position and size of a graphics object displayed on a plane to be set.
(6) command that causes a display range of a graphics object to be set.
(7) command that causes an effect sound to be reproduced.
(8) command that causes an effect sound to be assigned to image data (PNG data).

These seven types of commands preceded by the command execution_time(start_time) are just examples. In other words, commands described in the command group DispCmds(i) are not limited to those commands. Other display control commands can be defined and added to the command group DispCmds(i).

The display start command (2) and the display end command (3) of the graphics object 200 are so-called fade in/fade out commands that are described as a command fade_in(fade_in_time) and a command fade_out (fade_out_time), respectively.

The fade-in is designated by the command fade_in(fade_in_time). The command fade_in(fade_in_time) causes a graphics object 200 to be gradually displayed from the non-display state to the display state. By gradually increasing the value of the transparency α of the alpha-blending corresponding to the time fade_in_time, the fade-in can be accomplished. When the command execution_time(start_time) is followed by the command fade_in(fade_in_time), the graphics object 200 that is transparent gradually becomes intransparent after the time start_time designated by the command execution_time (start_time). After the time designated by the argument time fade_in_time has elapsed, the value of the transparency α of all the palette indexes is set to a value designated on the common palette table.

When the time fade_in_time of the command fade_in(fade_in_time) has been set to 0, the graphics object 200 is immediately displayed in colors and transparency α designated on the palette table.

The fade-out is an inverse process of the fade-in. The fade-out is designated by the command fade_out (fade_out_time). The command fade_out (fade_out_time) causes a graphics object 200 that is displayed to be gradually cleared. By gradually decreasing the value of the transparency a of the alpha-blending corresponding to the time fade_out_time, the fade-out can be accomplished. When the command execution_time(start_time) is followed by the command fade_out (fade_out_time), a graphics object 200 that is intransparent gradually becomes transparent immediately after the time start_time designated by the command execution_time(start_time). After the time designated by the argument time fade_out_time has elapsed, the value of the transparency α of all the palette indexes becomes 0. As a result, the graphics object 200 fully becomes transparent and invisible.

When the time fade_out_time of the command fade_out (fade_out_time) is set to 0, the graphics object 200 is immediately cleared.

When the value of the transparency α is gradually varied in the fade-in and fade-out as time elapses, more natural fade-in and fade-out effects can be preferably obtained. Alternatively, in the fade-in, after the time designated by the time fade_in_time has elapsed, the value of the transparency a should match the value designated on the palette table. However, the resolution and graduation of the transparency α are not designated by a command. In reality, the resolution and gradation of the transparency α depend on the implemented system.

In the foregoing example, the commands are represented as texts such as "fade-in( )" and "fade_out( )" for high recognizability. However, actually, the commands fade_in( ) and fade_out( ) are converted into predetermined binary values along with their arguments and described in DispCmds(i). That applies to other commands that will be described later.

The palette table color and transparency a change command (4) causes palette information to be changed. This command is described in the format of change_palette (index, newR, newG, newB, newAlpha). A PNG image displayed simultaneously on the subtitle plane 11 and the graphics plane 12 references the common palette table that is shown in FIG. 24 and that is defined by the syntax shown in FIG. 83. Palette information defined as GlobalPaletteTable( ) is used as the common palette table. With the command change_palette (index, newR, newG, newB, and newAlpha), the common palette information can be changed.

The values index, newR, newG, and newAlpha described as arguments in the command change_palette (index, newR, newG, newB, newAlpha) cause values R, G, and B of three primary colors of color index values represented by the palette number index to be changed to the values newR, newG, and newB and the value of the transparency a to be changed to the value newAlpha.

The command (5) that causes the display position and size of a graphics object to be set on a plane is used in the format of set_display_box(x1, y1, x2, y2). The command (5) causes a graphics object 200 to be placed in a square region (x1, y1) (x2, y2) defined with coordinates (x1, y1) and (x2, y2) on the plane. The command (6) that causes a display range of a graphics object to be set is used in the format of set_clipping_box(a1, b1, a2, b2). The command (6) causes a square region (a1, b1) (a2, b2) defined with coordinates (a1, b1) and (a2, b2) of a PNG image of a graphics object 200 to be displayed on the plane.

Next, with reference to FIG. 86A and FIG. 86B, the command set_display_box(x1, y1, x2, y2) and the command set_clipping_box(a1, b1, a2, b2) will be described in detail. As shown in FIG. 87, on the coordinates shown in FIG. 86A and FIG. 86B, the upper left corner of the display screen is defined as an origin, the horizontal right direction is denoted by x, the lower vertical direction is denoted by y, and coordinates are denoted by (x, y).

As shown in FIG. 86A, the command set_clipping_box(a1, b1, a2, b2) causes a square region (a1, b1) (a2, b2) that is actually displayed to be set in a PNG image 250 of a graphics object 200. In the example shown in FIG. 86A, it is assumed that the square region (a1, b1) (a2, b2) to be set is smaller than the PNG image 250. The command set_display_box(x1, y1, x2, y2) causes a real display position of the square region (a1, b1) (a2, b2) to be set on a plane of a square region (x1, y1) (x2, y2) (see. FIG. 86B). Only the square region (a1, b1) (a2, b2)

of the PNG image 250 is displayed against the square region (x1, y1) (x2, y2) on the screen.

When the square region (a1, b1) (a2, b2) is larger than the square region (x1, y1) (x2, y2) that is actually displayed, only the PNG image of the square region (x1, y1) (x2, y2) in the square region (a1, b1) (a2, b2) is displayed. In contrast, when the square region (a1, b1) (a2, b2) is smaller than the square region (x1, y1) (x2, y2) that is actually displayed, the outside of the square region (a1, b1) (a2, b2) in the square region (x1, y1) (x2, y2) is treated as a transparent region.

When the foregoing display control commands are described along with a plurality of commands execution_time(start_time), subtitles and synchronous graphics that vary as time elapses can be displayed. For example, in the graphics object 200 shown in FIG. 83, a plurality of command groups DispCmds(i) are described in the block GOBJCommandTable( ). Each of the command groups DispCmds(i) describes the display control commands execution_time (start_time) whose times start_time are different so as to execute the command groups DispCmds(i) at the start times designated by start_time.

Figure 88:
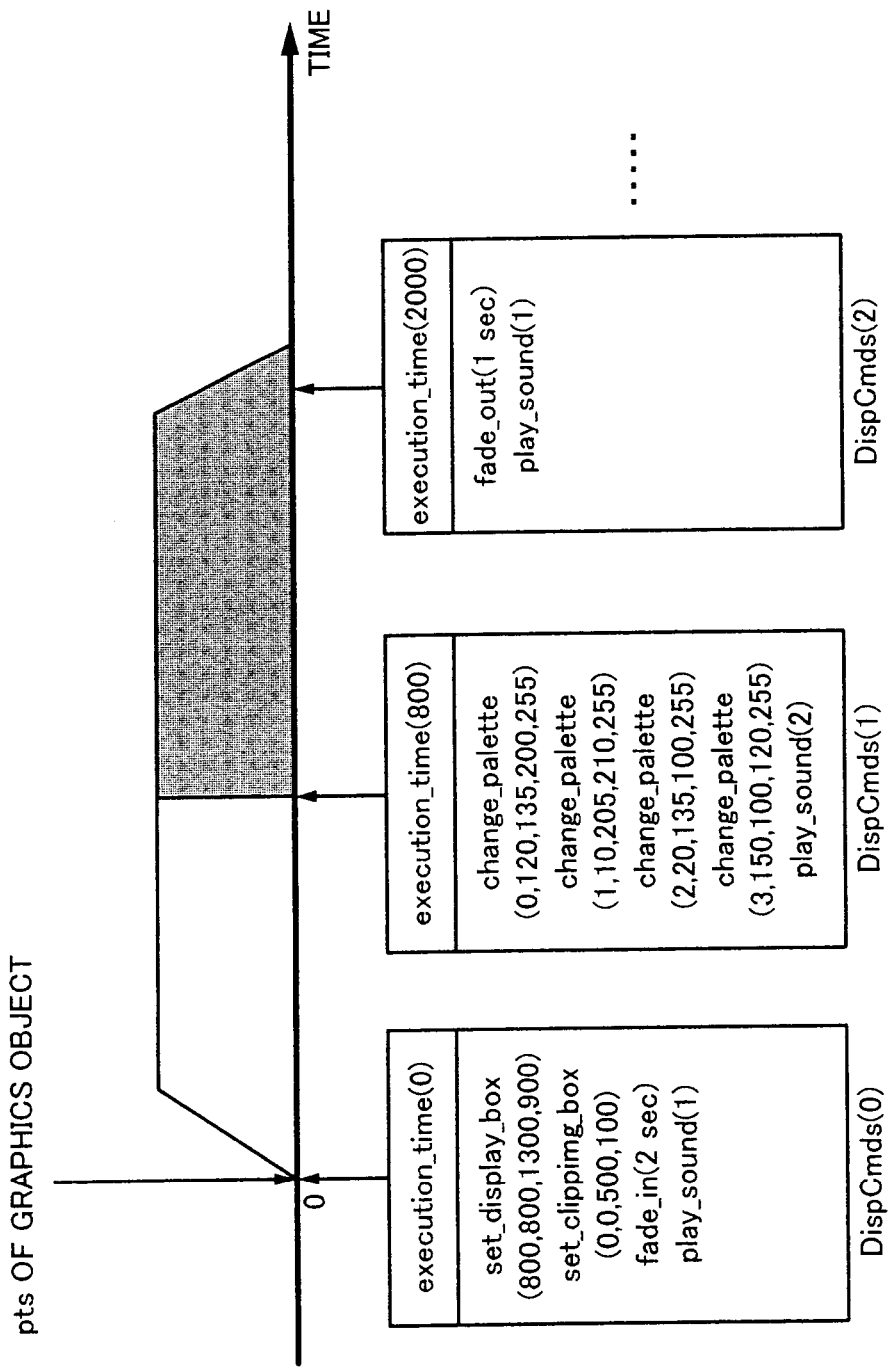
FIG. 88 is a schematic diagram describing the command group DispCmds(i) and an example of a change of a graphics object that is displayed.
Figure 89A:
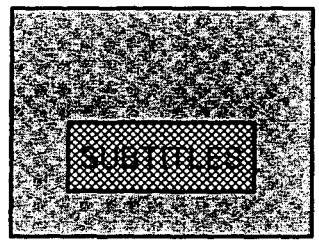
FIG. 89A, FIG. 89B, FIG. 89C, and FIG. 89D are schematic diagrams showing an example of fade-in of which subtitles are gradually displayed.
Figure 89B:
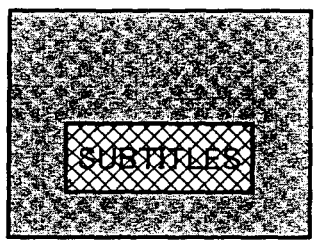
Figure 89C:
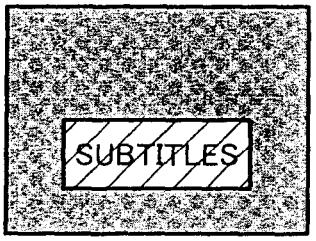
Figure 89D:
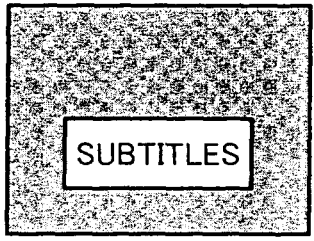

FIG. 88 shows an example of a description of a command group DispCmds(i) and a display change of a graphics object 200. In FIG. 88, the horizontal axis represents an elapse of time, whereas the vertical axis represents transparency of a graphics object 200. In FIG. 88, the transparency increases in the upper direction. The time denoted by pts is the origin.

In the first command group DispCmds(0), a command set_display_box(800, 800, 1300, 900) causes a display region on a plane to be set. A command set_clipping_box(0, 0, 500, 100) causes a display region of a PNG image of a graphics object 200 to be set. A command fade_in (2 sec) causes a fade-in process for two seconds to be started at time [0]. In the next command group DispCmds(1), a command change_palette(index, newR, newG, newB, Alpha) describes color index values [1], [2], [3], and [4]. The command group DispCmds (1) also causes colors and transparency a referenced by the index values [1], [2], [3], and [4] to be changed at time [800]. The next command group DispCmds(2) causes a graphics object 200 that is displayed to be faded out for two seconds at time [2000].

As shown in FIG. 88, when the command groups DispCmds(0), DispCmds(1), and DispCmds(2) are successively described, for example subtitles that vary as time elapses can be accomplished. When the command groups DispCmds(0), DispCmds(1), and DispCmds(2) are properly used, subtitles and button images can be displayed as animations.

FIG. 89A, FIG. 89B, FIG. 89C, and FIG. 89D show an example of fade-in of which subtitles are gradually displayed. In FIG. 89A to FIG. 89D, the fade-in is controlled so that subtitles are gradually displayed. Such simple fade-in can be accomplished with a command similar to the command group DispCmds(0) shown in FIG. 88.

FIG. 90A and FIG. 90B show an example of which a PNG image 260 as subtitles is moved between planes. Such a PNG image 260 can be accomplished with a plurality of commands set_display_box(x1, y1, x2, y2). For example, in the first command group DispCmds(0), a command execution_time (start_time) causes the start time to be set. A command set_clipping_box(a1, b1, a2, b2) causes a display region of the PNG image 260 to be set as shown in FIG. 90A. A command set_display_box(x1, y1, x2, y2) causes an initial display region of the PNG image 260 to be set on the plane.

In the next command group DispCmds(1), a command execution_time(start_time) causes predetermined time that elapses after the execution of the command group DispCmds (1) to be set as start time. A command set_display_box(x1', y1', x2', y2') causes a display region to be moved on the plane to be set. Likewise, in the next command group DispCmds(2), a command execution_time(start_time) causes predetermined time that elapses after the execution of the command group DispCmds(1) to be set as start time. A command set_display_box(x1", y1", x2", y2") causes a display region to be moved on the plane to be set.

Thus, as shown in FIG. 90B, a PNG image 260 as subtitles can be moved to a square region (x1, y1) (x2, y2), a square region (x1', y1') (x2', y2'), and a square region (x1", y1") (x2", y2") on a plane.

FIG. 91A and FIG. 91B show an example of which a display region 262 of a PNG image 261 as subtitles is moved and scrolled. That can be accomplished with a plurality of the commands set_clipping_box(a1, b1, a2, b2). For example, in the first command group DispCmds(0), a command execution_time(start_time) causes start time to be set. A command set_clipping_box(a1, b1, a2, b2) causes a square region 262 that is initially displayed in a PNG image 260 to be set as shown in FIG. 91A. A command set_display_box(x1, y1, x2, y2) causes a square region of the PNG region 260 that is displayed on a plane to be set.

In the next command group DispCmds(1), a command execution_time(start_time) causes predetermined time that elapses after the execution of the command group DispCmd (1) to be set as start time. A command set_clipping_box(a1', b1', a2', b2') causes a display region to be moved in the PNG image 260 to be set. Likewise, in the next command group DispCmds(2), a command execution_time(start_time) causes predetermined time that elapses after the execution of the command group DispCmds(1) to be set as start time. A command set_clipping_box(a1", b1", a2", b2") causes a square region to be moved in the PNG image 260 to be set.

Thus, as shown in FIG. 91B, a square region as a part of a PNG image 261 as subtitles is moved from a square region (a1, b1) (a2, b2) to a square region (a1', b1') (a2', b2') to a square region (a1", b1") (a2", b2") in a square region (x1, y1) (x2, y2) on a plane. As a result, the subtitles can be scrolled.

Figure 92A:
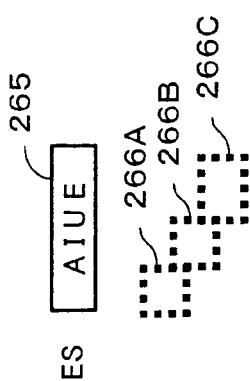
FIG. 92A and FIG. 92B are schematic diagrams showing an example of which a frame that represents a part of a PNG image is designated, the frame is moved on the PNG image, and the position thereof is moved on the plane.
Figure 92B:
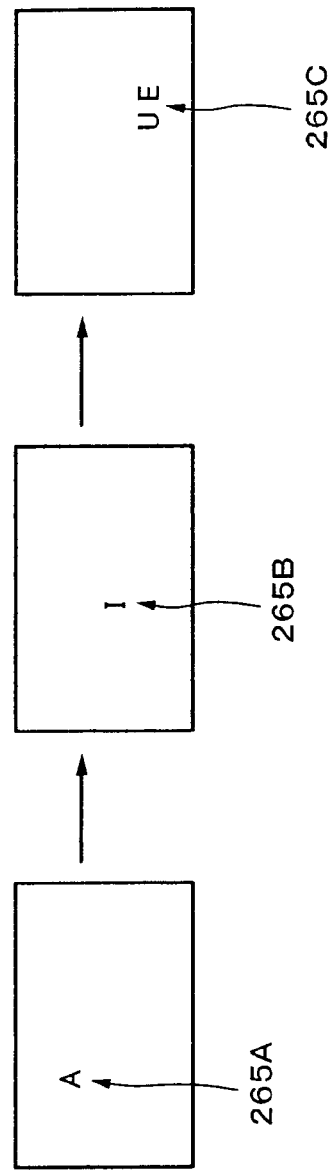

FIG. 92A and FIG. 92B show an example of which a frame as a part of a PNG image 265 is set, the frame is moved in the PNG image 265, and the display position of the frame is moved on a plane. That can be accomplished by executing a plurality of commands set_display_box(x1, y1, x2, y2) and a plurality of commands set_clipping_box(a1, b1, a2, b2) at the same time. For example, in the first command group DispCmds(0), a command execution_time(start_time) causes start time to be set. A command set_display_box(x1, y1, x2, y2) and a command set_clipping_box(a1, b1, a2, b2) cause a frame 266A to be set (see FIG. 92A).

For example, the command set_display_box(x1, y1, x2, y2) causes a square region (x1, y1) (x2, y2) that is displayed on a plane to be set. The command set_clipping_box(a1, b1, a2, b2) causes a square region (a1, b1) (a2, b2) that is displayed in the PNG image 265 to be set. The square region (x1, y1) (x2, y2) and the square region (a1, b1) (a2, b2) form the frame 266A.

In the next command group DispCmds(1), a command execution_time(start_time) causes predetermined time elapses after the execution of the command group DispCmds (0) to be set as start time. A command set_display_box(x1', y1', x2', y2') causes a square region (x1', y1') (x2', y2') to be set on the plane. A command set_clipping_box(a1', b1', a2', b2') causes a square region (a1', b1') (a2', b2') to be set in the PNG picture 265. The square region (x1', y1') (x2', y2') and the square region (a1', b1') (a2', b2') form a frame 266B to which the frame 266A is moved. Likewise, in the next command group DispCmds(2), a command execution_time(start_time)

causes predetermined time that elapses after the execution of the command group DispCmds(1) to be set as start time. A command set_display_box(x1", y1", x2", y2") causes a square region (x1", y1") (x2", y2") to be set on the plane. A command set_clipping_box(a1", b1", a2", b2") causes a square region (a1", b1") (a2", b2") to be set in the PNG image 265. The square region (x1", y1") (x2", y2") and the square region (a1", b1") (a2", b2") form a frame 265B to which the frame 265B is moved.

Thus, as shown in FIG. 92B, while a square region of a part of the PNG image 265 of subtitles is being moved, the square region can be moved from the region 265A to the region 265B to the region 265C on the plane.

Thus, according to the embodiment of the present invention, since the display control of the graphics object 200 is performed by the command groups DispCmds(i) of which each display control command is grouped by the command execution_time(start_time), various displays can be easily accomplished on the subtitle plane 11 and the graphics plane 12.

2-13. About Effect Sound

According to the embodiment of the present invention, a sound output can be synchronized with a display control of a graphics object 200. A sound output is defined by the command (7), which causes an effect sound to be reproduced, and the command (8), which causes an effect sound to be assigned to image data in the commands (2) to (8), excluding the command (1) execution_time(start_time), of the foregoing command group DispCmds(i). Sound data is assigned a unique identification sound_id.

The command (7), which causes an effect sound to be reproduced, is described in the format of play_sound(sound_id). The command play_sound(sound_id) causes sound data identified by an identifier sound_id to be reproduced. When the command play_sound(sound_id) is described in a command group DispCmds(i), sound data identified by the identifier sound_id is reproduced at time start_time designated by the command execution_time(start_time).

For example, when the command play_sound(sound_id) is used along with a command fade_in(fade_in_time) and a command fade_out (fade_in_time), sound data as an effect sound can be reproduced while subtitles are being displayed and/or cleared. FIG. 88 shows an example of which the command play_sound(sound_id) is used. In the example shown in FIG. 88, in the first command group DispCmds(0), a command fade_in(2 sec) causes a graphics object to be faded in for two seconds at start time [0]. A command play_sound(1) causes sound data identified by the identifier sound_id [1] to be reproduced. Thereafter, in the command group DispCmds (1), a command execution_time(800) causes a display color to be changed at time [800]. A command play_sound(2) causes sound data identified by the identifier sound_id [2] to be reproduced. In the command group DispCmds(2), a command execution_time(2000) and a command fade_out(1 sec) cause the graphics object to be faded out for one second at time [2000]. A command play_sound(1) causes sound data identified by the identifier sound_id to be reproduced.

The command play_sound(sound_id) is not an essential command.

The command (8), which causes an effect sound to be assigned to PNG data, is described in the format of set_sound (PNG_image_id, sound_id). The command set_sound (PNG_image_id, sound_id) causes sound data designated by the identifier sound_id to be reproduced for PNG data identified by the identifier PNG_image_id. This command set_sound(PNG_image_id, sound_id) causes the sound data identified by the identifier PNG_image_id to be reproduced when PNG data identified by the identifier PNG_image_id is displayed. The identifier PNG_image_id of the PNG data is the same as the value of the loop counter i of PNG_image(i) of the block PNGImageRegion( ).

It is considered that the command set_sound (PNG_image_id, sound_id) is used for PNG data of buttons in the selection state and the execution state. As a result, when the normal state of a button is changed to the execution state or vice versa, sound data assigned to PNG data that represents each state can be generated as an effect sound. Beside that example, this command set_sound(PNG_image_id, sound_id) can be used for PNG data for other than buttons.

FIG. 93 shows an example of a data structure of a graphics object 200 of which sound data is assigned to a button image. PNG data 203A, 203B, and 203C of buttons in the normal state, the selection state, and the execution state are described in a PNG data region 203. In the example shown in FIG. 93, display control commands cause coordinates and sound data to be assigned to PNG data. Display start time of PNG data and initial display state of buttons are controlled by an external script program. Thus, the display control commands are described as those of execution time [0].

The graphics object 200 shown in FIG. 93 describes only the command group DispCmds(0) that is executed in the display control command table 202 at time [0] by the command execution_time (0). Since an identifier PNG_image_id starts with [0], the identifier PNG_image_id [0] represents PNG data 203A in the normal state; the identifier PNG_image_id [1] represents PNG data 203B in the selection state; and the identifier PNG_image_id [2] represents PNG data 203C in the execution state.

When the PNG data 203B of the button in the selection state of which the identifier PNG_image_id is [1] is displayed by the command set_sound(1, 10), sound data identified by the identifier sound_id [10] is reproduced as an effect sound. Likewise, when the PNG data 203C of the button in the execution state of which the identifier PNG_image_id is [2] is displayed by the command set_sound(2, 11), sound data identified by the identifier sound_id [11] is reproduced as an effect sound.

Although not shown in FIG. 73A, FIG. 73B, and FIG. 73C, one or a plurality of types of sound data may be pre-stored in an internal memory or the like of the player. For example, predetermined sound data may be pre-stored in an internal non-volatile memory or the like of the player before shipment.

Alternatively, sound data as an effect sound may be prerecorded on a disc of which a graphics object 200 and a content as moving data have been recorded. When the content is reproduced from the disc, the sound data may be read. As a method for recording sound data on the disc, a file for the sound data is prepared. When the content is reproduced from the disc, the file is pre-read and stored in the memory of the player.

Alternatively, like a graphics object 200, PES packets that contain sound data are created. The PES packets are divided into TS packets. The TS packets are multiplexed with a clip AV stream.

Alternatively, sound data may be placed in the graphics object header 201 or a region immediately preceded by the sound data region 204 of the graphics object 200 shown in FIG. 76A, FIG. 76B, and FIG. 76C (sound data is not shown) corresponding to a PNG picture contained in the graphics object 200.

In any method, since sound data can be pre-read from a disc and pre-stored in the memory of the player, when the state of a button created with a PNG image is changed to the selection state or the execution state, an effect sound can be generated. Sound data is assigned a unique identifier sound_id, the sound data can be uniquely identified.

Next, the method for recording sound data to the disc will be described in detail. With reference to FIG. 76A, FIG. 76B, and FIG. 76C, a method for describing sound data in a graphics object 200 will be described. FIG. 76A and FIG. 76C show an example of which sound data is added to a graphics object 200 and then multiplexed with a clip AV stream.

FIG. 76A shows an example of which a sound data region 204 is disposed after a PNG data region 203 of a graphics object 200. The sound data region 204 can contain a plurality of sound data 204A, 204B, . . . 204n. When the sound data 204A, 204B, . . . 204n correspond to PNG data 203A, 203B, . . . , 203n of the graphics object 200, respectively, PNG images and sound data can be easily correlated.

The sound data 204A, 204B, . . . 204n may be data that has not been compression-encoded for example AIFF (Audio Interchange File Format) file or WAVE file or data that has been compression-encoded for example MP3 (Moving Pictures Experts Group 1 Audio Layer 3) file, AAC (Advanced Audio Coding) file, or ATRAC (Adaptive Transform Acoustic Coding) file. When sound data that has been compression-encoded is contained, the player side should have an audio decoder in accordance with the compression-encoding system.

FIG. 76C shows an example of which sound data corresponding to a button state is contained in a graphics object 200 that composes a button. In the example, sound data 204A-2 that is reproduced when the button is placed in the selection state and sound data 204B-2 that is reproduced when the button is placed in the execution state are contained in the sound data region 203. On the other hand, the PNG data 203A-2, 203B-2, and 203C-2 for the button in the normal state, the selection state, and the execution state are contained in the PNG data region 203.

In this case, the PNG data region 203 for button images is followed by the sound data region 204. The sound data region 204 contains sound data 204A-2 that is reproduced when the button is placed in the selection state and sound data 204B-2 that is reproduced when the button is placed in the execution state. Thus, when PNG data of a button image is displayed, sound data corresponding to a button state is reproduced. It is considered that an effect sound reproduced by the player is mainly used as a button click sound. Thus, in such a structure, the major purpose of the present invention can be sufficiently accomplished.

Figure 94:
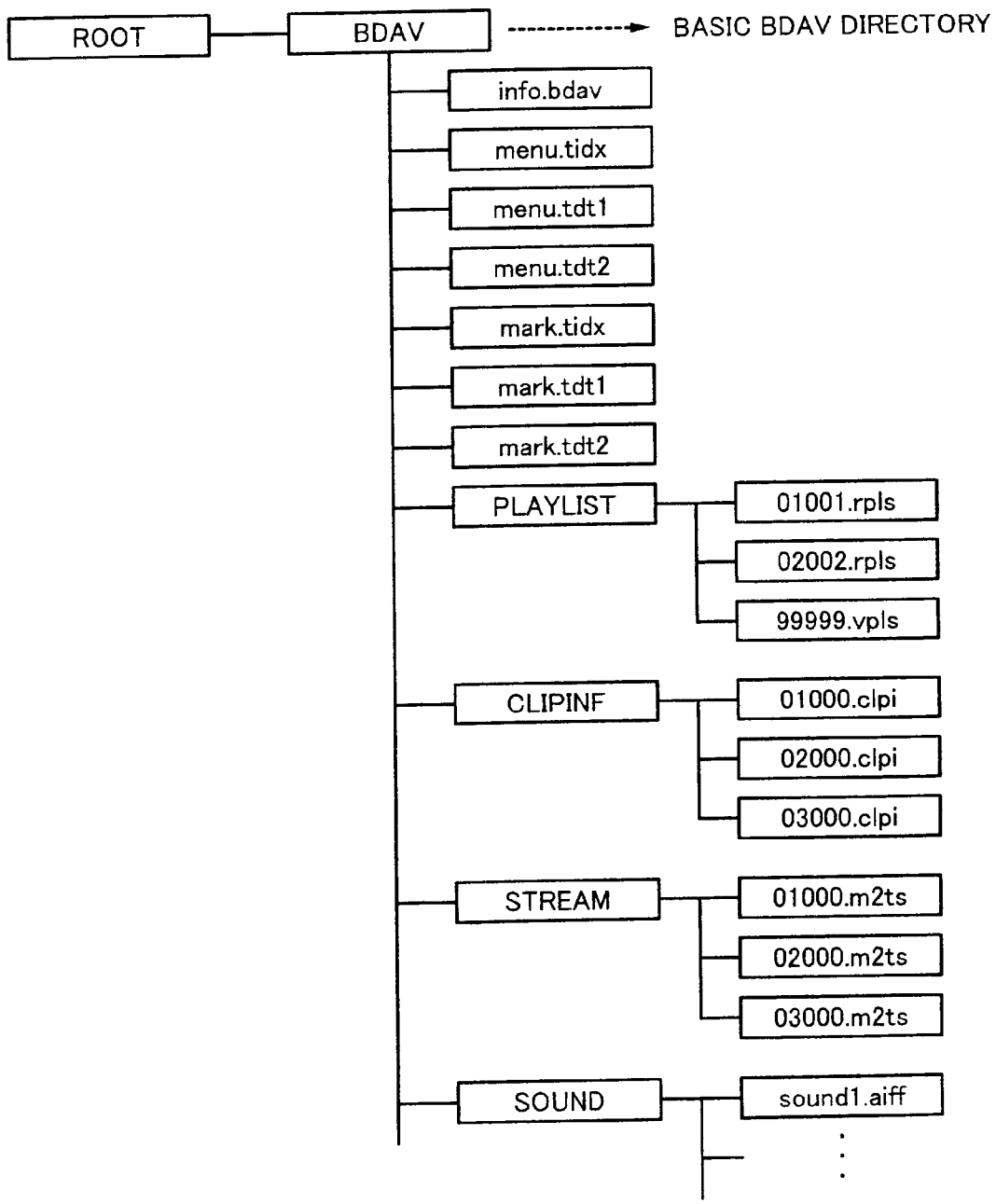
FIG. 94 is a schematic diagram showing an example of a management structure of data of which sound data is not placed in a graphics object.

Next, a method in the case that sound data is not multiplexed with a clip AV stream will be described. For example, as shown in FIG. 94, a directory SOUND that contains sound data is placed under a directory BDAV. The directory SOUND contains PCM waveform data as sound data. For example, a sound data file "sound1.aiff" having the AIFF format is placed in the directory SOUND. All sound data files placed in the directory SOUND are read when the disc is initially loaded into the player and then stored in an internal memory of the player.

Each piece of sound data is assigned a unique identifier sound_id. A program or a script calls desired sound data with an identifier sound_id.

In this case, as shown in FIG. 95, a sound id region 205 is disposed in a graphics object 200. Sound id data 205A and 205B are contained in the sound id region 205. In the example shown in FIG. 95, PNG data 203A, 203B, and 203C corresponding to a normal state, a selection state, and an execution state of a button are contained in the PNG data region 203. The Sound id data 205A and 205B are identifiers sound_id corresponding to the PNG data 203B and 203C, respectively. When the PNG data 203B is displayed, sound data corresponding to the identifier sound_id represented by the sound id data 205A stored in the memory of the player is reproduced.

For example, as described with reference to FIG. 93, PNG data and sound data may be correlated in accordance with the display control command table 202.

Data having the structure shown in FIG. 95 may be obtained from a network such as the Internet and then input to the input terminal 101, not read from a disc.

Unlike a display control command that has been described with reference to FIG. 85, since sound data is identified with an identifier sound_id, an effect sound of sound data can be generated anytime not in synchronization with graphics that are displayed.

In this method, since sound data is read from the memory using an identifier sound_id, the number of types of effect sounds is restricted by the number of identifiers sound_id. In addition, the number of types of effect sounds that can be used is restricted by the capacity of the internal memory of the player.

Next, with referenced to FIG. 96, that method will be described in detail. When a disc 400 is loaded, a player initially accesses the disc. All sound data is read from a directory SOUND placed under a directory BDAV. The sound data (PCM data) that has been read is stored in an internal memory 410 of the player. At that point, a unique identifier sound_id is assigned to each piece of sound data. Alternatively, an identifier sound_id may be added to each piece of the sound data recorded on the disc 400.

In the example, 16 pieces of sound data are read from the disc 400. Identifiers sound_id=1 to 16 are assigned to those pieces of sound data. The data sizes of those pieces of the sound data are obtained. It is assumed that in the example shown in FIG. 96 the pieces of the sound data assigned the identifiers sound_id=1 to 16 have data sizes of d1 bytes, d2 bytes, . . . , and d16 bytes, respectively.

For example, on a menu screen 420 that displays buttons 420A, 420B, and 420C, when an operation is preformed for the button 420C, sound data corresponding to an identifier sound_id assigned to the button 420C is read from a memory 410. In the example shown in FIG. 96, sound data corresponding to an identifier sound_id=1 is assigned to the execution state of the button 420C. Sound data that is read from the memory 410 is processed in a predetermined manner and temporarily stored in a buffer 450B. Thereafter, the sound data is supplied to an audio mixer 231. The audio mixer 231 mixes the sound data with sound data associated with for example moving picture data as a content main part and outputs the mixed data as a sound.

A buffer 450A temporarily stores sound data associated with for example moving picture data as a content main part. When timing at which sound data stored in the buffers 450A and 450B is read therefrom is adjusted, an effect sound corresponding to the operation of the button 420C is output from the buffer 450B at proper timing of sound data stored in the buffer 450A. In this example, with identifier sound_id=0, no-sound data reproduction mode is designated.

In such a model, the total capacity of sound data that can be read from the disc 400 is restricted to the capacity of the memory 410. The capacity of each piece of sound data is restricted in accordance with the capacity of the buffer 450B. When the capacity of the memory 410 is denoted by capacity M (bytes) and the capacity of the buffer 450B is denoted by capacity Dmax (bytes), it is necessary to satisfy the following two conditions.

(1) The capacity d1 of each piece of sound data stored in the memory 410 should be smaller than the capacity Dmax of the buffer 450B.
(2) The total capacity (d1+d2+ . . . +dn) of sound data stored in the memory 410 should be smaller than the capacity M of the memory 410.

In other words, when the conditions (1) and (2) are prescribed as rules on the player side and the disc producer side, reproduction compatibility of sound data such as effect sounds can be maintained.

As described above, in the case that sound data is not multiplexed with a clip AV stream, when a disc is initially loaded into the player, all sound data is read therefrom. However, the preset invention is not limited to such an example. In other words, sound data can be read from a disc in a plurality of sessions. For example, all sound data used for one of sections of a scenario is read and stored in the memory. At that point, sound data stored in the memory for the preceding section of the scenario is erased. As a result, even if the data amount of sound data of one scenario exceeds the capacity of the memory, the sound data can be handled.

All sound data can be recorded in a predetermined region of a disc. Alternatively, sound data may be separately recorded in a plurality of regions of a disc. When sound data is separately recorded in a plurality of regions of a disc, sound data for sections of a scenario may be recorded at positions of the disc corresponding to the sections of the scenario. Alternatively, sound data may be downloaded from a server connected through a network. At that point, when a position of a file is designated with a URL (Uniform Resource Locator), sound data can be accomplished in the same manner as the case that sound data is read from a disc.

In the method of which sound data is multiplexed with a clip AV stream described with reference to FIG. 76A and FIG. 76B, the number of types of sound data is not restricted. As a result, different type of sound data can be assigned to each image. When necessary, sound data is supplied with a clip AV stream. Thus, a different type of sound data can be used whenever a clip AV stream is supplied. Moreover, in the method of which sound data is multiplexed with a clip AV stream, since sound data is read from a clip AV stream along with image data, the reading model can be simply structured. In addition, the number of files of sound data and the sizes of files are not restricted except for the capacity of the disc.

However, in the method of which sound data is multiplexed with a clip AV stream, when the same sound data is used for different graphics objects, since their graphics objects each should have the same sound data, the sound data becomes redundant. In addition, since sound data should be extracted from a graphics object, after a clip AV stream is demultiplexed, sound data should be separated from the graphics object.

Next, with reference to FIG. 73A, FIG. 73B, and FIG. 73C, a sound data process can be synchronized with a graphics object 200 will be described.

Sound data that is not multiplexed with a clip AV stream is input as data of for example an input channel (1) to an input terminal 101. The sound data is supplied to a contents buffer 105 through switch circuits 102 and 103. On the other hand, a clip AV stream with which a graphics object 200 that contains sound data has been multiplexed is input to an input terminal 202. A PID filter 110 filters the graphics object 200 and temporarily stores the graphics object 200 in a buffer TBn 111A. Thereafter, the graphics object 200 is supplied to the contents buffer 105 through the switch circuit 103.

A clip AV stream with which a graphics object 200 that does not contain sound data has been multiplexed is input from the input terminal 202. The PID filter 110 filters the clip AV stream and outputs a transport packet that composes the graphics object 200. The transport packet is temporarily stored in a buffer TBn 111B or a buffer TBn 111C. The transport packet stored in the buffer TBn 111B is supplied to a buffer Bn 112B. As a result, the graphics object 200 is combined in accordance with a PID header. The graphics object 200 is supplied to a graphics decoder A 116 through a switch circuit 107. The transport packet stored in the buffer TBn 111C is also combined as the graphics object 200 through a buffer Bn 112C. The graphics object 200 is supplied to a graphics decoder B 117 through a switch circuit 108.

The graphics decoders A 116 and B 117 each remove header information from the supplied transport packet, decode image data contained in the transport packet, and obtain image data for example bit map data necessary for displaying subtitles or graphics.

Image data of the graphics object 200 that contains sound data is supplied from the contents buffer 105 to the graphics decoders A 116 and B 117 through the switch circuits 107 and 108, respectively.

In the example shown in FIG. 73A, FIG. 73B, and FIG. 73C, the graphics decoder A 116 decodes image data to be expanded to a subtitle plane. The graphics decoder B 117 decodes image data to be expanded to a graphics plane. Alternatively, the graphics decoders A 116 and B 117 may decode image data that has another data format. Alternatively, the graphics decoders A 116 and B 117 may deal with image data that has a plurality of formats.

An output of the graphics decoder A 116 is supplied to an input terminal 130B of a switch circuit 130 and to an input terminal 131C of a switch circuit 131. The image data is supplied to a subtitle plane 132 and a graphics plane 133 through the switch circuits 130 and 131, respectively.

A multimedia engine 106 has a sound player 106D. A buffer 109 has a sound buffer 109E. The sound player 106D decodes sound data that is read from the contents buffer 105 using the sound buffer 109E and outputs for example linear PCM audio data. The sound data that is output from the sound player 106D is supplied to a presentation processor 157. The presentation processor 157 mixes the sound data that is output from the sound player 106D with sound data that is output from an audio decoder 118 and outputs the mixed sound data to an output terminal 158.

Sound data as an effect sound such as a click sound or the like that is generated when for example a button image is clicked is reproduced by the sound player 106D. The sound data is stored in the sound buffer 109E and reproduced by the sound player 106D.

When for example a combination of HTML and ECMA script is used as a scenario descriptive language, the multimedia engine 106 reads an ECMA script stored in a code buffer 104, parses the ECMA script, reads another ECMA script and an HTML document from the code buffer 104, and reads image data and sound data from the contents buffer 105. Like data stored in the contents buffer 105, sound data can be kept stored in the contents buffer 105.

The multimedia engine 106 receives a user's input from the remote controller, the pointing device, or the like and performs a process corresponding to the user's input. The multimedia engine 106 generates a control signal corresponding to a processed result of the user's input and each script. The control signal is also supplied to the graphics decoders A 116 and B 117, the audio decoder 118, an MPEG video decoder 120, and a system decoder 121.

Image data processed by a graphic renderer 106C is supplied to the subtitle plane 132 and the graphics plane 133 through the switch circuits 130 and 131, respectively. Each of the subtitle plane 132 and the graphics plane 133 is composed of for example a frame memory. The subtitle plane 132 and the graphics plane 133 correspond to the subtitle plane 11 and the graphics plane 12 shown in FIG. 20, respectively.

The image data that is supplied from the graphic renderer 106C to the subtitle plane 132 and the graphics plane 133 is bit map data of which image data that has for example run-length compression format, PNG format, or JPEG format has been decoded by the graphic renderer 106C.

The multimedia engine 106 supplies a control signal that causes one of the subtitle plane 132, the graphics plane 133, and the moving picture plane 134 to be switched to another to a presentation processor 155. In addition, the multimedia engine 106 supplies a control signal that controls an output of the audio stream to a presentation processor 141.

Image data on the subtitle plane 132 is supplied to a palette 150 that corresponds to the palette 122 shown in FIG. 22. The palette 150 that has 256 colors is referenced with an index. As a result, RGB data is output. In addition, transparency data $\alpha 1$ is output. The RGB data is supplied to an RGB/YCbCr converting circuit 151 that corresponds to the RGB/YCbCr converting circuit 29 shown in FIG. 22. The RGB/YCbCr converting circuit 151 converts the color system from RGB (4:4:4) into YCbCr (4:4:4). YCbCr data that is output from the RGB/YCbCr converting circuit 151 is supplied to the presentation processor 155.

Image data on the graphics plane 133 is supplied to a palette 152 that corresponds to the palette 26 shown in FIG. 22. The palette 152 that has 256 colors is referenced with an index. As a result, RGB data is output. In addition, transparency data $\alpha 2$ is output. The RGB data is supplied to an RGB/YCbCr converting circuit 153 that corresponds to the RGB/YCbCr converting circuit 27 shown in FIG. 22. The RGB/YCbCr converting circuit 153 converts the color system from RGB (4:4:4) into YCbCr (4:4:4). The YCbCr data that is output from the RGB/YCbCr converting circuit 153 is supplied to the presentation processor 155.

Moving picture data on the moving picture plane 134 is supplied to the presentation processor 155 through an up/down converter 154.

The presentation processor 155 performs an alpha-blending process with the transparency $\alpha 1$ of the subtitle plane 11 (subtitle plane 132) and the transparency $\alpha 2$ of the graphics plane 12 (graphics plane 133). This process causes image data on the moving picture plane 10, the subtitle plane 11, and the graphics plane 12 to be combined. The presentation processor 155 can perform an effect process for the image data on real time basis. Image data of which the combining process has been performed among planes and the effect process has been performed is obtained from an output terminal 156.

2-14. Others

As described above, a prerecorded large capacity disc according to the present invention has three independent planes that are a moving picture plane for a moving picture, a subtitle plane for subtitles, and a graphics plane for a screen having an interruptive function such as a menu screen. These planes are combined and displayed. Thus, as an effect of the present invention, a moving picture can be displayed on the moving picture plane, while a menu screen and so forth are displayed on the graphics plane with a background of the moving picture.

According to the present invention, since a buffer that stores image data to be displayed on the graphics plane is disposed, the same image data can be repeatedly displayed on the graphics plane. Thus, as an effect of the present invention, a menu screen and so forth can be structured with higher flexibility than before.

According to the present invention, states of a button displayed on the menu screen or the like are categorized as three states. Corresponding to the categorized states, image data is provided. The image data is switched corresponding to a user's input or the like. As a result, various types of enriched menus that cannot be accomplished by conventional DVD video can be accomplished.

According to the present invention, a display control for graphics displayed on a graphic plane is described using display control commands. Thus, as an effect of the present invention, an interactive function can be accomplished with a screen displayed on the graphics plane. A simple animation of which subtitles and buttons are scrolled and moved and enriched buttons of which the contents of an image are varied corresponding to a user's input can be accomplished.

A prerecorded large capacity disc according to the present invention has three independent planes that are a moving picture plane for a moving picture, a subtitle plane for subtitles, and a graphics plane for a screen having an interruptive function such as a menu screen. These planes are combined and displayed. A common graphics object as a format of an object displayed on the subtitle plane and the graphics plane is defined. A decoder model, display control commands, and an operation model are defined. As a result, as an effect of the present invention, subtitles and buttons can be displayed in synchronization with a moving picture.

According to the present invention, a decoder model of a graphics object is defined. To implement that, a method for restricting a transfer rate of data from an object buffer to a plane buffer is presented. For a data amount of data that is rewritten to the plane buffer, since the data amount varies depending on the position, deformation, and movement of an object on a plane, a square update region called a window is defined. Thus, a minimum update interval can be estimated. As a result, the implementation of the decoder model and the reproduction compatibility thereof can be improved.

According to the present invention, a decoder model of which sound data is contained in a graphics object and of which the sound data is reproduced while a button image contained in the graphics object is displayed is defined. Thus, sound data can be easily reproduced in synchronization with a graphics object that is displayed.

According to the present invention, a command that causes sound data to be reproduced is defined against a display control command for a graphics object. In addition, sound data can be assigned to image data contained in a graphics object against a display control command for an object. Thus, as an effect of the present invention, sound data such as an effect sound can be reproduced at any time and subtitles and buttons that have effect sounds can be accomplished.

Description of Reference Numerals

10 MOVING PICTURE PLANE
11 SUBTITLE PLANE
12 GRAPHICS PLANE
22 PALETTE
30 BD VIRTUAL PLAYER
31 PLAYER COMMAND
32 COMMON PARAMETERS
40 PLAY BACK CONTROL PROGRAM
41 METHOD
60 MENU SCREEN
70, 70' SCENARIO

73A TO 73M PLAY LIST
100 PLAYER DECODER
104 CODE BUFFER
105 CONTENTS BUFFER
106 MULTIMEDIA ENGINE
109 BUFFER
110 PID FILTER
116 GRAPHICS DECODER A
117 GRAPHICS DECODER B
118 AUDIO DECODER
120 MPEG VIDEO DECODER
132 SUBTITLE PLANE
133 GRAPHICS PLANE
134 MOVING PICTURE PLANE
226 PNG DECODER BUFFER
227 PNG DECODER
228 OBJECT BUFFER
229 PLANE BUFFER
231 AUDIO MIXER

The invention claimed is:

1. A reproducing method for reproducing contents data, comprising the steps of:
inputting a non-real time stream and a real time stream, the non-real time stream containing at least a program code and image data composing an operation screen that prompts a user to perform an operation, the real time stream containing at least moving picture data and subtitle data;
storing the program code that is input at the inputting step to code storing means;
storing the image data that is input at the inputting step to image data storing means;
decoding the input moving picture data and subtitle data;
combining decoded moving picture data of the moving picture data that is input at the inputting step and decoded subtitle data of the subtitle data that is input at the inputting step; and
combining the image data stored in the image data storing means and the combined data of the decoded moving picture and the decoded subtitle data combined at the combining step based on the program code stored in the code storing means.

2. A non-transitory computer readable medium having stored thereon a reproducing program for causing a computer device to execute a reproducing method for reproducing contents data, the reproducing method comprising the steps of:
inputting a non-real time stream and a real time stream, the non-real time stream containing at least a program code and image data composing an operation screen that prompts a user to perform an operation, the real time stream containing at least moving picture data and subtitle data;
storing the program code that is input at the inputting step to code storing means;
storing the image data that is input at the inputting step to image data storing means;
decoding the input moving picture data and subtitle data;
combining decoded moving picture data of the moving picture data that is input at the inputting step and decoded subtitle data of the subtitle data that is input at the inputting step; and
combining the image data stored in the image data storing means and the combined data of the decoded moving picture and the decoded subtitle data combined at the combining step based on the program code stored in the code storing means.

3. A non-transitory recording medium on which a reproducing program for causing a computer device to execute a reproducing method for reproducing contents data has been recorded, the reproducing method comprising the steps of:
inputting a non-real time stream and a real time stream, the non-real time stream containing at least a program code and image data composing an operation screen that prompts a user to perform an operation, the real time stream containing at least moving picture data and subtitle data;
storing the program code that is input at the inputting step to code storing means;
storing the image data that is input at the inputting step to image data storing means;
decoding the input moving picture data and subtitle data;
combining decoded moving picture data of the moving picture data that is input at the inputting step and decoded subtitle data of the subtitle data that is input at the inputting step; and
combining the image data stored in the image data storing means and the combined data of the decoded moving picture and the decoded subtitle data combined at the combining step based on the program code stored in the code storing means.

4. A non-transitory disc shaped recording medium on which contents data has been recorded, comprising:
a non-real time stream and a real time stream recorded on the recording medium, the non-real time stream containing at least a program code and image data composing an operation screen that prompts a user to perform an operation, the real time stream containing at least moving picture data and subtitle data,
wherein the image data is combinable with combined data of the decoded moving picture data and the decoded subtitle data based on the program code.

5. The recording medium as set forth in claim 4,
wherein the image data and the subtitle data are controllable so that they are displayed in synchronization with the moving picture data, and are contained in a common data structure, and
the data structure is recorded on the recording medium.

6. The recording medium as set forth in claim 5,
wherein the data structure has at least a display control command and one piece or a plurality of pieces of image data or the subtitle data, the display control command controlling the one piece or the plurality of pieces of image data or the subtitle data that is displayed.

7. The recording medium as set forth in claim 6,
wherein the display control command contains a command that causes a display attribute of the image data or the subtitle data rather than the image data itself or the subtitle data itself to be changed.

8. The recording medium as set forth in claim 7,
wherein the display attribute is transparency.

9. The recording medium as set forth in claim 7,
wherein the display attribute is a color that is displayed.

10. The recording medium as set forth in claim 6,
wherein the data structure is recorded on the recording medium so that the data structure contains a plurality of groups of the plurality of the display control commands, each group of the plurality of display control commands being executed at the same time, the plurality of groups of the plurality of the display control commands being executed at different times.

11. The recording medium as set forth in claim 5,
wherein the image data or the subtitle data is contained in the data structure and recorded on the recording medium so that a valid period starts in accordance with time management information with which the image data is decoded or time management information with which the subtitle data is decoded and ends at valid period end time defined in the data structure.

12. The recording medium as set forth in claim 4,
wherein the image data is button image data for a button,
wherein one of first, second, and third button image data corresponding to three types of states of the button is switchably displayed in accordance with the operation of the user.

13. The recording medium as set forth in claim 5,
wherein the image data is button image data for a button, and
wherein first, second, and third button image data corresponding to three types of states of the button is contained in the same data structure and the data structure is recorded on the recording medium.

14. The recording medium as set forth in claim 6,
wherein the display control command further contains a sound data reproduction control command for controlling sound data that is reproduced, the display control command being contained in the data structure and the data structure being recorded on the recording medium.

15. The recording medium as set forth in claim 14,
wherein the sound data reproduction control command is configured to control sound data that is reproduced when the subtitle data is displayed, the display control command being contained in the data structure and the data structure being recorded on the recoding medium.

16. The recording medium as set forth in claim 14,
wherein the image data is button image data for a button, and
wherein the sound data is reproduced in accordance with the sound data reproduction control command when first, second, or third button image data is displayed in accordance with one of three types of states of the button, the display control command being contained in the data structure and the data structure being recorded on the recording medium.

17. The recording medium as set forth in claim 14,
wherein the sound data reproduction control command is configured to allow the sound data to be assigned to the image data or the subtitle data, the display control command being contained in the data structure and the data structure being recorded on the recording medium.

18. The recording medium as set forth in claim 4,
wherein the image data is further multiplexed with the real time stream and the real time stream is recorded on the recording medium.

19. The recording medium as set forth in claim 4,
wherein sound data reproduced as an effect sound is further recorded on the recording medium.

20. The recording medium as set forth in claim 19,
wherein the audio data is further multiplexed with the real time stream and the real time steam is recorded on the recording medium.

21. The recording medium as set forth in claim 20,
wherein image data is further multiplexed with the real time stream, and
wherein the image data and the sound data contained in the real time stream are combined as one data structure and the data structure is recorded on the recording medium.

22. The recording medium as set forth in claim 21,
wherein the data structure further contains a control command for controlling image data that is multiplexed with the real time stream and that is displayed and controlling the sound data that is reproduced.

23. The recording medium as set forth in claim 21,
wherein the data structure contains the sound data corresponding to image data that is multiplexed with the real time stream as a set of the sound data and the image data.

24. The recording medium as set forth in claim 23,
wherein image data multiplexed with the real time stream is button image data for a button, and
wherein the data structure contains a set of the button image data corresponding to the state of the button and the sound data.

25. The recording medium as set forth in claim 24,
wherein the button has a plurality of states,
wherein a plurality of pieces of button image data are correlated with the plurality of states,
wherein sound data is assigned to at least one of the plurality of pieces of button image data, the sound data and at least one of the plurality of pieces of button images to which the sound data is assigned being treated as one set, and
wherein the plurality of pieces of the button image data and the sound data are contained in the same data structure.

26. The recording medium as set forth in claim 25,
wherein the sound data correlated with the button image data as a set is reproduced when the button image data is displayed in accordance with a change of the state of the button.

27. The recording medium as set forth in claim 26,
wherein the data structure contains a plurality of groups of the plurality of the control commands, each group of the plurality of control commands being executed at the same time, the plurality of groups of the plurality of the control commands being executed at different times.

28. The recording medium as set forth in claim 19,
wherein the sound data is contained in a file and the file is recorded on the recording medium.

29. The recording medium as set forth in claim 28,
wherein image data multiplexed with the real time stream and information of the sound data are contained in one data structure and the data structure is recorded on the recording medium.

30. The recording medium as set forth in claim 29,
wherein the data structure contains image data multiplexed with the real time stream and information of the sound data corresponding to the image data as a set.

31. The recording medium as set forth in claim 30,
wherein image data multiplexed with the real time stream is button image data for a button, and
wherein the data structure contains the button image data corresponding to a state of the button and information of the sound data corresponding to the button image data as a set.

32. The recording medium as set forth in claim 31,
wherein the button has a plurality of states,
wherein a plurality of pieces of button image data are assigned to the plurality of states,
wherein sound data is correlated to at least one of the plurality of pieces of button image data as a set, and
wherein the plurality of pieces of button image data and the information of the sound data are contained in the same data structure.

33. The recording medium as set forth in claim 32,
wherein the data structure further contains a control command for causing the sound data correlated with the button image data to be reproduced when the button image data is displayed.

34. The recording medium as set forth in claim 33,
wherein the data structure is recorded on the recording medium so that the data structure contains a plurality of groups of the plurality of the control commands, each group of the plurality of control commands being executed at the same time, the plurality of groups of the plurality of the control commands being executed at different times.

35. The recording medium as set forth in claim 34,
wherein the image data is recorded on the recording medium so that a predetermined lower limit of a rate at which the image data is decoded is satisfied.

36. The recording medium as set forth in claim 34,
wherein the image data is recorded on the recording medium so that a predetermined lower limit of a transfer rate at which the decoded image data is transferred to a plane buffer is satisfied.

37. The recording medium as set forth in claim 36,
wherein a square region that fully contains one or a plurality of pieces of decoded image data is defined on the plane buffer, and
wherein when image data is drawn, updated, and erased, by rewriting the square region, the lower limit of the transfer rate is satisfied.

* * * * *